US010073282B2

(12) United States Patent
Saylor et al.

(10) Patent No.: US 10,073,282 B2
(45) Date of Patent: Sep. 11, 2018

(54) EYEWEAR WITH VARIABLE OPTICAL CHARACTERISTICS

(71) Applicant: Oakley, Inc., Foothill Ranch, CA (US)

(72) Inventors: Ryan Saylor, Mission Viejo, CA (US); Benjamin J. Meunier, San Clemente, CA (US); Christopher John Anderson, Mission Viejo, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 15/594,475

(22) Filed: May 12, 2017

(65) Prior Publication Data

US 2017/0315384 A1 Nov. 2, 2017

Related U.S. Application Data

(63) Continuation-in-part of application No. PCT/US2015/060103, filed on Nov. 11, 2015.

(60) Provisional application No. 62/079,418, filed on Nov. 13, 2014.

(51) Int. Cl.
*G02C 7/10* (2006.01)

(52) U.S. Cl.
CPC .............. *G02C 7/101* (2013.01); *G02C 7/102* (2013.01)

(58) Field of Classification Search
CPC .......... G02C 7/10; G02C 7/104; G02C 7/107; G02C 7/12

(Continued)

(56) References Cited

U.S. PATENT DOCUMENTS 2,219,122 A 10/1940 Weidert et al.
3,701,590 A 10/1972 Zeltzer
(Continued)

FOREIGN PATENT DOCUMENTS

CN 1338622 3/2002
CN 2859575 1/2007
(Continued)

OTHER PUBLICATIONS

"ANSI Z80.3-2010 American National Standard for Opthalmics-Nonprescription Sunglass and Fashion Eyewear Requirements," Jun. 7, 2010, pp. 1-25.
(Continued)

*Primary Examiner* — Hung Dang
(74) *Attorney, Agent, or Firm* — Sterne, Kessler, Goldstein & Fox, P.L.L.C.

(57) ABSTRACT

Embodiments disclosed herein include eyewear that provides controlled variable light attenuation and color enhancement based on an input received from a user, a sensor and/or a signal from a control circuit. In some embodiments, the eyewear includes an optical filter system with two or more defined filter states that are adapted to improve color vision in different environments. The optical filter system can be incorporated into a lens having any desired curvature, including, for example, cylindrical, spherical or toroidal. The lens can include one or more functional components. Examples of functional components include color enhancement filters, chroma enhancement filters, a laser attenuation filter, electrochromic filters, photoelectrochromic filters, variable attenuation filters, anti-reflection coatings, interference stacks, hard coatings, flash mirrors, anti-static coatings, anti-fog coatings, other functional layers, or a combination of functional layers.

37 Claims, 44 Drawing Sheets

Electrochromic Cell and CE Filter Combined % Transmission Profile

(58) Field of Classification Search
USPC .. 351/41, 44, 159.49, 159.59, 159.6, 159.65
See application file for complete search history.

(56) References Cited

U.S. PATENT DOCUMENTS

| | | | |
|---|---|---|---|
| 3,877,797 A | 4/1975 | Thornton, Jr. |
| 4,176,299 A | 11/1979 | Thornton, Jr. |
| 4,288,250 A | 9/1981 | Yamashita |
| 4,300,819 A | 11/1981 | Taylor |
| 4,354,739 A | 10/1982 | Scanlon et al. |
| 4,376,829 A | 3/1983 | Daiku |
| 4,405,881 A | 9/1983 | Kobayashi |
| 4,521,524 A | 6/1985 | Yamashita |
| 4,659,178 A | 4/1987 | Kyogoku |
| 4,663,562 A | 5/1987 | Miller et al. |
| 4,687,926 A | 8/1987 | Plummer |
| 4,769,347 A | 9/1988 | Cook et al. |
| 4,802,755 A | 2/1989 | Hensler |
| 4,826,286 A | 5/1989 | Thornton, Jr. |
| 4,838,673 A | 6/1989 | Richards et al. |
| 4,998,817 A | 3/1991 | Zeltzer |
| 5,039,631 A | 8/1991 | Krashkevich et al. |
| RE33,729 E | 10/1991 | Perilloux |
| 5,054,902 A | 10/1991 | King |
| 5,061,659 A | 10/1991 | Ciolek et al. |
| 5,077,240 A | 12/1991 | Hayden et al. |
| 5,121,030 A | 6/1992 | Schott |
| 5,121,239 A | 6/1992 | Post |
| 5,149,183 A | 9/1992 | Perrott et al. |
| 5,164,858 A | 11/1992 | Aguilera, Jr. et al. |
| 5,190,896 A | 3/1993 | Pucilowski et al. |
| 5,218,386 A | 6/1993 | Levien |
| 5,408,278 A | 4/1995 | Christman |
| 5,438,024 A | 8/1995 | Bolton et al. |
| 5,446,007 A | 8/1995 | Krashkevich et al. |
| 5,574,517 A | 11/1996 | Pang et al. |
| 5,592,245 A | 1/1997 | Moore et al. |
| 5,646,479 A | 7/1997 | Troxell |
| 5,646,781 A | 7/1997 | Johnson, Jr. |
| 5,694,240 A | 12/1997 | Sternbergh |
| 5,715,031 A | 2/1998 | Roffman et al. |
| 5,729,323 A | 3/1998 | Arden et al. |
| 5,731,898 A | 3/1998 | Orzi et al. |
| 5,774,202 A | 6/1998 | Abraham et al. |
| 5,922,246 A | 7/1999 | Matsushita et al. |
| 5,925,468 A | 7/1999 | Stewart |
| 5,995,273 A | 11/1999 | Chandrasekhar |
| 6,045,224 A | 4/2000 | Kallenbach et al. |
| 6,132,044 A | 10/2000 | Sternbergh |
| 6,135,595 A | 10/2000 | Takeshita et al. |
| 6,138,286 A | 10/2000 | Robrahn et al. |
| 6,142,626 A | 11/2000 | Lu et al. |
| 6,145,984 A | 11/2000 | Farwig |
| 6,166,848 A | 12/2000 | Cammenga et al. |
| 6,175,450 B1 | 1/2001 | Andreani et al. |
| 6,239,778 B1 | 5/2001 | Palffy-Muhoray et al. |
| 6,313,577 B1 | 11/2001 | Kunisada et al. |
| 6,334,680 B1 | 1/2002 | Larson |
| 6,382,788 B1 | 5/2002 | Stehager |
| 6,391,810 B1 | 5/2002 | Lenhart |
| 6,450,652 B1 | 6/2002 | Karpen |
| 6,416,867 B1 | 7/2002 | Karpen |
| 6,420,290 B1 | 7/2002 | Brocheton et al. |
| 6,460,994 B1 | 10/2002 | Nolan |
| 6,604,824 B2 | 8/2003 | Larson |
| 6,631,987 B2 | 10/2003 | Reichow et al. |
| 6,641,261 B2 | 11/2003 | Wang et al. |
| RE38,402 E | 1/2004 | Stephens et al. |
| 6,677,260 B2 | 1/2004 | Crane et al. |
| 6,770,692 B1 | 8/2004 | Kobayashi et al. |
| 6,773,816 B2 | 8/2004 | Tsutsumi |
| 6,811,258 B1 | 11/2004 | Grant |
| 6,811,727 B2 | 11/2004 | Havens et al. |
| 6,852,657 B2 | 2/2005 | Kolberg et al. |
| 6,854,844 B2 | 2/2005 | Kroll et al. |
| 6,863,397 B2 | 3/2005 | Nakano |
| 6,893,127 B2 | 5/2005 | Reichow et al. |
| 6,926,405 B2 | 8/2005 | Ambler et al. |
| 6,932,472 B2 | 8/2005 | Marason et al. |
| 6,955,430 B2 | 10/2005 | Pratt |
| 6,979,083 B2 | 12/2005 | Kerns, Jr. et al. |
| 6,984,038 B2 | 1/2006 | Ishak |
| 7,029,118 B2 | 4/2006 | Ishak |
| 7,035,010 B2 | 4/2006 | Iori et al. |
| 7,106,509 B2 | 9/2006 | Sharp |
| 7,255,435 B2 | 8/2007 | Pratt |
| 7,256,921 B2 | 8/2007 | Kumar et al. |
| 7,276,544 B2 | 10/2007 | Lai et al. |
| 7,278,737 B2 | 10/2007 | Mainster et al. |
| 7,349,138 B2 | 3/2008 | Kumar et al. |
| 7,372,640 B2 | 5/2008 | Fung |
| 7,393,100 B2 | 7/2008 | Mertz |
| 7,506,976 B2 | 3/2009 | Baiocchi et al. |
| 7,506,977 B1 | 3/2009 | Aiiso |
| 7,520,608 B2 | 4/2009 | Ishak et al. |
| 7,556,376 B2 | 7/2009 | Ishak et al. |
| 7,597,441 B1 | 10/2009 | Farwig |
| 7,656,581 B2 | 2/2010 | Giraudet |
| 7,717,557 B2 | 5/2010 | Kobayashi et al. |
| 7,732,006 B2 | 6/2010 | Alberto de Rojas |
| 7,901,074 B2 | 3/2011 | Yamamoto et al. |
| 7,922,324 B2 | 4/2011 | Ishibashi et al. |
| 7,926,940 B2 | 4/2011 | Blum et al. |
| 7,936,496 B2 | 5/2011 | Kosa et al. |
| 8,210,678 B1 | 7/2012 | Farwig |
| 8,562,130 B2 | 10/2013 | Kosa et al. |
| 8,733,929 B2 | 5/2014 | Chiou et al. |
| 8,770,749 B2 | 7/2014 | McCabe et al. |
| 8,911,082 B2 * | 12/2014 | Ambler ................ G02C 7/104 |
| | | 351/159.62 |
| 9,134,547 B2 | 9/2015 | McCabe et al. |
| 9,146,336 B2 | 9/2015 | Matsumoto et al. |
| 9,383,594 B2 | 7/2016 | McCabe et al. |
| 9,575,335 B1 | 2/2017 | McCabe et al. |
| 2001/0005281 A1 | 6/2001 | Yu |
| 2003/0020988 A1 | 1/2003 | Stone |
| 2003/0076474 A1 | 4/2003 | Wang et al. |
| 2004/0005482 A1 | 1/2004 | Kobayashi et al. |
| 2004/0246437 A1 | 12/2004 | Ambler et al. |
| 2005/0009964 A1 | 1/2005 | Sugimura et al. |
| 2005/0168690 A1 | 8/2005 | Kawai et al. |
| 2005/0175969 A1 | 8/2005 | Hayes |
| 2005/0224703 A1 | 10/2005 | Harada et al. |
| 2006/0033851 A1 | 2/2006 | Iori et al. |
| 2006/0146275 A1 | 7/2006 | Mertz |
| 2006/0158881 A1 | 7/2006 | Dowling |
| 2007/0097509 A1 | 5/2007 | Nevitt et al. |
| 2007/0122626 A1 | 5/2007 | Qin et al. |
| 2007/0126983 A1 | 6/2007 | Godeau et al. |
| 2007/0236809 A1 | 10/2007 | Lippey et al. |
| 2008/0068555 A1 | 3/2008 | Lau et al. |
| 2008/0221674 A1 | 9/2008 | Blum et al. |
| 2008/0278676 A1 | 11/2008 | Croft et al. |
| 2008/0291140 A1 | 11/2008 | Kent et al. |
| 2008/0297879 A1 | 12/2008 | Tonar et al. |
| 2009/0040564 A1 | 2/2009 | Granger |
| 2009/0040588 A1 | 2/2009 | Tonal et al. |
| 2009/0268102 A1 | 10/2009 | Barazza |
| 2010/0054632 A1 | 3/2010 | McCormick et al. |
| 2010/0066974 A1 | 3/2010 | Croft et al. |
| 2010/0073765 A1 | 3/2010 | Brocheton |
| 2010/0232003 A1 | 9/2010 | Baldy et al. |
| 2010/0283956 A1 | 11/2010 | Jackson et al. |
| 2011/0043902 A1 | 2/2011 | Ishibashi et al. |
| 2011/0164215 A1 | 7/2011 | Coco Martin |
| 2012/0044560 A9 | 2/2012 | Lam et al. |
| 2012/0236249 A1 | 9/2012 | Miwa et al. |
| 2013/0120821 A1 | 5/2013 | Chandrasekhar |
| 2014/0233105 A1 | 8/2014 | Schmeder |
| 2014/0268283 A1 | 9/2014 | Chandrasekhar |
| 2016/0041408 A1 | 2/2016 | Carlson et al. |
| 2016/0048037 A1 | 2/2016 | McCabe et al. |
| 2016/0070119 A1 | 3/2016 | McCabe et al. |

(56) References Cited

U.S. PATENT DOCUMENTS

| | | | |
|---|---|---|---|
| 2017/0068113 | A1 | 3/2017 | McCabe et al. |
| 2017/0075143 | A1 | 3/2017 | Saylor et al. |
| 2017/0102558 | A1 | 4/2017 | Saylor et al. |

FOREIGN PATENT DOCUMENTS

| | | |
|---|---|---|
| DE | 3534575 | 4/1986 |
| EP | 0 127 821 | 12/1984 |
| EP | 0 519 660 | 12/1992 |
| EP | 1 986 024 | 10/2008 |
| FR | 2812629 | 2/2002 |
| GB | 1154500 | 6/1969 |
| JP | S63-008703 | 1/1988 |
| JP | H05-202109 | 8/1993 |
| JP | 06-300992 | 10/1994 |
| JP | 2001-506012 | 5/2001 |
| JP | 2007-025609 | 2/2007 |
| JP | 2010-204383 | 9/2010 |
| WO | WO 88/002871 | 4/1988 |
| WO | WO 97/035215 | 9/1997 |
| WO | WO 99/067681 | 12/1999 |
| WO | WO 02/014930 | 2/2002 |
| WO | WO 2008/014225 | 1/2008 |
| WO | WO 2008/118967 | 10/2008 |
| WO | WO 2009/011439 | 1/2009 |
| WO | WO 2009/152381 | 12/2009 |
| WO | WO 2010/142019 | 12/2010 |
| WO | WO 2011/127015 | 10/2011 |
| WO | WO 2011/130314 | 10/2011 |
| WO | WO 2012/119158 | 9/2012 |
| WO | WO 2013/070417 | 5/2013 |
| WO | WO 2013/074269 | 5/2013 |
| WO | WO 2013/123592 | 8/2013 |
| WO | WO 2013/177676 | 12/2013 |
| WO | WO 2014/055513 | 4/2014 |
| WO | WO 2012/079160 | 6/2015 |
| WO | WO 2015/179538 | 11/2015 |
| WO | WO 2016/077431 | 5/2016 |

OTHER PUBLICATIONS

British Standard, "Personal Eye-Equipment—Sunglasses and Sunglare Filters for General Use and Filters for Direct Observation of the Sun," Technical Committee CEN/TC 85, Sep. 2007, pp. 46.

Drum, Bruce, "FDA Regulation of Labeling and Promotional Claims in Therapeutic Color Vision Devices: A Tutorial," Visual Neuroscience, May 2004, vol. 21, No. 3, pp. 461-463.

Encyclopedia of Polymer Science and Technology—Plastics, Resins, Rubbers, Fibers, edited by Mark, H. et al, vol. 9, John Wiley & Sons, 1968, USAA, pp. 6.

Exciton, "Product List", as archived Aug. 28, 2010 on archive.org in 2 pages.

Golz et al., "Colorimetry for CRT displays," Journal of the Optical Society of America A, vol. 20, No. 5, May 2003, pp. 769-781.

Kirkpatrick et al., "Optimization by Simulated Annealing," Science, New Series, May 13, 1983, vol. 220, No. 4598, pp. 671-680.

Linear Programming, Feb. 28, 2011, http://en.wikipedia.org/w/index.php?title=Linear_programmming&oldid=416428507, pp. 14.

Maui Jim, "All Sunglasses", as archived Mar. 30, 2009 on archive.org in 2 pages.

Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.

Nakamura et al, "Diffusion Coefficients of Disperse Dye to PE and PET Films in Supercritical Carbon Dioxide", School of Natural System, College of Science and Engineering, Kanazawa University, Japan, Proceedings of 9th International Symposium on Super Critical Fluids, May 18-20, 2009, Arachon, France, pp. 6.

"Product Description: Lagoon Sunglasses", Maui Jim website, address: http://www.mauijim.com/lagoon.html, page was publicly printed on Feb. 18, 2014, web available at least as early as Nov. 2009.

Rea et al., "Color Rendering: Beyond Pride and Prejudice," Color Research & Application, Dec. 2010, vol. 35, No. 6, pp. 401-409.

Sharp et al., "Retarder Stack Technology for Color Manipulation," SID Symposium Digest of Technical Papers, May 1999, vol. 30, No. 1, pp. 1072-1075.

Stockman et al., "The Spectral Sensitivities of the Middle- and Long-Wavelength-Sensitive Cones Derived from Measurements in Observers of known Genotype," Vision Research, vol. 40, Jun. 2000, pp. 1711-1737.

Swillam et al., "The Design of Multilayer Optical Coatings Using Convex Optimization," Journal of Lightwave Technology, Apr. 2007, vol. 25, No. 4, pp. 1078-1085.

Tilsch et al., "Manufacturing of Precision Optical Coatings," Chinese Optics Letters, Apr. 30, 2010, vol. 8, Supplement, pp. 38-43.

Vorobyev et al., "Receptor Noise as a Determinant of Colour Thresholds," Proceedings of the Royal Society of London B, Mar. 1998, vol. 265, pp. 351-358.

X-Rite, "A Guide to Understanding Color Communication", Mar. 2007, pp. 1-26, available at http://www.xrite.com/-/media/xrite/files/whitepaper_pdfs/110-001_a_guide_to_understanding_color_communication/110-001_understand_color_en.pdf.

International Search Report and Written Opinion dated Aug. 22, 2011 in PCT Application No. US/2011/32172.

International Preliminary Report on Patentability and Written Opinion dated Oct. 16, 2012 in PCT Application No. US/2011/32172.

International Search Report and Written Opinion dated Feb. 5, 2013, in PCT Application No. PCT/US2012/061060.

International Preliminary Report on Patentability and Written Opinion dated Apr. 22, 2014, in PCT Application No. PCT/US2012/061060.

International Search Report and Written Opinion dated May 2, 2016 in PCT Application No. PCT/US2015/060103.

International Preliminary Report on Patentability and Written Opinion dated Dec. 8, 2016, in PCT Application No. PCT/US2015/060103.

International Search Report and Written Opinion dated Jun. 1, 2016, in PCT Application No. PCT/US2015/065311.

International Search Report and Written Opinion dated Jul. 27, 2012, in PCT Application No. PCT/US2012/027790.

International Preliminary Report on Patentability and Written Opinion dated Sep. 3, 2013, in PCT/US2012/027790.

\* cited by examiner

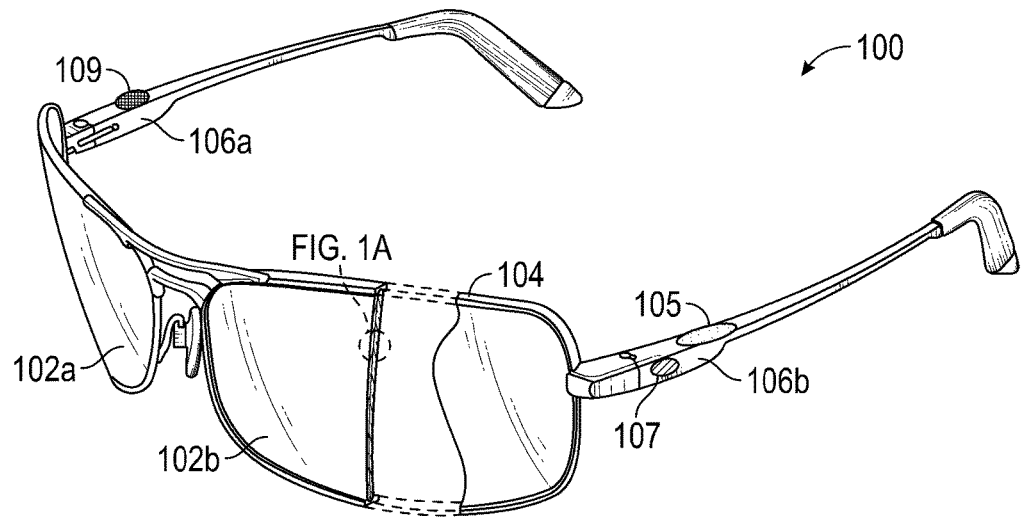
FIG. 1
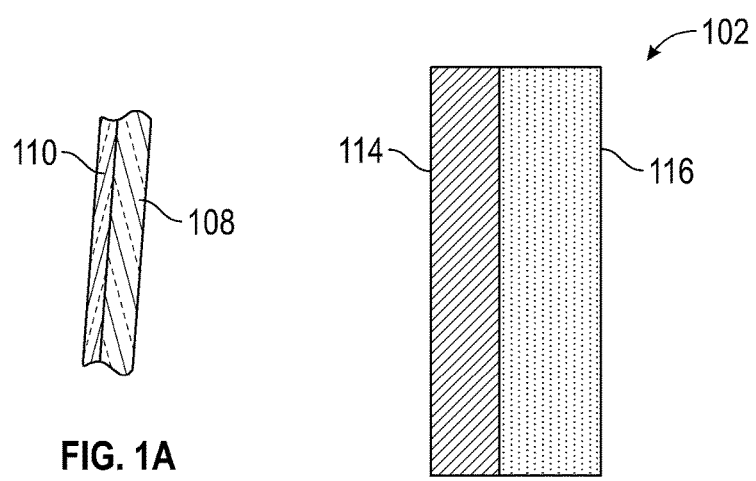
FIG. 1A
FIG. 1B

EYEWEAR WITH VARIABLE OPTICAL CHARACTERISTICS

RELATED APPLICATIONS

This application is a continuation-in-part of International Application No. PCT/US2015/060103 filed Nov. 11, 2015, titled VARIABLE LIGHT ATTENUATION EYEWEAR WITH COLOR ENHANCEMENT which claims priority to U.S. Provisional Patent Application No. 62/079,418, filed Nov. 13, 2014, titled VARIABLE LIGHT ATTENUATION EYEWEAR WITH COLOR ENHANCEMENT. The entire contents of both the above referenced applications are incorporated by reference herein and made part of this specification.

BACKGROUND

Field

This disclosure relates generally to eyewear and to lenses used in eyewear.

Description of Related Art

Eyewear generally includes one or lenses attached to a frame that positions the lenses on the wearer's head. Lenses can include optical filters that attenuate light in one or more wavelength bands. For example, sunglasses, goggles, and other eyewear designed for use outdoors in daylight typically include a lens that absorbs a significant portion of visible light. A sunglass lens or goggle can have a dark lens body or functional layer that strongly absorbs visible light, thereby significantly decreasing the luminous transmittance of the lens.

A sunglass lens can include an electro-optically active or controllable material that changes state from a higher transmittance to a lower transmittance or vice-versa when a voltage is applied and/or when a voltage is removed. Eyeglasses can include a power source that can be turned on to provide voltage to the electro-optically active or controllable material or turned off to remove voltage to the electro-optically active or controllable material. The turning on or turning off of the power source can be controlled by a user or by a sensor coupled to a control circuit. The electro-optically active or controllable material can include one or more chromophores that have electrochromic and/or photochromic properties.

SUMMARY

Example embodiments described herein have several features, no single one of which is indispensable or solely responsible for their desirable attributes. Without limiting the scope of the claims, some of the advantageous features will now be summarized. While the features and structures are described below in connection with embodiments of eyewear such as eyeglasses and goggles, it is to be understood that the features and structures can be implemented in any headworn support (i.e., a headworn article that can support one or more lenses in the wearer's field of view). For example, other headworn supports can include, but are not limited to, helmets, face masks, balaclavas, and breaching shields.

Embodiments disclosed herein include eyewear that provides variable optical characteristics, such as for example, light attenuation, luminous transmittance, contrast sensitivity, chromaticity and/or color enhancement based on a signal received from a control circuit, an input from a sensor or an input from a user. In some embodiments, the eyewear includes an optical filter system with two or more defined filter states that are adapted to improve color vision in different environments. The optical filter system can be incorporated into a lens having any desired curvature, including, for example, cylindrical, spherical or toroidal. The lens can include one or more functional components, such as, for example, layers, coatings, or laminates. Examples of functional components include color enhancement filters, chroma enhancement filters, a laser attenuation filter, electrochromic filters, photoelectrochromic filters, variable attenuation filters, anti-reflection coatings, interference stacks, hard coatings, flash mirrors, anti-static coatings, anti-fog coatings, other functional layers, or a combination of functional layers.

Some embodiments provide a lens including a lens body and an optical filter within and/or outside of the lens body configured to attenuate visible light in one or more spectral bands. In some embodiments in which the optical filter is within the lens body, the optical filter can constitute the lens body, or the optical filter and additional components can constitute the lens body. The optical filter can be configured to substantially increase the colorfulness, clarity, and/or vividness of a scene. The optical filter can be particularly suited for use with eyewear and can allow the wearer of the eyewear to view a scene with improved dynamic visual acuity.

In certain embodiments, eyewear includes an optical filter with two or more selectable optical attenuation states. In various implementations, the two or more optical attenuation states can be selected based on a signal received from a control circuit, an input from a sensor or an input from a user. For example, the filter can have a first selectable optical attenuation state that is tailored for a first specific purpose and a second selectable optical attenuation state that is tailored for a second specific purpose. The filter can additional have further selectable optical attenuation states tailored for additional specific purposes, in certain embodiments. In some embodiments, one or more of the selectable optical attenuation states of the optical filter enables the wearer of the eyewear to view one or more different types of scenes with improved dynamic visual acuity.

One innovative aspect of the subject matter described in this disclosure can be implemented in an eyewear comprising a lens. The lens comprises a static attenuation filter; and a user-controlled and/or sensor-controlled variable attenuation filter. The variable attenuation filter is configured to switch among a plurality of states comprising a faded state and a darkened state based on a signal provided by a user and/or based on input from one or more than one sensors.

Another innovative aspect of the subject matter described in this disclosure can be implemented in an eyewear comprising an optical filter including a first filter state having a first luminous transmittance and a user-selectable or sensor-selectable second filter state having a second luminous transmittance. The optical filter comprises an absorber having an absorbance spectral profile comprising at least one absorbance peak in the visible spectrum. The absorbance peak has a maximum absorbance value between about 540 nm and about 580 nm and a full width at 80% of the maximum absorbance value of greater than or equal to about 5 nm when the optical filter is in the first filter state.

One innovative aspect of the subject matter described in this disclosure can be implemented in an eyewear comprising a first filter component including at least one of a photoelectrochromic material or an electrochromic material; and a second filter component comprising an organic dye. The first filter component is configured to switch between a faded state and a darkened state based on a signal received from a user-controlled and/or a sensor-controlled interface.

Another innovative aspect of the subject matter described in this disclosure can be implemented in an eyewear comprising an optical filter that can switch between a first filter state and a second filter state based on a signal received from an electric power supply operatively connected to a user-controlled or a sensor-controlled interface. A shift in luminous transmittance between the first state and second filter state is greater than or equal to about 10%. In the first filter state, the optical filter comprises a first absorbance peak with a maximum optical density greater than about 0.5 at a wavelength between about 540 nm and about 580 nm. The first absorbance peak has a full width at 80% of the maximum optical density between about 5 nm and about 20 nm in the first filter state. In the second filter state, the optical filter comprises a first absorbance peak with a maximum optical density less than about 3.0 at a wavelength between about 540 nm and about 580 nm. The first absorbance peak has a full width at 80% of the maximum optical density between about 5 nm and about 20 nm in the second filter state.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers can be reused to indicate correspondence between reference elements.

FIG. 1 illustrates an embodiment of eyewear including a pair of lenses.

FIG. 1A illustrates an embodiment of a lens that can be included in the eyewear depicted in FIG. 1.

FIG. 1B illustrates another embodiment of a lens that can be included in the eyewear depicted in FIG. 1, the lens comprising an optical filter including a variable filter component and a static filter component.

DETAILED DESCRIPTION OF PREFERRED EMBODIMENTS

Figure 2A:
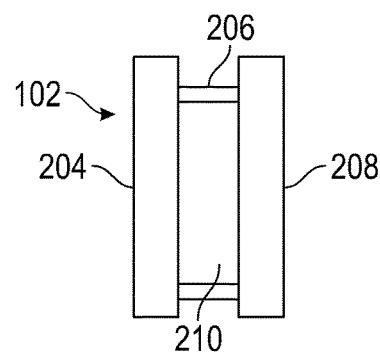
FIG. 2A illustrates an embodiment of a lens that can be included in the eyewear depicted in FIG. 1 or in the goggles depicted in FIG. 2C, the lens comprising a first component spaced apart from a second component by spacers.

Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein. The entire contents of U.S. Provisional Application No. 62/079,418, filed on Nov. 13, 2014 and titled "VARIABLE LIGHT ATTENUATION EYEWEAR WITH COLOR ENHANCEMENT," is incorporated by reference herein and made part of this specification.

While the present description sets forth specific details of various embodiments, it will be appreciated that the description is illustrative only and should not be construed in any way as limiting. Additionally, although particular embodiments may be disclosed or shown in the context of particular types of eyewear systems, such as unitary lens eyeglasses, dual lens eyeglasses having partial or full orbitals, and goggles, it is understood that any elements of the disclosure may be used in any type of eyewear system. Moreover, any elements of the disclosure may be used in any headworn support (i.e., a headworn article that can support one or more lenses in the wearer's field of view). For example, other types of headworn supports can include, but are not limited to, helmets, face masks, balaclavas, and breaching shields.

Sunglasses provide protection from bright sunlight and high-energy visible light that can be damaging or discomforting to the eyes. A majority of existing sun glasses are not suitable for use in low light or indoors due to reduced visibility in low light conditions and/or indoors. Eyewear including lenses comprising photochromic material that are clear indoors and in low light and darken outdoors in sunlight can be a possible candidate for sun glasses that provide protection from bright sunlight outdoors and are suitable for use in low light conditions and/or indoors. However, lenses comprising certain photochromic materials may not darken sufficiently in bright sunny conditions in the absence of UV radiation and thus may be unsuitable for use as sunglasses in certain conditions. For example, lenses comprising certain photochromic materials that require ultraviolet radiation may not darken sufficiently inside an automobile in bright sunlight since the windshields and the windows in an automobile can filter out ultraviolet radiation. Lenses comprising certain photochromic materials may also take a long time (for example, more than 1 minute, more than 5 minutes, up to 20 minutes, or more) to fully return from a darkened state to a faded state when transitioning from bright sunlight to low light conditions or indoors. In addition, photochromic materials can have significant temperature dependency that affects the spectral profile of the different filter states, including the darkened state.

Some electrochromic materials use a substantial amount of electrical energy to change to different states and/or to maintain a state. Other types of electrochromic materials can use a lower amount of electrical energy to change states and/or to maintain a state. In some embodiments, eyewear can include electrochromic material that can be used as sunglasses that darken in bright light on application of an electrical stimulus and fade or un-darken in low light conditions and/or indoors when the electrical stimulus is removed. However, such embodiments of sunglasses may be power intensive and/or may require constant application of the electrical stimulus to maintain the darkened and/or faded state.

In certain embodiments, eyewear can darken sufficiently in bright sunlight, transition from a darkened state to un-darkened (or faded) state quickly (for example, in less than 5 minutes, in less than 1 minute), require less power to transition from a faded state to a darkened state, and/or maintain the darkened state without requiring power. In some embodiments, the eyewear can switch between a darkened state and a faded state based on an input from the user wearing the eyewear, a signal received from a control circuit or an input from a sensor. In some embodiments, the eyewear can switch between a darkened state and a faded state based on an input from a control circuit and/or sensor.

The vividness of interpreted colors is correlated with an attribute known as the chroma value of a color. The chroma value is one of the attributes or coordinates of the CIE L*C*h* color space. Together with attributes known as hue and lightness, the chroma can be used to define colors that are perceivable in human vision. It has been determined that visual acuity can be positively correlated with the chroma values of colors in a scene. In other words, the visual acuity of an observer can be greater when viewing a scene with high chroma value colors than when viewing the same scene with lower chroma value colors.

An optical filter system can be configured to remove the outer portions of a broad visual stimulus to make colors appear more vivid as perceived in human vision. The outer portions of a broad visual stimulus refer to wavelengths that, when substantially, nearly completely, or completely attenuated, decrease the bandwidth of the stimulus such that the vividness of the perceived color is increased. Thus, an optical filter system for eyewear can be configured to substantially increase the colorfulness, clarity, and/or vividness of a scene. Such an optical filter system for eyewear can allow the wearer to view the scene in high definition color (HD color). In some embodiments, portions of a visual stimulus that are not substantially attenuated include at least the wavelengths for which cone photoreceptor cells in the human eye have the greatest sensitivity. In certain embodiments, the bandwidth of the color stimulus when the optical filter is applied includes at least the wavelengths for which the cone photoreceptor cells have the greatest sensitivity. In some embodiments, a person wearing a lens incorporating an optical filter system disclosed herein can perceive a substantial increase in the clarity of a scene. The increase in perceived clarity can result, for example, from increased contrast, increased chroma, or a combination of factors.

An optical filter system can be configured to enhance the chroma profile of a scene when the scene is viewed through a lens that incorporates the optical filter system. The optical filter system can be configured to increase or decrease chroma in one or more chroma enhancement windows in order to achieve any desired effect. The chroma-enhancing optical filter system can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted.

The ability to identify and discern moving objects is generally called "Dynamic Visual Acuity." Generally, dynamic visual acuity can decrease in the darkened state of various embodiments of lenses. An increase in chroma (or chroma enhancement) in the spectral region of the moving object can improve the dynamic visual acuity because increases in chroma can be generally associated with higher color contrast. Furthermore, the emphasis and de-emphasis of specific colors can further improve dynamic visual acuity.

Various implementations of an optical filter system that can enhance chroma as described above can be included in eyewear that can transition between a darkened state and a faded state to improve dynamic visual acuity in the darkened state. Various implementations of an optical filter system that can enhance chroma as described above can be configured to controllable by a user, a sensor and/or a logic to transition between a darkened state and a faded state. The chroma enhanced optical filter system can provide additional benefits such as increasing the colorfulness, clarity, and/or vividness of a scene viewed through the sunglasses in the darkened state and/or faded state.

Overview of Eyewear

FIG. 1 illustrates an embodiment of eyewear including a pair of lenses 102a, 102b. The eyewear can be of any type, including general-purpose eyewear, special-purpose eyewear, sunglasses, driving glasses, sporting glasses, goggles, indoor eyewear, outdoor eyewear, vision-correcting eyewear, contrast-enhancing eyewear, eyewear designed for another purpose, or eyewear designed for a combination of purposes. The pair of lenses 102a, 102b can be implemented in any headworn support (i.e., a headworn article that can support one or more lenses in the wearer's field of view). For example, other headworn supports can include, but are not limited to, helmets, face masks, balaclavas, and breaching shields. The lenses 102a and 102b can be corrective lenses or non-corrective lenses and can be made of any of a variety of optical materials including glass and/or plastics, such as, for example, acrylics or polycarbonates. The lenses can have various shapes. For example, the lenses 102a, 102b can be flat, have 1 axis of curvature, 2 axes of curvature, or more than 2 axes of curvature, the lenses 102a, 102b can be cylindrical, parabolic, spherical, flat, or elliptical, or any other shape such as a meniscus or catenoid. When worn, the lenses 102a, 102b can extend across the wearer's normal straight ahead line of sight, and can extend substantially across the wearer's peripheral zones of vision. As used herein, the wearer's normal line of sight shall refer to a line projecting straight ahead of the wearer's eye, with substantially no angular deviation in either the vertical or horizontal planes. In some embodiments, the lenses 102a, 102b extend across a portion of the wearer's normal straight ahead line of sight.

The outside surface of lenses 102a or 102b can conform to a shape having a smooth, continuous surface having a constant horizontal radius (sphere or cylinder) or progressive curve (ellipse, toroid or ovoid) or other aspheric shape in either the horizontal or vertical planes. The geometric shape of other embodiments can be generally cylindrical, having curvature in one axis and no curvature in a second axis. The lenses 102a, 102b can have a curvature in one or more dimensions. For example, the lenses 102a, 102b can be curved along a horizontal axis. As another example, lenses 102a, 102b can be characterized in a horizontal plane by a generally arcuate shape, extending from a medial edge throughout at least a portion of the wearer's range of vision to a lateral edge. In some embodiments, the lenses 102a, 102b are substantially linear (not curved) along a vertical axis. In some embodiments, the lenses 102a, 102b have a first radius of curvature in one region, a second radius of curvature in a second region, and transition sites disposed on either side of the first and second regions. The transition sites can be a coincidence point along the lenses 102a, 102b where the radius of curvature of the lenses 102a, 102b transitions from the first to the second radius of curvature, and vice versa. In some embodiments, lenses 102a, 102b can have a third radius of curvature in a parallel direction, a perpendicular direction, or some other direction. In some embodiments, the lenses 102a, 102b can lie on a common circle. The right and left lenses in a high-wrap eyeglass can be canted such that the medial edge of each lens will fall outside of the common circle and the lateral edges will fall inside of the common circle. Providing curvature in the lenses 102a, 102b can result in various advantageous optical qualities for the wearer, including reducing the prismatic shift of light rays passing through the lenses 102a, 102b, and providing an optical correction.

A variety of lens configurations in both horizontal and vertical planes are possible. Thus, for example, either the outer or the inner or both surfaces of the lens 102a or 102b of some embodiments can generally conform to a spherical shape or to a right circular cylinder. Alternatively either the outer or the inner or both surfaces of the lens may conform to a frusto-conical shape, a toroid, an elliptic cylinder, an ellipsoid, an ellipsoid of revolution, other asphere or any of a number of other three dimensional shapes. Regardless of the particular vertical or horizontal curvature of one surface, however, the other surface may be chosen such as to minimize one or more of power, prism, and astigmatism of the lens in the mounted and as-worn orientation.

The lenses 102a, 102b can be linear (not curved) along a vertical plane (e.g., cylindrical or frusto-conical lens geometry). In some embodiments, the lenses 102a, 102b can be aligned substantially parallel with the vertical axis such that the line of sight is substantially normal to the anterior surface and the posterior surface of the lenses 102a, 102b. In some embodiments, the lenses 102a, 102b are angled downward such that a line normal to the lens is offset from the straight ahead normal line of sight by an angle $\Phi$. The angle $\Phi$ of offset can be greater than about 0° and/or less than about 30°, or greater than about 70° and/or less than about 20°, or about 15°, although other angles $\Phi$ outside of these ranges may also be used. Various cylindrically shaped lenses may be used. The anterior surface and/or the posterior surface of the lenses 102a, 102b can conform to the surface of a right circular cylinder such that the radius of curvature along the horizontal axis is substantially uniform. An elliptical cylinder can be used to provide lenses that have non-uniform curvature in the horizontal direction. For example, a lens may be more curved near its lateral edge than its medial edge. In some embodiments, an oblique (non-right) cylinder can be used, for example, to provide a lens that is angled in the vertical direction.

In some embodiments, the eyewear 100 incorporates canted lenses 102a, 102b mounted in a position rotated laterally relative to conventional centrally oriented dual lens mountings. A canted lens may be conceived as having an orientation, relative to the wearer's head, which would be achieved by starting with conventional dual lens eyewear having centrally oriented lenses and bending the frame inwardly at the temples to wrap around the side of the head. When the eyewear 100 is worn, a lateral edge of the lens wraps significantly around and comes in close proximity to the wearer's temple to provide significant lateral eye coverage.

A degree of wrap may be desirable for aesthetic styling reasons, for lateral protection of the eyes from flying debris, or for interception of peripheral light. Wrap may be attained by utilizing lenses of tight horizontal curvature (high base), such as cylindrical or spherical lenses, and/or by mounting each lens in a position which is canted laterally and rearwardly relative to centrally oriented dual lenses. Similarly, a high degree of rake or vertical tilting may be desirable for aesthetic reasons and for intercepting light, wind, dust or other debris from below the wearer's eyes. In general, "rake" will be understood to describe the condition of a lens, in the as-worn orientation, for which the normal line of sight strikes a vertical tangent to the lens 102a or 102b at a non-perpendicular angle.

The lenses 102a, 102b can be provided with anterior and posterior surfaces and a thickness therebetween, which can be variable along the horizontal direction, vertical direction, or combination of directions. In some embodiments, the lenses 102a, 102b can have a varying thickness along the horizontal or vertical axis, or along some other direction. In some embodiments, the thickness of the lenses 102a, 102b tapers smoothly, though not necessarily linearly, from a maximum thickness proximate a medial edge to a relatively lesser thickness at a lateral edge. The lenses 102a, 102b can have a tapering thickness along the horizontal axis and can be decentered for optical correction. In some embodiments, the lenses 102a, 102b can have a thickness configured to provide an optical correction. For example, the thickness of the lenses 102a, 102b can taper from a thickest point at a central point of the lenses 102a, 102b approaching lateral segments of the lenses 102a, 102b. In some embodiments, the average thickness of the lenses 102a, 102b in the lateral segments can be less than the average thickness of the lenses 102a, 102b in the central zone. In some embodiments, the thickness of the lenses 102a, 102b in at least one point in the central zone can be greater than the thickness of the lenses 102a, 102b at any point within at least one of the lateral segments.

In some embodiments, the lenses 102a, 102b can be finished, as opposed to semi-finished, with the lenses 102a, 102b being contoured to modify the focal power. In some embodiments, the lenses 102a, 102b can be semi-finished so that the lenses 102a, 102b can be capable of being machined, at some time following manufacture, to modify their focal power. In some embodiments, the lenses 102a, 102b can have optical power and can be prescription lenses configured to correct for near-sighted or far-sighted vision. The lenses 102a, 102b can have cylindrical characteristics to correct for astigmatism.

The eyewear 100 can include a mounting frame 104 configured to support the lenses 102a, 102b. The mounting frame 104 can include orbitals that partially or completely surround the lenses 102a, 102b. Referring to FIG. 1, it should be noted that the particular mounting frame 104 is not essential to the embodiment disclosed herein. The frame 104 can be of varying configurations and designs, and the illustrated embodiment shown in FIG. 1 is provided as examples only. As illustrated, the frame 104 may include a top frame portion and a pair of ear stems 106a, 106b that are connected to opposing ends of the top frame portion. Further, the lenses 102a, 102b may be mounted to the frame 104 with an upper edge of the lens 102a or 102b extending along or within a lens groove and being secured to the frame 104. For example, the upper edge of the lens 102a or 102b can be formed in a pattern, such as a jagged or non-linear edge, and apertures or other shapes around which the frame 104 can be injection molded or fastened in order to secure the lens 102a or 102b to the frame 104. Further, the lenses 102a, 102b can be removably attachable to the frame 104 by means of a slot with inter-fitting projections or other attachment structure formed in the lenses 102a, 102b and/or the frame 104.

It is also contemplated that the lenses 102a, 102b can be secured along a lower edge of the frame 104. Various other configurations can also be utilized. Such configurations can include the direct attachment of the ear stems 106a, 106b to the lenses 102a, 102b without any frame, or other configurations that can reduce the overall weight, size, or profile of the eyeglasses. In addition, various materials can be utilized in the manufacture of the frame 104, such as metals, composites, or relatively rigid, molded thermoplastic materials which are well known in the art, and which can be transparent or available in a variety of colors. Indeed, the mounting frame 104 can be fabricated according to various configurations and designs as desired. In some embodiments, the frame 104 is configured to retain a unitary lens that is placed in front of both eyes when the eyewear is worn. Eyewear (e.g., goggles) can also be provided that include a unitary lens that is placed in front of both eyes when the eyewear is worn. The unitary lens having features similar to the lenses 102a, 102b can be implemented in other types of headworn supports such as, but not limited to, helmets, face masks, balaclavas, and breaching shields.

In some embodiments, the ear stems 106a, 106b can be pivotably attached to the frame 104. In some embodiments, the ear stems 106a, 106b attach directly to the lenses 102a, 102b. The ear stems 106a, 106b can be configured to support the eyewear 100 when worn by a user. For example, the ear stems 106a, 106b can be configured to rest on the ears of the user. In some embodiments, the eyewear 100 includes a flexible band used to secure the eyewear 100 in front of the user's eyes in place of ear stems 106a, 106b.

Various embodiments of the lenses 102a, 102b include a lens body 108 and a lens component 110 as illustrated in FIG. 1A. The lens body 108 can have an inner surface facing the eye and an outer surface opposite the inner surface. The inner surface and/or the outer surface of the lens body 108 can be curved (e.g., convex or concave). In some embodiments, the inner and/or the outer surface of the lens body 108 can be planar. The lens component 110 can be substantially permanently affixed to the lens body 108, or the lens component 110 can be configured to be separable from the lens body 108. The lens component 110 can be attached to the inner or outer surface of the lens body 108. In some embodiments, the lens component 110 can be configured to be removable such that a user, manufacturer, or retailer can apply, remove, or change the lens component 110 after manufacture of the eyewear 100. In this way, a variety of functional elements can be introduced into the eyewear 100 increasing the possible utility of the eyewear 100 because the eyewear can be altered to provide functionality suitable for different occasions. In some embodiments, the lens component 110 includes a laminate, a coating, a flexible material, an inflexible material, an insert molded component, a chip, a gel layer, a liquid layer, an air gap, a filter, or any combination of components.

The lens body 108 can be formed of polymer, polycarbonate (or PC), allyl diglycol carbonate monomer (being sold under the brand name CR-39®), glass, nylon, polyurethane, polyethylene, polyimide, polyethylene terephthalate (or PET), biaxially-oriented polyethylene terephthalate polyester film (or BoPET, with one such polyester film sold under the brand name MYLAR®), acrylic (polymethyl methacrylate or PMMA), a polymeric material, a co-polymer, a doped material, any other suitable material, or any combination of materials. The lens body 108 can be rigid and other layers of the lens can conform to the shape of the lens body 108 such that the lens body 108 dictates the shape of the lens 102a or 102b. The lens body 108 can be symmetrical across a vertical axis of symmetry, symmetrical across a horizontal axis of symmetry, symmetrical across another axis, or asymmetrical. In some embodiments, the front and back surfaces of the lens body 108 can conform to the surfaces of respective cylinders that have a common center point and different radii. In some embodiments, the lens body can have a front and back surfaces that conform to the surfaces of respective cylinders that have center points offset from each other, such that the thickness of the lens body 108 tapers from a thicker central portion to thinner end portions. The surfaces of the lens body 108 can conform to other shapes, as discussed herein, such as a sphere, toroid, ellipsoid, asphere, plano, frusto-conical, and the like. In some embodiments, a thermoforming process, a molding process, a casting process, a lamination process, an extrusion process, an adhering process, and/or another suitable process can be used to attach the lens component 110 to the lens body 108 having a shape described herein.

The lens body 108 can be contoured during initial formation to have an optical magnification characteristic that modifies the focal power of the lens 102a or 102b. In some embodiments, the lens body 108 can be machined after initial formation to modify the focal power of the lens 102a or 102b. The lens body 108 can provide a substantial amount of the optical power and magnification characteristics to the lens 102a or 102b. In some embodiments, the lens body 108 provides the majority of the optical power and magnification characteristics. Apportioning the majority of optical power and magnification to the lens body 108 can permit selection of lens body 108 materials and lens body 108 formation techniques that provide improved lens 102a, 102b optical power and magnification characteristics, without adversely affecting selection of lens component 110 materials and formation techniques.

In various embodiments, the lens body 108 can be injection molded, although other processes can be used to form the shape of the lens blank body, such as thermoforming or machining. In some embodiments, the lens body 108 is injection molded and includes a relatively rigid and optically acceptable material such as polycarbonate. The curvature of the lens body 108 would thus be incorporated into a molded lens blank. A lens blank can include the desired curvature and taper in its as-molded condition. One or two or more lens bodies of the desired shape may then be cut from the optically appropriate portion of the lens blank as is understood in the art. In some embodiments, the frame 104 is provided with a slot or other attachment structure that cooperates with the molded and cut shape of the lens body 108 and lens component 110 to minimize deviation from, and even improve retention of its intended shape. In some embodiments, the lens body 108 can be stamped or cut from flat sheet stock and then bent into the curved configuration using a process such as thermoforming. This curved configuration can then be maintained by the use of a relatively rigid, curved frame 104, or by heating the curved sheet to retain its curved configuration.

The lens component 110 can be attached to the lens body 108, for example, through a thermally-cured adhesive layer, a UV-cured adhesive layer, electrostatic adhesion, pressure sensitive adhesives, or any combination of these. Examples of bonding technologies that may be suitable for attaching the lens component 110 to the lens body 108 include thermal welding, fusing, pressure sensitive adhesives, polyurethane adhesives, electrostatic attraction, thermoforming, other types of adhesives, materials curable by ultraviolet light, thermally curable materials, radiation-curable materials, other bonding methods, other bonding materials, and combinations of methods and/or materials. In some embodiments, any technique suitable for affixing the lens component 110 to the lens body 108 can be used. Some embodiments of a lens 102a or 102b includes a lens body 108 and a lens component 110 that are bonded together. In some embodiments, the lens component 110 and the lens body 108 can be integrally connected to each other and can be adhesively bonded together.

The lens component 110 can include a single layer or multiple layers. The lens component 110 can have one or more layers in single or multiple layer form that can be coated with a hard coat or a primer. For example, the lens component 110 can be a single layer of polycarbonate, PET, polyethylene, acrylic, nylon, polyurethane, polyimide, BoPET, another film material, or a combination of materials. As another example, the lens component can include multiple layers of film, where each film layer includes polycarbonate, PET, polyethylene, acrylic, nylon, polyurethane, polyimide, BoPET, another film material, or a combination of materials.

Each of the lens component 110 and/or lens body 108 can include one or more layers that serve various functions within the lenses 102a, 102b. In some embodiments, one or more layers in the lens component 110 and/or the lens body 108 can provide optical properties to the lenses 102a, 102b such as optical filtering, polarization, photochromism, electrochromism, photoelectrochromism and/or partial reflection of incoming visible light, chroma enhancement, color enhancement, color alteration, or any combination of these. In some embodiments, one or more layers within the lens component 110 and/or the lens body 108 can provide mechanical protection to the lenses 102a, 102b or other layers within the lens component 110, reduce stresses within the lens component 110, or improve bonding or adhesion among the layers in the lens component 110 and/or between the lens component 110 and the lens body 108. In some embodiments, the lens component 110 and/or the lens body 108 can include layers that provide additional functionality to the lenses 102a, 102b such as, for example, anti-reflection functionality, anti-static functionality, anti-fog functionality, scratch resistance, mechanical durability, hydrophobic functionality, reflective functionality, darkening functionality, aesthetic functionality including tinting, or any combination of these.

Accordingly various embodiments of the lens body 108 and/or lens component 110 can include a polarizing layer, one or more adhesive layers, a photochromic layer, an electrochromic layer, a photoelectrochomic layer, a hard coat, a flash mirror, a liquid-containing layer, an antireflection coating, a mirror coating, an interference stack, chroma enhancing dyes, an index-matching layer, a scratch resistant coating, a hydrophobic coating, an anti-static coating, chroma enhancement dyes, color enhancement elements, laser attenuation filters, trichoic filters, violet edge filter, UV filter, IR filter, glass layers, hybrid glass-plastic layers, anti-reflective coatings, contrast enhancement elements, a liquid-containing layer, a gel containing layer, a refractive index matching layer, thermal insulation layer, electrical insulation layer, electrical conducting layer, neutral density filter, other lens elements, or a combination of lens components.

As an example, the lens component 110 can include one or more layers that can serve to thermally insulate the lens component 110 such that it can be used in high temperature molding processes without subjecting the certain functional layers to temperatures sufficient to significantly degrade their optical performance. In some embodiments, the lens component 110 can serve as a thermally isolating element or vehicle that can incorporate functional elements that may be degraded if subjected to high temperature manufacturing processes. As such, the lens component 110 can be used to incorporate these types of functional elements into lenses that otherwise are formed and/or manufactured using high temperature processes. As another example, the lens component 110 can include a substrate with one or more functional coatings deposited thereon. The functional coatings can include elements that would be degraded or whose performance would be altered if subjected to high temperatures, such as certain chroma enhancement dyes. The lens component 110 could then be bonded to the lens body 108 using a UV-cured adhesive, thus thermally isolating the lens component 110 and the included functional layers from the high temperature processes associated with the manufacture of the lens body 108.

As another example of incorporating functionality into lens 102a or 102b, the lens component 110 or the lens body 108 can include layers or elements that serve to tint the lens 102a, 102b. Tinting can be added to a lens element in different ways. In some embodiments, color can be deposited on the lens element using a vapor or liquid source. The color can coat the lens element or it can penetrate into the element, and/or can be applied using a sublimation process. In some embodiments, color can be added to a material used to make the lens element, such as adding powdered color or plastic pellets to material that is extruded, injection molded, or otherwise molded into a lens element. In some embodiments where liquids are used, the color can be added by a dip process. In such embodiments, a gradient tint or bi-gradient tint can be achieved through the dip process. In certain embodiments, a liquid coloring technique can be used to tint one or more lens elements. For example, liquid dye can be added to the polymer during an injection molding process.

By applying a tint to the lens component 110 or another layer that becomes a part of the lens component 110, a substantial increase in manufacturing capacity can be realized. Another advantageous feature can be that undesired color transfer, e.g. to lens cloths of packaging, can be reduced or eliminated by not positioning the tinted layer on an exterior surface of the lens, e.g. putting the tinted layer between protective layers. Moreover, tinting can be applied to layers which do not experience high temperature processes during manufacture which can protect chromophores that may have poor heat stability. In some embodiments, tint is included in a layer, such as a functional layer or substrate layer. For example, a solution incorporating chromophores having desired chromatic properties can be applied to a functional hard coat layer that is porous. As a result, the hard coat layer can be impregnated with the chromophores. As another example, powdered dyes can be included with plastic pellets during the manufacture of the plastic. The compatible dyes can form a substantially uniform mixture with the plastic to form a tinted plastic material. In some embodiments, a tinted layer can be constructed such that chromophores can be a principal component of the layer or a smaller fraction of the tinted layer, according to the desired chromatic properties of the layer. The thickness of the layer can be adjusted to achieve a desired color profile of the lens.

Some embodiments provide for eyewear 100 having electrochromic functionality incorporated into the lens component 110 or the lens body 108. The eyewear 100 can include a power source 105, such as a battery, an electrical contact, and a conductor that conveys a voltage to an electrode in the electrochromic component layer. In some embodiments, the eyewear 100 includes control logic connected to one or more sensors for automatic adjustment of the variable filter components of the lens. The one or more sensors can comprise color sensors, visible/invisible light sensors or some other type of sensor that can detect a change in the scene and automatically adjust the attenuation state of the electrochromic component layer. The eyewear 100 can include a user interface element 107 integrated into the frame 104, the ear stems 106a, 106b, the lens 102a, 102b, or any combination of these. The user interface element 107 can be configured to allow the user to control activation and deactivation of the electrochromic layer. The user interface element 107 can be a switch, button, toggle, slide, touch-interface element, knob, other mechanical feature, or other electrical feature. For example, the user interface element 107 can include a touch-sensitive region where if a user contacts said region the electrochromic element changes state from dark to transparent or vice versa. In some embodiments, the lens 102a, 102b can include both photochromic and electrochromic layers, integrated into a single functional layer or implemented in separate functional layers. The eyewear 100 can include a sensor 109 integrated into the frame 104, the ear stems 106a, 106b, the lens 102a, 102b, or any combination of these. The sensor 109 can be configured to sense ambient light conditions (e.g., brightness of the ambient light and/or spectral characteristics of the ambient light). In some implementations, the sensor 109 can comprise a light sensor, a color sensor, a hyper-spectral camera, etc. The sensor 109 can include a control circuit that can provide a signal to activate and deactivate the electrochromic layer in response to a change in the scene (e.g., change in the ambient light of the scene, change in the chromaticity of the scene, etc.). In various implementations, the eyewear can comprise one or more eye-tracking devices that can track the user's gaze and/or size of the pupil. The one or more eye-tracking devices can comprise cameras. The one or more eye-tracking devices can be disposed on a portion of the frame that faces the user's eyes. The one or more eye-tracking devices can be configured to communicate with an electronic hardware processor that can provide a signal to activate and deactivate the electrochromic layer in response to a change in the user's gaze and/or pupil size. For example, if the one or more eye-tracking devices determine that the user's pupil size is reduced—which may be due to increase brightness of the ambient light, then the luminous transmittance and/or average visible light transmittance of the eyewear 100 may be reduced. As another example, the one or more eye-tracking devices may be configured to identify the scene towards which the user's gaze is directed towards and change optical characteristics of the lenses 102a, 102b (e.g., luminous transmittance, chromaticity, color enhancement, attenuation, etc.) based on the scene.

In another example, the lens component 110 can include a flash mirror and one or more hard coats on either side of the lens component 110. The lens body 108 can include an anti-fog coating on a surface of the lens body 108 and one or more hard coats on either side of the lens body 108. The flash mirror can be incorporated into the lens component 110 using vapor deposition techniques. The anti-fog coating can be incorporated into the lens body 108 using immersion process techniques. The lens component 110 can then be attached to the lens body 108 by way of an adhesion layer such that the flash mirror side of the lens component 110 forms the exterior side of the finished lens and the anti-fog coating of the lens body 108 forms the interior side of the finished lens. In some embodiments, the lens 102a and/or 102b can include a heated lens element that can provide anti-fog functionality. For example, an electrically conductive transparent film of indium tin oxide-based material, zinc oxide-based material, or another suitable conductive material with substantial transparency can be included in the lens 102a and/or 102b, and a voltage can be applied across it such that heat is generated. As another example, the lens 102a and/or 102b can include non-transparent filaments that heat when a voltage is applied across them, providing an anti-fog functionality.

One or more advantages can be realized in at least some circumstances when a lens function, such as, for example, an anti-reflection film, is added to a lens body by a lamination process. For example, functional elements such as optical filters, mirror elements, anti-fog layers, interference stacks, light polarizers, and photochromic layers can be incorporated into the lens 102a or 102b without using processes to coat the surface of the lens. As described herein, coating or deposition processes sometimes incorporate steps that can substantially degrade or impair certain functional lens elements or layers. Certain coating processes create surfaces that are not entirely smooth or uniform. Thus, undesirable and unpredictable optical effects that would otherwise be expected to occur in the lens 102a or 102b if the surface were coated, are reduced, minimized, or eliminated altogether when the lenses 102a, 102b are manufactured according to techniques described herein.

By incorporating some of the functionalities into the lens component 110, the lens body 108 can have a coating applied or functional layer disposed using methods such as, for example, vapor deposition without substantially altering the desirable functional attributes of the lens component 110 or the lens body 108. For example, in various embodiments, the lens body 108 can be immersion or dip coated with a hydrophobic layer. The lens component 110 can have an anti-reflection coating applied and the lens component 110 can be joined to the lens body 108 after the application of the hydrophobic layer such that the resulting lens includes both the hydrophobic functionality and the anti-reflection functionality without substantially altering the functionality of either coating.

Another advantage of incorporating functional elements into the lens component 110 and/or lens body 108 is that it provides the ability to separately manufacture each functional lens element. Thus, elements can be made in parallel and assembled to make a lens 102a, 102b having desired functional qualities, thereby increasing manufacturing capabilities and/or lowering costs. In addition, multiple functional properties can be imparted to a lens using the techniques and lens elements described herein, providing flexibility and greater capacity for creating lenses 102a, 102b with varying characteristics.

Optical Filter System Having Two or More than Two Filter States

Various embodiments of eyewear 100 can include an embodiment of a lens 102 as illustrated in FIG. 1B. The lens 102 can have structural and functional features similar to lens 102a and 102b discussed above. The lens 102 can comprise an optical filter system that has two or more than two filter states. The optical filter system can be configured to be user controllable, sensor controllable or logic controllable to switch between the two or more than two filter states. Various optical characteristics if the optical filter system, such as, for example, luminous transmittance, chromaticity, visible light transmittance, color enhancement, contrast sensitivity, etc. may be different between the two or more filter states. It is appreciated that the same optical characteristic need not change as the optical filter system switches between different states of the two or more states but different optical characteristics may change as the optical filter system switches between different pairs of the two or more states. The optical filter system can comprise one or more electroactive material and/or photoactive materials. For example, the optical filter can comprise an electrochromic material, a photochromic material, dyes, nanoparticles, liquid crystals, polymers (e.g., electrochromic polymers or electroactive polymers), solid particles, and/or other materials that can be configured to alter one or more optical characteristics of the optical filter system such as, for example, light transmittance, chromaticity, and/or chroma of light transmitted through the optical filter system in response to an optical stimulus, an electrical stimulus, an input from a user, a sensor and/or an electronic hardware processor. Various implementations of the optical filter system can comprise a single layer comprising a mixture of different electrochromic materials, photochromic materials, liquid crystals, polymers, and/or nanoparticles, having different spectral and transmittance characteristics. Some implementations of the optical filter system can comprise multiple layers. Different multiple layers can comprise electrochromic materials, photochromic materials, liquid crystals, polymers, and/or nanoparticles that are configured to provide different optical characteristics. For example, some of the multiple layers can comprise electrochromic materials, photochromic materials, liquid crystals, polymers (e.g., electrochromic polymers or electroactive polymers), and/or nanoparticles that are configured to attenuate light in the spectral range between about 440 nm and about 480 nm, 445 nm and about 480 nm, 480 nm and about 510 nm and/or between 440 nm and about 510 nm. As another example, some of the multiple layers can comprise electrochromic materials, photochromic materials, liquid crystals, polymers (e.g., electrochromic polymers or electroactive polymers), and/or nanoparticles that are configured to attenuate light in the spectral range between about 540 nm and about 560 nm, between about 540 nm and about 570 nm, between about 540 nm and about 580 nm, between about 570 nm and about 580 nm, between about 572 nm and about 576 nm, and/or, between about 540 nm and about 600 nm. As yet another example, some of the multiple layers can comprise electrochromic materials, photochromic materials, liquid crystals, polymers (e.g., electrochromic polymers or electroactive polymers), and/or nanoparticles that are configured to attenuate light in the spectral range between about 600 nm and about 630 nm, and/or, between about 630 nm and about 660 nm. Some of the multiple layers can comprise electrochromic materials, photochromic materials, liquid crystals, polymers, and/or nanoparticles that are configured to increase or decrease chroma value of light transmitted through the lens in one or more chroma enhancement windows. The one or more chroma enhancement windows can include a first spectral range of about 440 nm to about 510 nm, a second spectral range of about 540 nm to about 600 nm, a third spectral range of about 630 nm to about 660 nm, a fourth spectral range of about 440 nm to about 480 nm, a fifth spectral range of about 490 nm to about 510 nm, a sixth spectral range of about 540 nm to about 570 nm, a seventh spectral range of about 580 nm and about 600 nm or any combination of the first, second, third, fourth, fifth, sixth and seventh spectral ranges.

In some of the two or more states, the optical filter system can have an average visible light transmittance of at least 70%. The average visible light transmittance is given by the amount of incident visible light that is transmitted through the lens. For example, in some of the two or more filter states, the optical filter system can have an average visible light transmittance greater than or equal to about 70% and less than or equal to about 100%, greater than or equal to about 75% and less than or equal to about 99%, greater than or equal to about 77% and less than or equal to about 97%, greater than or equal to about 80% and less than or equal to about 95%, greater than or equal to about 82% and less than or equal to about 93%, greater than or equal to about 85% and less than or equal to about 90%, greater than or equal to about 87% and less than or equal to about 99%, greater than or equal to about 90% and less than or equal to about 100%, or any other value in the ranges/sub-ranges defined by these values. The change in the value of the average light transmittance when switching from one state to another can be greater than or equal to about 5%, greater than or equal to about 10%, greater than or equal to about 15%, greater than or equal to about 20%, and/or less than or equal to about 30%.

In some of the two or more states, the optical filter system can have an average visible light transmittance less than or equal to about 88%. For example, in some of the two or more filter states, the optical filter system can have an average visible light transmittance greater than or equal to about 8% and less than or equal to about 88%, greater than or equal to about 10% and less than or equal to about 80%, greater than or equal to about 12% and less than or equal to about 70%, greater than or equal to about 15% and less than or equal to about 60%, greater than or equal to about 20% and less than or equal to about 50%, greater than or equal to about 25% and less than or equal to about 40%, greater than or equal to about 30% and less than or equal to about 45%, greater than or equal to about 35% and less than or equal to about 40%, or any other value in the ranges/sub-ranges defined by these values. The change in the value of the average light transmittance when switching from one state to another can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

In some of the two or more states, the optical filter system can have a luminous transmittance of at least 70%. For example, in some of the two or more states, the optical filter system can have a luminous transmittance greater than or equal to about 70% and less than or equal to about 100%, greater than or equal to about 75% and less than or equal to about 99%, greater than or equal to about 77% and less than or equal to about 97%, greater than or equal to about 80% and less than or equal to about 95%, greater than or equal to about 82% and less than or equal to about 93%, greater than or equal to about 85% and less than or equal to about 90%, greater than or equal to about 87% and less than or equal to about 99%, greater than or equal to about 90% and less than or equal to about 100%, or any other value in the ranges/sub-ranges defined by these values. The luminous transmittance can be determined according to a technique defined in section 5.6.1 of the ANSI Z80.3-2009 specification for nonprescription sunglass and fashion eyewear requirements. The luminous transmittance can be measured with respect to a suitable illuminant, such as, for example, CIE standard illuminant D65. The state in which the optical filter system has a luminous transmittance of at least 70% can be referred to as the faded state. The change in the value of luminous transmittance when switching from one state to another can be greater than or equal to about 5%, greater than or equal to about 10%, greater than or equal to about 15%, greater than or equal to about 20%, and/or less than or equal to about 30%.

In some of the two or more states, the optical filter system can have a luminous transmittance less than or equal to about 88%. For example, in some of the two or more states, the optical filter system can have a luminous transmittance greater than or equal to about 8% and less than or equal to about 88%, greater than or equal to about 10% and less than or equal to about 80%, greater than or equal to about 12% and less than or equal to about 70%, greater than or equal to about 15% and less than or equal to about 60%, greater than or equal to about 20% and less than or equal to about 50%, greater than or equal to about 25% and less than or equal to about 40%, greater than or equal to about 30% and less than or equal to about 45%, greater than or equal to about 35% and less than or equal to about 40%, or any other value in the ranges/sub-ranges defined by these values. The state in which the optical filter system has a luminous transmittance less than or equal to about 70% can be referred to as the dark/darkened state. The change in the value of luminous transmittance when switching from one state to another can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

In various faded or darkened states, the lens can appear gray, clear, brown, black, violet, orange, pink, green, blue, yellow, magenta, or any other color. For example, the lens can appear gray or clear when the optical filter system is in the faded state. As another example, the lens can appear brown, green, blue, purple, orange, pink, or any combination of these colors when the optical filter system is in the darkened state. As yet another example, the lens can appear gray, brown, green, blue, purple, orange, pink, or any combination of these colors when the optical filter system is in the faded state. The chromaticity of the lens can be configured to provide a desired luminous transmittance and/or a color enhancement (e.g., chroma enhancement) that would allow the wearer to safely and efficiently perform one or more activities (e.g., a sporting activity, driving, day-to-day activities) in various light conditions (e.g., bright light condition, medium light condition or low light condition).

In various faded or darkened states, the CIE chromaticity x-value of the lens can be greater than 0 and less than 0.8 and/or the CIE chromaticity y-value of the lens can be greater than 0 and less than 0.9. For example, the CIE chromaticity x-value of the lens in various faded or darkened states can be greater than or equal to about 0.05 and less than or equal to about 0.75, greater than or equal to about 0.1 and less than or equal to about 0.7, greater than or equal to about 0.15 and less than or equal to about 0.65, greater than or equal to about 0.2 and less than or equal to about 0.6, greater than or equal to about 0.25 and less than or equal to about 0.55, greater than or equal to about 0.3 and less than or equal to about 0.5, greater than or equal to about 0.35 and less than or equal to about 0.45, greater than or equal to about 0.3 and less than or equal to about 0.35, greater than or equal to about 0.3 and less than or equal to about 0.34, greater than or equal to about 0.35 and less than or equal to about 0.5, or any value in the ranges/sub-ranges defined by these values.

As another example, the CIE chromaticity y-value of the lens in various faded or darkened states can be greater than or equal to about 0.05 and less than or equal to about 0.83, greater than or equal to about 0.1 and less than or equal to about 0.8, greater than or equal to about 0.15 and less than or equal to about 0.75, greater than or equal to about 0.2 and less than or equal to about 0.7, greater than or equal to about 0.25 and less than or equal to about 0.65, greater than or equal to about 0.3 and less than or equal to about 0.6, greater than or equal to about 0.35 and less than or equal to about 0.55, greater than or equal to about 0.4 and less than or equal to about 0.5, greater than or equal to about 0.15 and less than or equal to about 0.3, greater than or equal to about 0.35 and less than or equal to about 0.65, or any value in the ranges/sub-ranges defined by these values. The change in the CIE chromaticity x-value or y-value when switching from one state to another can be greater than or equal to about 0.05, greater than or equal to about 0.1, greater than or equal to about 0.15, greater than or equal to about 0.2, greater than or equal to about 0.25, greater than or equal to about 0.3, greater than or equal to about 0.35, greater than or equal to about 0.4, greater than or equal to about 0.45, greater than or equal to about 0.5, greater than or equal to about 0.55, and/or less than or equal to about 0.7, and/or less than or equal to about 0.8, and/or less than or equal to about 0.9.

The optical filter system can be configured to enhance chroma of a scene viewed through the lens in a respective one of the two or more states as compared to the chroma of a scene viewed through a lens with a neutral density optical filter having the same luminous transmittance as the luminous transmittance of the optical filter system in the respective state. In a respective one of the two or more states, the optical filter system can be configured to provide an increase or a decrease in chroma value of a 30 nm wide light stimulus of uniform intensity averaged over the spectral bandwidth of the one or more chroma enhancement windows identified above when the center wavelength of the 30 nm wide light stimulus lies within the spectral bandwidth as compared to a neutral density filter having the same integrated light transmittance within each 30 nm stimulus band as within each corresponding spectral bandwidth of the optical filter system. The neutral density filter is a uniform attenuation filter.

For example, in some or all of the two or more states, the optical filter system can be configured to provide an increase or decrease in average chroma value of light transmitted through the lens within one or more chroma enhancement windows. The one or more chroma enhancement windows can include a first spectral range of about 440 nm to about 510 nm, a second spectral range of about 540 nm to about 600 nm, a third spectral range of about 630 nm to about 660 nm, a fourth spectral range of about 440 nm to about 480 nm, a fifth spectral range of about 490 nm to about 510 nm, a sixth spectral range of about 540 nm to about 570 nm, a seventh spectral range of about 580 nm and about 600 nm or any combination of the first, second, third, fourth, fifth, sixth and seventh spectral ranges.

As another example, in some or all of the two or more states, the optical filter system can be configured increase average chroma value of light transmitted through the lens within one or more chroma enhancement windows by about 2% or more as compared to a neutral density filter. The neutral density filter is a uniform attenuation filter. The average increase in chroma value of light transmitted through the lens within one or more chroma enhancement windows can be about 3% or more, 5% or more, 10% or more, 15% or more or 20% or more as compared to a neutral density filter.

The change in the average chroma value in one or more of the chroma enhancement windows when switching from one state to another can be greater than or equal to about 5%, greater than or equal to about 10%, greater than or equal to about 15%, greater than or equal to about 20%, greater than or equal to about 25%, greater than or equal to about 30%, greater than or equal to about 35%, and/or less than or equal to about 50%, and/or less than or equal to about 60%.

Various implementations of the optical filter system can be configured to switch between (i) a faded state and a darkened state, (ii) two different faded states, or (iii) two different darkened states in response to an electrical stimulus, an optical stimulus, an input provided by the user, a signal from a sensor or an electronic hardware processor. At least one of a luminous transmittance, a color enhancement, a chroma enhancement, chromaticity of the optical filter system, or, contrast sensitivity can be different between the two or more switchable states. For example, in some implementations, the luminous transmittance of the optical filter system can be different between the two or more switchable states. As another example, in some implementations, the relative chroma value of the scene viewed through the optical filter system can be different between the two or more switchable states. As yet another example, in some implementations, the chromaticity of the optical filter system can be different between the two or more switchable states. As another example, the absorbance and/or the absorptance spectrum of visible light transmitted through the optical filter system can be different between the two or more switchable states.

The switching time to switch between the two or more states can be greater than about 100 ms and less than about 10 s. For example, the switching time to switch between the two or more states can be greater than or equal to about 500 ms and less than or equal 9 s, greater than or equal to about 1 s and less than or equal 8.5 s, greater than or equal to about 3 s and less than or equal 8 s, greater than or equal to about 3.5 s and less than or equal 7.5 s, greater than or equal to about 4 s and less than or equal 7 s, greater than or equal to about 4.5 s and less than or equal 6.5 s, greater than or equal to about 5 s and less than or equal 6 s, or any value in the ranges/sub-ranges defined by these values.

It is appreciated that one or more optical characteristics need not change when the optical filter system switches between the two or more states. For example, consider an optical filter system that is configured to be switchable between three states. Such an optical filter system can be configured such that the CIE chromaticity x-value or y-value changes when the optical filter system switches from a first state to a second state while the luminous transmittance, average chroma value in one or more spectral regions, and the value of maximum absorbance/absorptance in one or more spectral regions remains the same. The optical filter system can be configured such that the value of maximum absorbance/absorptance in one or more spectral regions changes when the optical filter system switches from the first state to a third state while CIE chromaticity x-value or y-value, luminous transmittance, and average chroma value in one or more spectral regions remains the same. The optical filter system can be further configured such that the value of maximum absorbance/absorptance in one or more spectral regions, the average chroma value in one or more spectral regions and the luminous transmittance changes when the optical filter system switches from the second state to the third state while CIE chromaticity x-value or y-value remains the same.

The optical filter system described herein can comprise one or more optical filters with variable optical characteristics or a combination of one or more optical filters with variable optical characteristics and one or more of optical filters with fixed optical characteristics (also referred to herein as static or fixed optical filters) as described in detail below.

Lens with One or More Optical Filters with Variable Optical Characteristics and One or More Optical Filters with Fixed Optical Characteristics The lens 102 can comprise an optical filter system comprising a an optical filter with variable optical characteristics (also referred to as a variable optical filter) including a variable filter component 114 and an optical filter with fixed optical characteristics (also referred to as a static filter) including a static filter component 116. As discussed above, the optical filter with variable optical characteristics can alter the optical characteristics in response to an electrical stimulus and/or an optical stimulus. In various implementations, one or more optical characteristics of the variable optical filter can be controlled by an input provided by a user and/or a signal provided by a sensor or an electronic hardware processor. In various embodiments, the variable filter component 114 can be referred to as a dynamic filter component. In various embodiments, the static filter component 114 can be referred to as a fixed filter component. The optical filter system is configured to switch between two or more filter states. For example, in some implementations, the optical filter system is configured to switch between a first state and a second state. In some embodiments, the optical filter system is configured to switch to additional states (e.g., a third state or a fourth state), such that the filter has three or more than three filter states. The first state can have a first luminous transmittance and the second state can have a second luminous transmittance. As used herein, luminous transmittance can be measured with respect to a standard daylight illuminant, such as CIE illuminant D65. In various embodiments, the first luminous transmittance can be greater than or equal to the second luminous transmittance. For example, the first luminous transmittance can be lower than the second luminous transmittance such that the lens is in a dark state when the optical filter system is in the first state and the lens in a faded state when the optical filter system is in the second filter state. In various embodiments, the first luminous transmittance can be less than about 30%. For example, the first luminous transmittance can be less than about 5%, less than about 8%, less than about 10%, less than about 12%, less than about 15%, less than about 18%, less than about 20% or less than about 25%. In various embodiments, the second luminous transmittance can be greater than about 10%. For example, the second luminous transmittance can be greater than about 15%, greater than about 20%, greater than about 25%, greater than about 30%, greater than about 35%, greater than about 40%, greater than about 50%, greater than about 60%, greater than about 70%, greater than about 80%, greater than about 85% or greater than about 90%. In some embodiments, the variable filter component of the optical filter system can have filter states that shift between any of the luminous transmittance values identified in the preceding sentence.

Lenses disclosed herein can have a variety of colors or any desired color. For example, in various embodiments, the lens 102 can appear dark grey, dark brown, dark persimmon, dark yellow, dark red, dark rose, dark green or dark blue when it is configured to be in the first state. In various embodiments, the lens 102 can appear light grey, light brown, persimmon, yellow, red, rose, light green or light blue when it is configured to be in the second state. In various embodiments, the lens 102 can appear clear when it is configured to be in the second state.

In some embodiments, the lens 102 can be configured to switch between the first and the second state based on an input from a user wearing the eyewear 100 comprising the lens 102, a signal from a control circuit, a signal from an electronic hardware processor, or an input from a sensor. In some embodiments, the lens 102 can be configured to switch between the first and the second state based on a voice command (e.g., commanding "light" or "dark") from the user. In some embodiments, the lens 102 can be configured to switch between the first and the second state in response to an electrical signal. In some embodiments, the lens 102 can be configured to switch between the first and the second state in response to exposure to electromagnetic radiation. In different embodiments, other methods of switching between the first and the second state can be employed, such as automatic switching. The lens 102 can be configured such that the lens can maintain the desired state (first filter state or second filter state) without requiring energy. In some implementations, activation energy (e.g., electrical energy, optical energy, or thermal energy) can be provided if the optical characteristics of the lens drift from the desired filter state.

Embodiments of eyewear including electro-optically controllable material that can switch between a first state and a second state are described in International Publication No. WO 2011/127015 which is incorporated by reference herein in its entirety. Embodiments of eyewear with variable transmittance optical filters comprising one or more chromophores that have electrochromic and photochromic properties are described in U.S. Publication No. 2012/0044560 which is incorporated by reference herein in its entirety.

The optical filter system can include a chroma enhancement material (for example, a dye, a rare earth oxide, etc.) that increases chroma in at least one chroma enhancement window. Enhancing chroma in at least one chroma enhancement window can advantageously increase dynamic visual acuity of the lens 102 in the first and/or the second state. Additionally, enhancing chroma in at least one chroma enhancement window can increase colorfulness, clarity, and/or vividness of a scene viewed through the lens 102 in the first and/or second state. Embodiments of eyewear including one or more optical filters with chroma enhancement material that increase chroma in at least one chroma enhancement window are described in U.S. Publication No. 2011/0255051 which is incorporated by reference herein in its entirety.

In various embodiments, the variable filter component 114 can provide the functionality of switching between the first and second state. In various embodiments, the static filter component 116 can provide chroma enhancement. In some embodiments the variable filter component 114 can include one or more chroma enhancement materials such that the static filter component is incorporated in the variable filter component 114. The variable filter component 114 and the static filter component 116 can be a part of the lens component 110 discussed above. In various embodiments, the variable filter component 114 can be disposed with respect to the static filter component 116 such that the variable filter component 114 and the static filter component 116 are directly adjacent each other. In other embodiments, the variable filter component 114 and the static filter component 116 can include interleaving layers between them.

Various embodiments of the variable filter component 114 can include electrochromic material, photochromic material or a combination of electrochromic and photochromic material. Various embodiments of the variable filter component 114 can comprise electrochromic materials comprising transition metal oxide, such as, for example, $WO_3$, $NiO_x$, $V_2O_5$. Various embodiments of the variable filter component 114 can comprise electrochromic materials comprising complex ionic compounds, such as, for example, $Fe_4[Fe(CN)_6]_3$. Various embodiments of the variable filter component 114 can comprise electrochromic polymeric materials. Various embodiments of the variable filter component 114 can comprise solid particles, nano particles or liquid crystals. Examples of variable optical filters including electrochromic material, photochromic material or a combination of electrochromic and photochromic material are described in International Publication No. WO 2011/127015 and U.S. Publication No. 2012/0044560, each of which is incorporated by reference herein in its entirety. Examples of optical filters including electrochromic material, photochromic material or a combination of electrochromic and photochromic material are also described in International Publication No. WO 2013/169987 which is incorporated by reference herein in its entirety. In various embodiments, the static filter component 116 can include chroma enhancing material (e.g., dyes, rare earth oxides, etc.). Examples of static optical filters including chroma enhancing material are described in U.S. Publication No. 2011/0255051 which is incorporated by reference herein in its entirety. Embodiments of variable filter component 114 and static filter component 116 are described in further detail below.

Various embodiments of the optical filter system can include an edge filter that absorbs wavelengths at the violet edge of the visible spectrum. The absorbance spectrum of the edge filter has an optical density greater than a threshold value (A) for wavelengths at the violet edge of the visible spectrum and a bandwidth (B) which is equal to the difference between the wavelength in the visible spectrum ($\lambda_0$) at which the absorbance spectrum of the edge filter has an optical density 50% of the threshold value A and the edge of the visible spectrum ($\lambda_{edge}$). Without subscribing to any particular theory, optical density is equal to a logarithmic ratio of the radiation incident on the filter to the radiation transmitted through the filter. Thus, optical density can be calculated by the equation $$-\log_{10}\frac{I_1}{I_0},$$

where $I_1$ is the intensity of the radiation of transmitted through the filter and $I_0$ is the intensity of the radiation incident on the filter. In various embodiments of the edge filter, the threshold value A can be greater than or equal to about 2, greater than or equal to about 3, greater than or equal to about 4, and/or less than or equal to about 100.

In various embodiments of the edge filter, the bandwidth B can be greater than or equal to about 5 nm, greater than or equal to about 10 nm, greater than or equal to about 20 nm, less than or equal to about 100 nm, less than or equal to about 80 nm, less than or equal to about 50 nm, and/or less than or equal to about 30 nm. In some embodiments, the edge filter has an optical density greater than about 2.5 for wavelengths less than about 410 nm. The edge filter can be included in the variable filter component 114, in the static filter component 116 or provided as a separate component. In various embodiments, the edge filter can be an UV light absorbing filter. In some embodiments, the optical filter system can include an UV light absorbing filter.

The lens 102 can include additional laminates, coatings, and other lens elements that impart desired functionality to the eyewear, including, for example an interference stack, a flash mirror, photochromic layer(s), electrochromic layer(s), anti-reflective coating, anti-static coating, liquid containing layer, polarizing elements, chroma enhancing dyes, color enhancing elements, contrast enhancing elements, trichoic filters, or any combination of these. The functional layers can include sub-layers, which can individually or in combination incorporate one or more functions into the lens 102. Various embodiments of the optical filter system can include a laser attenuation filter.

Variable Filter Component

In various embodiments, the variable filter component 114 can include photochromic compositions that darken in bright light and fade in lower light environments. Such compositions can include, for example, but without limitation, silver, copper, and cadmium halides. Photochromic compounds for lenses are disclosed in U.S. Pat. Nos. 6,312, 811, 5,658,502, 4,537,612, each of which are hereby expressly incorporated in its entirety herein by reference. Examples of photochromic material for lenses are also described in International Publication No. WO 2013/169987 which is incorporated by reference herein in its entirety. A lens 102 incorporating one or more layers including photochromic compositions would thus provide relatively little light attenuation when used in a lower light environment, but would automatically provide increased light attenuation when used in bright light, such as when worn outdoors. Thus, in some embodiments, the lens can be suitable for use in both indoor and outdoor environments. In certain embodiments, the photochromic compositions can selectively alter the chroma enhancing effect of a lens. For example, eyewear can be configured to transition from a neutral gray or clear chromaticity to an activity-specific non-neutral chromaticity upon substantial exposure to sunlight.

In various embodiments, the variable filter component 114 can comprise an electrochromic device. The electrochromic device can be flexible. In various implementations, the electrochromic device can include an electrochromic conducting polymer layer, a conductive reflective layer, counter electrode and a liquid or a solid electrolyte. The liquid electrolyte may comprise, for example, a mixture of sulfuric acid, poly(vinyl sulfate), and poly(anethosulfonate). The solid electrolyte may comprise, for example, a mixture of sulfuric acid, poly(vinyl sulfate), poly(anethosulfonate), and poly(vinyl alcohol). The electrochromic conducting polymer layer may comprise, for example, poly(diphenyl amine), poly(4-amino biphenyl), poly(aniline), poly(3-alkyl thiophene), poly(phenylene), poly(phenylene vinylene), poly(alkylene vinylenes), poly(amino quinolines), or poly (diphenyl benzidine) and one or more dopants such as poly(styrene sulfonate), poly(anethosulfonate), poly(vinyl sulfate), p-toluene sulfonate, trifluoromethane sulfonate, and poly(vinyl stearate). Methods of manufacturing such electrochromic devices are disclosed in U.S. Pat. No. 5,995,273 which is incorporated by reference herein in its entirety. In various implementations, the variable filter component 114 can comprise a complimentary polymer or "dual-polymer" electrochromic device. Such devices and methods of fabricating them are disclosed in U.S. Publication No. 2013/0120821 which is incorporated by reference herein in its entirety. In various implementations, the variable filter component 114 can comprise variable-emittance, electrochromic devices including IR-active conducting polymers. Such devices and methods of fabricating them are disclosed in U.S. Publication No. 2014/0268283 which is incorporated by reference herein in its entirety which is incorporated by reference herein in its entirety.

In various embodiments, the variable filter component 114 can include one or more chromophores that have electrochromic and photochromic properties. Examples of chromophores that have electrochromic and photochromic properties are described in U.S. Publication No. 2012/0044560 which is incorporated by reference herein in its entirety.

In various embodiments, the variable filter component 114 can include an electrochromic functional layer including an electrochromic material that darkens and fades in response to an electrical stimulation (e.g., an electrical voltage, an electrical current or an electrical impulse). The electrochromic functional layer can include a dichroic dye guest-host device configured to provide variable light attenuation. Examples of electrochromic material for lenses are described in International Publication No. WO 2013/169987 which is incorporated by reference herein in its entirety. Examples of electrochromic material for lenses are also described in International Publication No. WO 2011/127015 which is incorporated by reference herein in its entirety. An electrode can be electrically coupled to the electrochromic functional layer. A power source (e.g., 105 of eyewear 100 in FIG. 1), such as a battery, can be attached to the eyewear 100 and electrically coupled to the electrode coupled to the electrochromic functional layer via a conductor. In various embodiments, the conductor can be embedded in the frame 104 of the eye wear 100 and/or the ear stems 106a, 106b. Changing the amount of power provided to the electrode changes a state of the electrochromic material. A user interface element (e.g., 107 of eyewear 100 in FIG. 1) can be disposed on the eyewear and configured to change an amount of power provided to the electrode from the power source. The user interface element can be integrated into the frame 104, the ear stems 106, the lens 102, or any combination of these. The user interface element can be configured to allow the user to control activation and deactivation of the electrochromic material. The user interface element can be a switch, button, toggle, slide, touch-interface element, knob, other mechanical feature, or other electrical feature. For example, the user interface element can include a touch-sensitive region where if a user contacts said region the electrochromic material changes state from dark with reduced light transmittance to faded with increased light transmittance. In various implementations, a sensor circuit (e.g., sensor 109 including a control circuit of eyewear 100 in FIG. 1) can be disposed on the eyewear and configured to change an amount of power provided to the electrode from the power source. In some embodiments, the sensor circuit (e.g., sensor 109 including a control circuit of eyewear 100 in FIG. 1) can be configured to provide the desired power to the electrode.

As discussed above, the electrochromic functional layer can include a dichroic dye guest-host device configured to provide variable light attenuation. For example, a functional layer can include spaced substrates coated with a conducting layer, an alignment layer, and preferably a passivation layer. Disposed between the substrates is a guest-host solution which includes a host material and a light-absorbing dichroic dye guest. Power can be supplied to the functional layer through a power source (e.g., a battery) in the host eyewear. The power source provides a supply of electrical power to the conducting layers. Adjustment of the power supply alters the orientation of the host material which in turn alters the orientation of the dichroic dye. Light is absorbed by the dichroic dye, depending upon its orientation, and thus provides variable light attenuation, that can be manually adjusted by the wearer. Such a dichroic dye guest-host device is disclosed in U.S. Pat. No. 6,239,778, the entire contents of which are expressly incorporated herein by reference and made a part of this specification.

In various embodiments, a multi-layer interference coating including two or more thin film layers of high refractive index material and two or more thin film layers of low refractive index material can be disposed on the electrochromic functional layer. In some embodiments, the lens 102 includes both photochromic and electrochromic layers, integrated into a single functional layer or implemented in separate functional layers.

In some embodiments, the electrochromic functional layer is produced by depositing a composition containing a cross-linkable polymer onto a suitable support followed by in situ crosslinking. For example, a polymerizable composition can be applied onto a glass plate coated with a layer of $WO_3$ and a tin oxide conductive sublayer, and photopolymerized by UV irradiation to obtain a membrane that is optically transparent in the visible range and adherent to the support. The membrane can then be assembled with a counterelectrode formed on a glass plate bearing a layer of hydrogenated iridium oxide $H_xIrO_2$ and a tin oxide sublayer. The polymerizable composition can be formed from the lithium salt of trifluoro-methanesulfonyl(1-acryloyl-2,2,2-tri-fluoroethanesulfonyl)imide, poly(theylene glycol) dimethacrylate, silica particles, and xanthone. In some embodiments, an electrochromic layer is formed by two electrochromic layers separated by a film of ion-conducting material. Each electrochromic layer can be borne by a substrate coated with a conductive oxide, an indium tin oxide-based material, a zinc oxide-based material, or another type of conductive layer. The ion-conducting material forms an ion-conducting polymer electrolyte and is formed by a proton-conducting polymer, for example a 2-acrylamido-2-methylpropanesulfonic acid homopolymer. The polymer film can be produced by depositing onto one of the electrodes a liquid reaction mixture containing the polymer precursor dissolved in a liquid solvent, for example a mixture of water and NMP. In some embodiments, an electrochromic layer includes an electrode and a counter-electrode separated by a solid polymer electrolyte, the electrode being formed by a transparent substrate bearing an electronically conductive film coated with a film of a cathode active material with electrochromic properties, the counterelectrode being formed by a transparent substrate bearing an electronically conductive film coated with a film of an anode active material with electrochromic properties, the electrolyte being formed by an ion-conducting material including a salt dissolved in a solvating solid polymer. The electrochromic layer can be characterized in that the electrolyte membrane is intercalated in the form of a composition of low viscosity free of volatile liquid solvent and including a polymer or a polymer precursor and a salt.

Static Filter Component

In some embodiments, the optical filter system comprises a static filter component 116 having a luminous transmittance less than or equal to about 80%, less than or equal to about 70%, less than or equal to about 60%, less than or equal to about 50%, less than or equal to about 45%, less than or equal to about 40%, greater than or equal to about 10%, greater than or equal to about 20%, greater than or equal to about 30%, and/or greater than or equal to about 40%.

In various embodiments, the static filter component 114 can include a chroma-enhancing optical filter to provide chroma enhancement. The chroma-enhancing filter generally changes the colorfulness of a scene viewed through the lens 102 compared to a scene viewed through a lens with the same luminous transmittance but a different spectral transmittance profile (e.g., a flat filter profile). Embodiments of chroma-enhancing filters are described in U.S. Publication No. 2011/0255051 which is incorporated by reference herein in its entirety.

The static filter component 116 can be configured to enhance the chroma profile of a scene when the scene is viewed through the lens 102. The static filter component 116 can be configured to increase or decrease chroma in one or more chroma enhancement windows in order to achieve any desired effect. The one or more chroma enhancement windows can include a first spectral range of about 440 nm to about 510 nm, a second spectral range of about 540 nm to about 600 nm, a third spectral range of about 630 nm to about 660 nm, or any combination of the first, second, and third spectral ranges. The static filter component 116 can be configured to preferentially transmit or attenuate light in any desired chroma enhancement windows. Any suitable process can be used to determine the desired chroma enhancement windows. For example, the colors predominantly reflected or emitted in a selected environment can be measured, and static filter component 116 can be adapted to provide chroma enhancement in one or more spectral regions corresponding to the colors that are predominantly reflected or emitted.

In certain embodiments, the static filter component 116 is configured to increase or maximize chroma in the blue-green region of the visible spectrum. A filter with such a configuration can provide an absorbance peak with a maximum absorbance value at a wavelength of about 475 nm, of about 450 nm, or between about 445 nm and about 480 nm. The bandwidth of the absorbance peak at 80% of the maximum absorbance value can be greater than or equal to about 5 nm and/or less than or equal to 40 nm. In various embodiments, the bandwidth of the absorbance peak at 80% of the maximum absorbance value can be greater than or equal to about 10 nm, greater than or equal to about 15 nm, greater than or equal to about 20 nm, or another suitable value.

In certain embodiments, the static filter component 116 is configured to increase or decrease chroma in the green-yellow region of the visible spectrum. A filter with such a configuration can provide an absorbance peak with a maximum absorbance value at a wavelength of about 575 nm, of about 550 nm, or between about 550 nm and about 580 nm. The bandwidth of the absorbance peak at 80% of the maximum absorbance value can be greater than or equal to about 5 nm and/or less than or equal to 40 nm. In various embodiments, the bandwidth of the absorbance peak at 80% of the maximum absorbance value can be greater than or equal to about 10 nm, greater than or equal to about 15 nm, greater than or equal to about 20 nm, or another suitable value.

In certain embodiments, the static filter component 116 is configured to increase or decrease chroma in the orange-red region of the visible spectrum. A filter with such a configuration can provide an absorbance peak with a with a maximum absorbance value at a wavelength of about 650 nm, of about 660 nm, or between about 630 nm and about 680 nm. The bandwidth of the absorbance peak at 80% of the maximum absorbance value can be greater than or equal to about 5 nm and/or less than or equal to 40 nm. In various embodiments, the bandwidth of the absorbance peak at 80% of the maximum absorbance value can be greater than or equal to about 10 nm, greater than or equal to about 15 nm, greater than or equal to about 20 nm, or another suitable value.

In certain embodiments, the static filter component 116 is configured to increase or decrease chroma across several, many, or most colors, or at least many colors in the visible spectrum that are commonly encountered in the environment of the wearer. A filter with such a configuration can include a plurality of absorbance peaks having maximum absorbance value at wavelengths of about 415 nm, about 478 nm, about 574 nm, about 660 nm, about 715 nm, etc. The bandwidth of each absorbance peak at 80% of the maximum absorbance value can be greater than or equal to about 10 nm, greater than or equal to about 15 nm, greater than or equal to about 20 nm, or another suitable value. Many other variations in the location and number of absorbance peaks are possible. For example, some embodiments significantly attenuate light between about 558 nm and about 580 nm by providing a peak having maximum absorbance value at about 574 nm and adding an additional peak having maximum absorbance value at about 561 nm. Such embodiments can provide substantially greater chroma in the yellow-green region, including at wavelengths near about 555 nm.

Static filter component 116 that increases or decreases chroma in one or more chroma enhancement windows can include dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification. Some embodiments of interference coatings are sold by Oakley, Inc. of Foothill Ranch, Calif., U.S.A. under the brand name Iridium®.

In certain embodiments, the static filter component 116 can include one or more organic dyes that provide absorbance peaks having a maximum absorbance value at one or more wavelengths in the visible spectrum. For example, in some embodiments, the static filter component 116 can incorporate organic dyes supplied by Exciton of Dayton, Ohio. At least some organic dyes supplied by Exciton are named according to the approximate wavelength at which the absorbance peak has a maximum absorbance value. For example, the organic dyes Exciton ABS 407, ABS 473, ABS 574, ABS 647 and ABS 659 supplied by Exciton provide absorbance peaks having a maximum absorbance value at about 407 nm, 473 nm, 574 nm, 647 nm and 659 nm.

Other dyes can also be used to provide substantial increases in chroma. For example, Crysta-Lyn Chemical Company of Binghamton, N.Y. offers DLS 402A dye, with an absorbance peak having a maximum absorbance value at 402 nm, DLS 461B dye that provides an absorbance peak having a maximum absorbance value at 461 nm, DLS 564B dye that provides an absorbance peak having a maximum absorbance value at 564 nm and DLS 654B dye that provides an absorbance peak having a maximum absorbance value at 654 nm.

In some embodiments, two or more dyes can be used to create a single absorbance peak or a plurality of absorbance peaks in close proximity to one another. For example, an absorbance peak having a maximum absorbance value at a wavelength between about 555 nm and about 580 nm can be created using two dyes having absorbance peaks with maximum absorbance values at about 561 nm and 574 nm. In another embodiment, an absorbance peak having a maximum absorbance value between about 555 nm and about 580 nm can be created using two dyes having absorbance peaks with maximum absorbance values at about 556 nm and 574 nm. While each dye can individually produce an absorbance peak having a FWHM value of less than about 30 nm, when the dyes are used together in an optical filter, the absorbance peaks can combine to form a single absorbance peak with a bandwidth of about 45 nm or greater than or equal to about 40 nm.

Static filter component 116 incorporating organic dyes can be fabricated using any suitable technique. In some embodiments, a sufficient quantity of one or more organic dyes is used to provide absorbance peaks having maximum absorbance values at one or more wavelengths selected to increase or decrease chroma in one or more chroma enhancement windows. Selected organic dyes can be loaded (or mixed) in an amount of a solvent (e.g. 1 lb of polycarbonate resin or 5 lbs of polycarbonate resin) to achieve an absorbance spectrum including absorbance peaks having maximum absorbance values at one or more wavelengths. The amount of each of the selected organic dye is based on the desired optical density (OD) at the wavelengths of the absorbance peak produced by each of the selected organic dyes. Different compositions of chroma enhancement dyes that provide chroma enhancement are described in U.S. Publication No. 2013/0141693 which is incorporated by reference herein in its entirety. The polycarbonate resin including the selected organic dyes can be used to manufacture the body of the lens 102 or a component that is attached to the body of the lens 102. Different methods of fabricating optical filters that provide chroma enhancement are described in U.S. Publication No. 2013/0141693 which is incorporated by reference herein in its entirety.

In various embodiments, the static filter 116 can include dyes or other materials that are selected or configured to increase the photostability of the chroma enhancing filter and other lens components. Any technique known in the art can be used to mitigate degradation of filter materials and/or other lens components. The relative quantities of any dye formulations disclosed herein can be adjusted to achieve a desired objective, such as, for example, a desired overall lens color, a chroma-enhancing filter having particular properties, another objective, or a combination of objectives.

Lens with One or More Optical Filters with Variable Optical Characteristics

In various implementations, the lens 102 can comprise one or more optical filters with variable optical characteristics (also referred to as variable optical filters) that can be switched between two or more states in response to an electrical stimulus and/or an optical stimulus. In some implementations, the optical characteristics of the variable optical filters can be controlled by an input provided by the user, a signal provided by a sensor and/or a signal provided by an electronic hardware processor. The one or more variable optical filters can comprise one or more layers comprising electrochromic materials, photochromic materials, solid particles, nano particles, liquid crystals or polymers. For example, the one or more variable optical filters can comprise one or more layers of electrochromic materials comprising transition metal oxide, such as, for example, $WO_3$, $NiO_x$, $V_2O_5$. As another example, the one or more variable optical filters can comprise one or more layers of electrochromic materials comprising complex ionic compounds, such as, for example, $Fe_4[Fe(CN)_6]_3$. As yet another example, the one or more variable optical filters can comprise one or more layers comprising one or more electrochromic polymers. The one or more electrochromic polymers can be configured to selectively attenuate certain wavelengths of light in response to an electrical voltage or current. Accordingly, in some implementations, the lens 102 comprising the one or more electrochromic polymers may be configured to switch from a clear appearance to a colored (e.g., blue, violet, purple, gray, brown, green, orange, pink, red, or any combination of these colors) appearance in response to an electrical voltage or current.

The lens 102 comprising the one or more variable optical filters can comprise various electrochromic materials (e.g., electrochromic polymers, transition metal oxides, complex ionic compounds, etc.) that can be controlled to provide one or more absorptance or absorbance peaks having a maximum absorptance or absorbance. The one or more absorptance or absorbance peaks can have a center wavelength located at a midpoint of the spectral bandwidth of a respective one of the one or more absorptance or absorbance peaks. The spectral bandwidth of a respective one of the one or more absorptance or absorbance peaks can be equal to the full width of the respective one of the absorptance or absorbance peak at 90% of the maximum, 80% of the maximum, 75% of the maximum, 60% of the maximum, or 50% of the maximum. The spectral bandwidth of a respective one of the one or more absorptance or absorbance peaks can be less than or equal to about 30 nm. For example, the spectral bandwidth of a respective one of the one or more absorptance or absorbance peaks can be greater than or equal to about 5 nm and less than or equal to about 30 nm, greater than or equal to about 8 nm and less than or equal to about 25 nm, greater than or equal to about 10 nm and less than or equal to about 20 nm, greater than or equal to about 12 nm and less than or equal to about 18 nm, or any value in the ranges/sub-ranges defined by these values. The one or more absorptance or absorbance peaks can comprise an attenuation factor that is obtained by dividing an integrated absorptance peak area within the spectral bandwidth of the absorptance or absorbance peak by the spectral bandwidth of the absorptance or absorbance peak. The attenuation factor of the one or more absorptance or absorbance peaks can be between about 0.8 and 1.0.

The lens 102 comprising the one or more variable optical filters can be controlled to switch between two or more states. In some or all of the two or more states, the lens 102 can be configured such that the maximum absorptance or absorbance of the one or more absorptance or absorbance peaks is located in one or more chroma enhancement windows. The one or more chroma enhancement windows can include a first spectral range of about 440 nm to about 510 nm, a second spectral range of about 540 nm to about 600 nm, a third spectral range of about 630 nm to about 660 nm, a fourth spectral range of about 440 nm to about 480 nm, a fifth spectral range of about 490 nm to about 510 nm, a sixth spectral range of about 540 nm to about 570 nm, a seventh spectral range of about 580 nm and about 600 nm, an eighth spectral range of about 572 nm and about 576 nm or any combination of the first, second, third, fourth, fifth, sixth, seventh, and eighth spectral ranges. In some embodiments, the value of the maximum absorptance within one or more chroma enhancement windows is greater than or equal to about 70%, greater than or equal to about 80%, greater than or equal to about 90%, greater than or equal to about 95%, and/or less than or equal to 100%. In some embodiments, the value of the maximum absorbance (or maximum optical density) within one or more chroma enhancement windows is greater than or equal to about 0.5, greater than or equal to about 1, greater than or equal to about 1.5, greater than or equal to about 2.0, greater than or equal to about 2.5, greater than or equal to about 3.0, greater than or equal to about 3.5, greater than or equal to about 4.0, greater than or equal to about 4.5, greater than or equal to about 5.0 and/or less than or equal to about 10. The change in the value of the maximum absorptance in one or more chroma enhancement windows when switching from one state to another can be greater than or equal to about 5%, greater than or equal to about 10%, greater than or equal to about 15%, greater than or equal to about 20%, greater than or equal to about 25%, greater than or equal to about 30%, greater than or equal to about 40%, and/or less than or equal to about 80%, and/or less than or equal to about 90%. The change in the value of the maximum absorbance in one or more chroma enhancement windows when switching from one state to another can be greater than or equal to about 0.1, greater than or equal to about 0.5, greater than or equal to about 1.0, greater than or equal to about 2.0, greater than or equal to about 3.0, greater than or equal to about 3.5, greater than or equal to about 4.0, and/or less than or equal to about 7.0, and/or less than or equal to about 10.

In some or all of the two or more states, the lens 102 comprising the one or more variable optical filters can be configured such that the center wavelength of a respective one of the one or more absorptance or absorbance peaks is located in any of the chroma enhancement windows including but not limited to a first spectral range of about 440 nm to about 510 nm, a second spectral range of about 540 nm to about 600 nm, a third spectral range of about 630 nm to about 660 nm, a fourth spectral range of about 440 nm to about 480 nm, a fifth spectral range of about 490 nm to about 510 nm, a sixth spectral range of about 540 nm to about 570 nm, a seventh spectral range of about 580 nm and about 600 nm, an eighth spectral range of about 572 nm to 576 nm, or any combination of the first, second, third, fourth, fifth, sixth, seventh and eighth spectral ranges. The change in the location of the center wavelength of the one or more absorptance/absorbance peaks in one or more chroma enhancement windows when switching from one state to another can be greater than or equal to about 5 nm, greater than or equal to about 10 nm, greater than or equal to about 15 nm, and/or less than or equal to about 20 nm, and/or less than or equal to about 30 nm.

In some or all of the two or more states, the lens 102 comprising the one or more variable optical filters can have a luminous transmittance between about 8% and about 88%. For example, the lens 102 can have a luminous transmittance greater than or equal to about 8% and less than or equal to about 88%, greater than or equal to about 10% and less than or equal to about 85%, greater than or equal to about 15% and less than or equal to about 80%, greater than or equal to about 20% and less than or equal to about 75%, greater than or equal to about 25% and less than or equal to about 70%, greater than or equal to about 30% and less than or equal to about 65%, greater than or equal to about 40% and less than or equal to about 50%, or any value in the ranges/sub-ranges defined by these values. The change in the value of the luminous transmittance when switching from one state to another can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

In some or all of the two or more states, the lens 102 comprising the one or more variable optical filters can have an average visible light transmittance between about 8% and about 88%. For example, the lens 102 can have an average visible light transmittance greater than or equal to about 8% and less than or equal to about 88%, greater than or equal to about 10% and less than or equal to about 85%, greater than or equal to about 15% and less than or equal to about 80%, greater than or equal to about 20% and less than or equal to about 75%, greater than or equal to about 25% and less than or equal to about 70%, greater than or equal to about 30% and less than or equal to about 65%, greater than or equal to about 40% and less than or equal to about 50%, or any value in the ranges/sub-ranges defined by these values. The change in the value of the average visible light transmittance when switching from one state to another can be greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 100%, greater than or equal to about 500%, and/or less than or equal to about 1000%, and/or less than or equal to about 10000%.

In some or all of the two or more states, the CIE chromaticity x-value of the lens 102 comprising the one or more variable optical filters can be greater than 0 and less than 0.8 and/or the CIE chromaticity y-value of the lens can be greater than 0 and less than 0.9. For example, the CIE chromaticity x-value of the lens in some or all of the two or more states can be greater than or equal to about 0.05 and less than or equal to about 0.75, greater than or equal to about 0.1 and less than or equal to about 0.7, greater than or equal to about 0.15 and less than or equal to about 0.65, greater than or equal to about 0.2 and less than or equal to about 0.6, greater than or equal to about 0.25 and less than or equal to about 0.55, greater than or equal to about 0.3 and less than or equal to about 0.5, greater than or equal to about 0.35 and less than or equal to about 0.45, greater than or equal to about 0.3 and less than or equal to about 0.35, greater than or equal to about 0.3 and less than or equal to about 0.34, greater than or equal to about 0.35 and less than or equal to about 0.5, or any value in the ranges/sub-ranges defined by these values.

As another example, the CIE chromaticity y-value of the lens 102 comprising the one or more variable optical filters in some or all of the two or more states can be greater than or equal to about 0.05 and less than or equal to about 0.83, greater than or equal to about 0.1 and less than or equal to about 0.8, greater than or equal to about 0.15 and less than or equal to about 0.75, greater than or equal to about 0.2 and less than or equal to about 0.7, greater than or equal to about 0.25 and less than or equal to about 0.65, greater than or equal to about 0.3 and less than or equal to about 0.6, greater than or equal to about 0.35 and less than or equal to about 0.55, greater than or equal to about 0.4 and less than or equal to about 0.5, greater than or equal to about 0.15 and less than or equal to about 0.3, greater than or equal to about 0.35 and less than or equal to about 0.65, or any value in the ranges/sub-ranges defined by these values. The change in the CIE chromaticity x-value or y-value when switching from one state to another can be greater than or equal to about 0.05, greater than or equal to about 0.1, greater than or equal to about 0.15, greater than or equal to about 0.2, greater than or equal to about 0.25, greater than or equal to about 0.3, greater than or equal to about 0.35, greater than or equal to about 0.4, greater than or equal to about 0.45, greater than or equal to about 0.5, greater than or equal to about 0.55, and/or less than or equal to about 0.7, and/or less than or equal to about 0.8, and/or less than or equal to about 0.9.

In some or all of the two or more states, the lens 102 comprising the one or more variable optical filters can be configured to provide an increase or decrease in average chroma value of light transmitted through the lens within one or more chroma enhancement windows. The one or more chroma enhancement windows can include a first spectral range of about 440 nm to about 510 nm, a second spectral range of about 540 nm to about 600 nm, a third spectral range of about 630 nm to about 660 nm, a fourth spectral range of about 440 nm to about 480 nm, a fifth spectral range of about 490 nm to about 510 nm, a sixth spectral range of about 540 nm to about 570 nm, a seventh spectral range of about 580 nm and about 600 nm or any combination of the first, second, third, fourth, fifth, sixth and seventh spectral ranges.

For example, in some or all of the two or more states, the lens 102 comprising the one or more variable optical filters can be configured increase chroma value of light transmitted through the lens within one or more chroma enhancement windows by about 2% or more as compared to a neutral density filter. The average increase in chroma value of light transmitted through the lens within one or more chroma enhancement windows can be about 3% or more, 5% or more, 10% or more, 15% or more or 20% or more as compared to a neutral density filter.

Optical Filter Systems with Variable Optical Characteristics Providing Chroma Enhancement In certain embodiments, lens 102 comprising an optical filter system including the variable filter component 114 and the static filter component 116 or one or more variable optical filters can provide variable attenuation and chroma enhancement in one or more chroma enhancement windows (CEWs) corresponding to a specific activity and/or ambient light condition. The variable attenuation and chroma enhancement can be controlled based on an input received from a user, a sensor and/or a signal from a control circuit. For example, the lens 102 can be configured to provide controllable variable transmittance (e.g., variable luminous transmittance) and chroma enhancement for sports such as baseball, tennis, badminton, basketball, racquetball, handball, archery, target shooting, trap shooting, cricket, lacrosse, football, ice hockey, field hockey, hunting, soccer, squash, skiing, snowboarding, golf, cycling, trail running, or volleyball based on an input received from a user, a sensor and/or a signal from a control circuit. For various sports, such a filter can include an object chroma enhancement window selected to increase the chroma of natural reflected light or wavelength-converted light produced by a fluorescent agent in a baseball, tennis ball, badminton birdie, or volleyball or light that is preferentially reflected by these objects.

For various activities, background windows and spectral-width windows can be provided so that backgrounds are apparent, scenes appear natural, and the wearer's focus and depth perception are improved. For sports played on various surfaces, or in different settings such as tennis or volleyball, different background windows can be provided for play on different surfaces. For example, tennis is commonly played on grass courts or clay courts, and filters can be configured for each surface, if desired. As another example, ice hockey can be played on an ice surface that is provided with a wavelength-conversion agent or colorant, and lenses can be configured for viewing a hockey puck with respect to such ice. Outdoor volleyball benefits from accurate viewing of a volleyball against a blue sky, and the background filter can be selected to permit accurate background viewing while enhancing chroma in outdoor lighting. A different configuration can be provided for indoor volleyball.

Eyewear that includes such optical filter systems can be activity-specific, surface-specific, or setting-specific. Some representative activities include dentistry, surgery, bird watching, fishing, or search and rescue operations. Such optical filter systems can also be provided in additional configurations such as filters for still and video cameras, or as viewing screens that are placed for the use of spectators or other observers.

As an example, the optical filter system can include one or more chroma enhancement windows (CEWs) in a portion of the visible spectrum in which an object of interest, such as, for example, a golf ball, emits or reflects a substantial spectral stimulus. When referring to the spectral stimulus of an object of interest, a corresponding CEW can be referred to as the object spectral window. When referring to spectral stimulus of a background behind an object, a corresponding CEW can be referred to as the background spectral window. Moreover, when referring to the spectral stimulus of the general surroundings, the spectral window can be referred to as the surrounding spectral window. The optical filter system can be configured such that one or more edges of an absorbance peak lie within at least one spectral window. In this way, an optical filter system can enhance chroma in the spectral ranges corresponding to a given spectral stimulus (e.g. object, background, or surroundings).

Green grass and vegetation typically provide a reflected or emitted spectral stimulus with a light intensity maximum at a wavelength of about 550 nm. Accordingly, wavelengths from about 500 nm to about 600 nm can define a green or background spectral window. Providing an eyewear including a filter that enhances chroma in green light at wavelengths between 500 nm and 600 nm to a golfer can make the background vivid and bright thereby allowing the golfer to accurately assess the background surfaces such as putting surfaces or other vegetation.

Similarly providing an eyewear including a filter that enhances chroma in red and/or blue light can enhance the natural appearance of scenery (e.g., sky, vegetation), improved depth perception as well as improved focus.

Embodiments of optical filter system including a variable filter component 114 and a static filter component 116 or the one or more variable optical filters can also increase contrast between the object and the background by providing chroma enhancement in one or both of the object spectral window and the background spectral window. Color contrast improves when chroma is increased. For example, when a white golf ball is viewed against a background of green grass or foliage at a distance, chroma enhancement technology can cause the green visual stimulus to be more narrowband. A narrowed spectral stimulus causes the green background to appear less washed out, resulting in greater color contrast between the golf ball and the background.

Example Configurations of a Lens Having an Optical Filter System Providing Variable Optical Characteristics Example 1

FIG. 2A illustrates an embodiment of lens 102 that can be included in the eyewear 100. The eyewear can be of any type, including general-purpose eyewear, special-purpose eyewear, sunglasses, driving glasses, sporting glasses, indoor eyewear, outdoor eyewear, vision-correcting eyewear, contrast-enhancing eyewear, eyewear designed for another purpose, or eyewear designed for a combination of purposes. The lens 102 can be corrective lenses or non-corrective lenses. The lens 102 includes a first component 204 spaced apart from a second component 208 by spacers 206. A gap 210 is included between the first component 204 and the second component 208.

The first component 204 includes a polycarbonate lens body. In some embodiments, the first component 204 can comprise a substrate layer including polycarbonate (PC), Nylon, Polyurethane, Polyethylene, Polyimide, PET, acrylic, MYLAR®, clear glass, doped glass or filtered glass. The thickness of the first component 204 can be between about 0.02 inches and about 0.1 inches. The first component 204 has an inner surface facing the second component 208 and an outer surface opposite the inner surface. The inner and outer surfaces of the first component 204 can be planar or curved. The inner and/or outer surfaces of the first component 204 can be tinted. In some embodiments, the inner and/or outer surfaces of the first component 204 can be clear. In various embodiments, the outer surface of the first component 204 can be configured to receive ambient incident light.

The second component 208 is an anti-fog lens. The anti-fog lens can include a substrate to which an anti-fog layer is applied. The thickness of the second component 208 can be between about 0.02 inches and about 0.1 inches. The second component 208 can be tinted. The second component 208 has a first surface facing the first component 204 and a second surface opposite the first surface. The first and second surfaces of the second component 208 can be planar or concave. In various embodiments, incident ambient light can be transmitted out of the lens towards the eye through the second surface The spacers 206 can comprise foam or any other suitable material such as, for example, metal, polymer, PC, Nylon, Polyurethane, Polyethylene, Polyimide, PET, acrylic, or MYLAR®. In various embodiments, the spacers 206 can include discrete structures that are disposed between the first component 204 and second component 208. In some embodiments, the spacers 206 can be part of a unitary structure (e.g., a ring or a semicircular shaped structure). The spacers 206 can be attached to the first component 204 and the second component 208 by adhesives such as, for example, thermal or UV cured adhesive or Pressure Sensitive Adhesive (PSA). In some embodiments, spacers 206 can be attached to the first component 204 and the second component 208 by electrostatic adhesion. In some embodiments, spacers 206 can be attached to the first component 204 and the second component 208 mechanically.

Figure 2B:
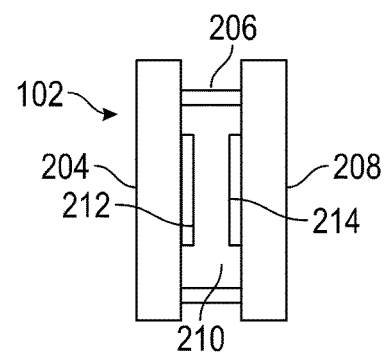
FIG. 2B illustrates an embodiment of a lens that can be included in the eyewear depicted in FIG. 1 or in the goggles depicted in FIG. 2C, the lens comprising a first component spaced apart from a second component by a gap including one or more functional layers.

The gap 210 between the first component 204 and the second component 208 can include air and/or other gasses. In some embodiments, the gap 210 can include a suitable material that provides thermal insulation. The gap 210 can have a thickness between about 0.001 inches and about 0.25 inches. In some embodiments, the gap 210 has a thickness greater than or equal to 0.05 inches and/or less than or equal to 0.25 inches. Although, the illustrated implementation includes a gap 210, other implementations of the gap 210 may be configured without the gap 210. In some embodiments, the gap 210 between the first component 204 and the second component 208 can include one or more functional layers 212 and 214 as shown in FIG. 2B. The one or more functional layers 212 and 214 can include Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer.

In various embodiments, the first component 204 and/or the second component 208 can include one or more functional layers 212 and 214 such as, for example, Interference Stack, Flash Mirror, Photochromic Layer(s), Anti-Reflective, Anti-Static, Liquid Containing Layer(s), Electrochromic Layer(s), Chroma Enhancement, Color Enhancement, Contrast Enhancement, Trichoic Filter, Glass Layer, Hybrid Glass-Plastic Layer. The one or more functional layers can also be applied to one of the surfaces of the first component 204 and/or the second component 208.

In various embodiments, the first component 204 and/or the second component 208 can include a violet edge filter that absorbs wavelength less than 390 nm and transmits wavelengths between 390 nm and 800 nm. In various embodiments, the first component 204 and/or the second component 208 can also include an UV light absorbing filter.

Figure 2C:
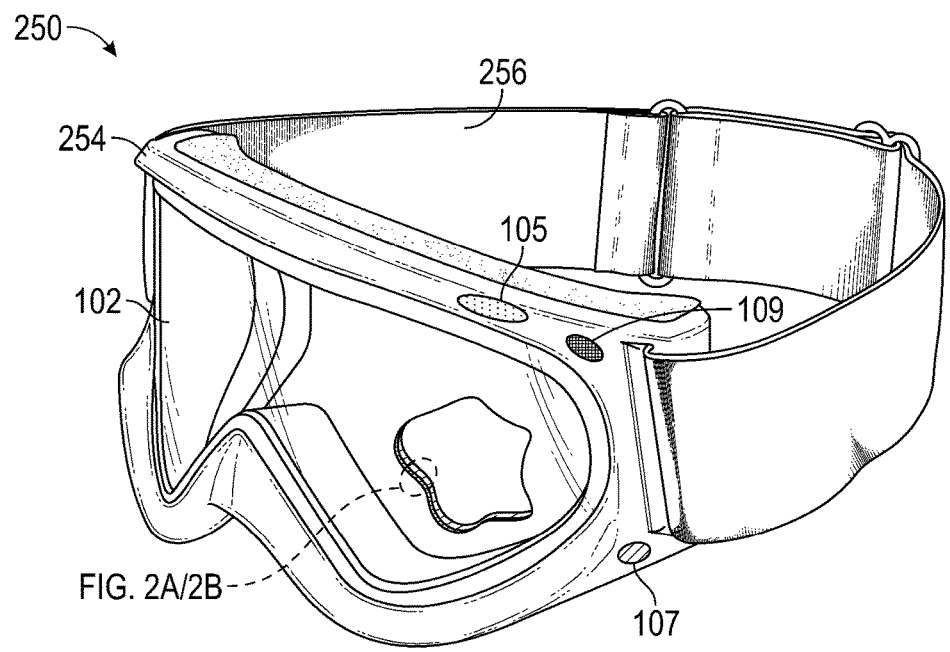
FIG. 2C illustrates an embodiment of a ski goggle including an embodiment of a lens.

FIG. 2C illustrates a perspective view of an embodiment of a ski goggle 250 including an embodiment of a lens 102. The lens 102 can extend in the path of a wearer's left and right eye fields of vision. In various embodiments, the curvature of the lens 102 can allow it to conform closely from side to side to the wearer's face, thus maximizing the interception of sun and other strong light sources, while at the same time providing comfort and pleasing aesthetic characteristics.

The lens 102 can be of a single pane of material. Thus, the lens 102 can be unitary or have a dual lens design. A nosepiece opening can be formed along the lower edge of a frame 254, which can be sized and configured to accommodate the nose of a wearer. Furthermore, the lower edge of the frame 254 can also be shaped to substantially conform to the wearer's facial profile, thus allowing some embodiments to be closely fitted to the wearer's head while not contacting the skin of the wearer's face and other embodiments to contact the wearer's face at multiple points to create an enclosure. The goggles 250 can include a strap 256 that can be configured to substantially secure the goggles 250 in a fixed location relative to the wearer's face and/or create an effective seal against the wearer's face to impede or prevent the entrance of water, snow, dirt, or other particulates into the enclosed area.

The goggles 250 can include a power source 105, such as a battery, an electrical contact, and a conductor that conveys a voltage to the lens 102, a control logic connected to one or more sensors for automatic adjustment of the variable filter components of the lens 102, a user interface element 107 integrated and/or a sensor 109 including a control circuit that can provide a signal to control the variable filter components of the lens 102.

Example 2

Figure 3A:
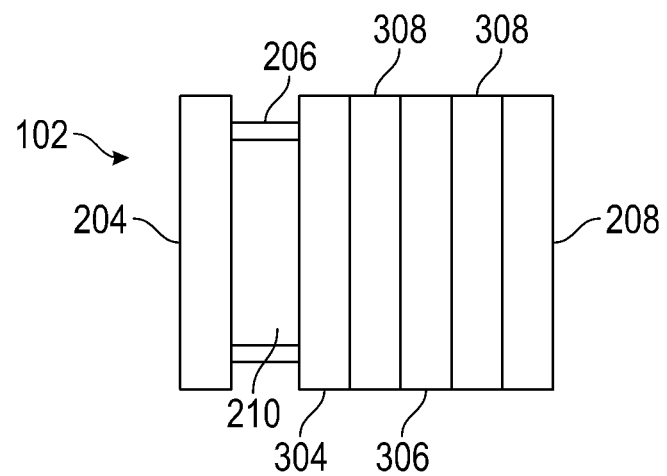
FIGS. 3A-3C illustrate different embodiments of a lens that can be included in the eyewear depicted in FIG. 1 or FIG. 2C, the lens comprising a first component spaced apart from a second component by spacers and one or more functional layers

The embodiment of the lens 102 illustrated in FIG. 3A has the same general structure as the embodiment illustrated in FIG. 2A. The embodiment illustrated in FIG. 3A includes a first functional layer 304 and a second functional layer 306 disposed on the first surface of the second lens component 208. In various embodiments, the first and the second functional layer 304 and 306 can be attached on the first surface of the second lens component 208 using one or more adhesive layers 308. In various embodiments, the adhesive layer 308 can include optically clear adhesives. The first and second functional layers 304 and 306 can have a thickness between about 0.002 inches and about 0.01 inch. The first functional layer 304 can include a variable attenuation filter. For example, the functional layer 304 can include a photochromic material, an electrochromic material or a combination of photochromic and electrochromic material. The second functional layer 306 can include a static filter that enhances chroma. For example, the functional layer 306 can include an absorber that has an absorbance peak in at least one of a first spectral range between 390 nm and about 480 nm, a second spectral range between about 500 nm and about 580 nm and a third spectral range between about 590 nm and about 700 nm. In various embodiments, the functional layer 306 can comprise an organic dye, a rare-earth oxide or other material that can absorb light having a wavelength in at least one of the first, second and third spectral ranges. In various embodiments, the functional layers 304 and/or 306 can comprise variable optical filters. For example, the functional layer 304 and/or 306 can comprise a variable optical filter comprising one or more electrochromic or photochromic materials that can provide one or more absorbance peaks in at least one of a first spectral range between 390 nm and about 480 nm, a second spectral range between about 500 nm and about 580 nm and a third spectral range between about 590 nm and about 700 nm. In some implementations, the optical characteristics of the functional layers 304 and/or 306 comprising the one or more variable optical characteristics can be changed by an electrical stimulus, an optical stimulus, a user input, a signal from a sensor or a signal from an electronic hardware processor. In the embodiment illustrated in FIG. 3A, the first lens component 208 can be optically clear. The first lens component 208 can have anti-fog functionality.

Example 3

Figure 3B:
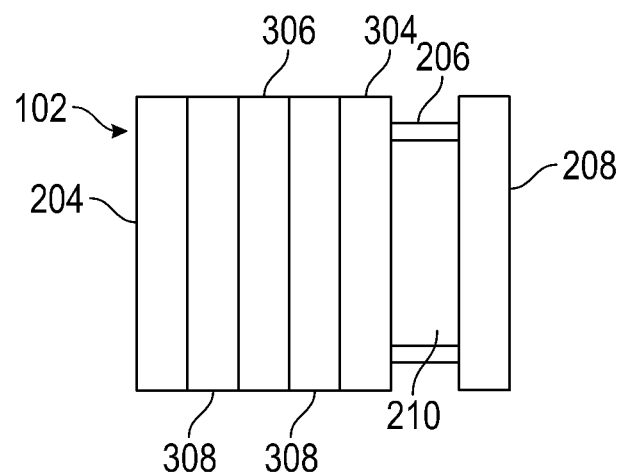

The embodiment of the lens 102 illustrated in FIG. 3B has the same general structure as the embodiment illustrated in FIG. 3A except that the first and second functional layers 304 and 306 are attached to the inner surface of the first lens component 204 using adhesive layers 308. In other embodiments, the first and second functional layers 304 and 306 can be attached to the outer surface of the first lens component 204. In various embodiments, the first lens component 204 can include an absorber that can absorb light having a wavelength in at least one of the first, second and third spectral ranges provided above. In such embodiments, the first lens component 204 incorporates the functional layer 306. In some embodiments, the first lens component 204 can comprise one or more optical filters with variable optical characteristics (e.g., the functional layer 306 can comprise one or more variable optical filters). In such embodiments, various optical characteristics of the first lens component 204 including luminous transmittance, chromaticity, absorbance and/or absorptance profile can be changed in response to an electrical stimulus, an optical stimulus, a user input, a signal from a sensor or a signal from an electronic hardware processor. Accordingly, a separate functional layer 306 may not be included in such embodiments.

Example 4

Figure 3C:
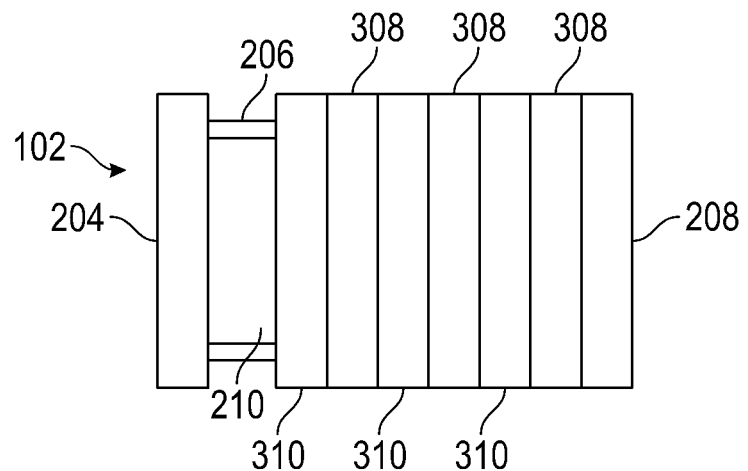

The embodiment of the lens 102 illustrated in FIG. 3C has the same general structure as the embodiment illustrated in FIGS. 3A and 3B. In the embodiment illustrated in FIG. 3C multiple functional layers 310 are attached to the first surface of the second lens component 208 using adhesive layers 308. The functional layer 310 can include a variable filter that also functions as a chroma enhancing filter. Thus, the functional layer 310 can vary the amount of light transmitted through the functional layer 310 as well as vary the spectral characteristic of the transmitted light in at least one of the first, second and third spectral ranges discussed above. The functional layer 310 can include electrochromic material, photochromic material, an organic dye having an absorbance peak in at least one of the first, second and third spectral ranges discussed above and/or a rare-earth oxide having an absorbance peak in at least one of the first, second and third spectral ranges discussed above. In some implementations, the functional layer 310 can comprise polymers (e.g., electrochromic polymers), electroactive materials, photochromic materials, etc. which can be configured to provide variable absorbance/absorptance characteristics in response to an electrical stimulus, an optical stimulus, a user input, a signal from a sensor or a signal from an electronic hardware processor. For example, the functional layer 310 may be configured to provide a first absorbance/absorptance profile having an absorbance peak in at least one of the first, second and third spectral ranges discussed above in a first state and a second absorbance/absorptance profile having an absorbance peak in at least one of the first, second and third spectral ranges discussed above in a second state. The functional layer 310 may be configured to switch between the first and the second state in response to an electrical stimulus, an optical stimulus, a user input, a signal from a sensor or a signal from an electronic hardware processor.

Example 5

Figure 4:
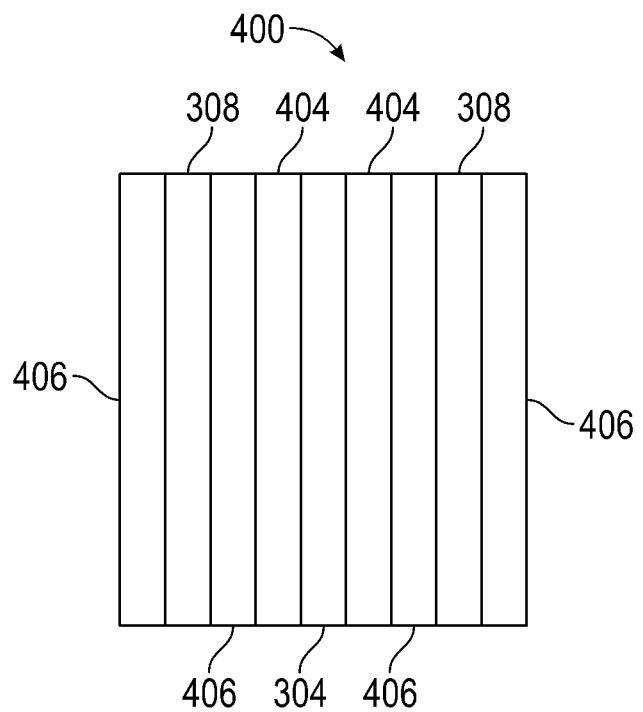
FIG. 4 illustrates an embodiment of a functional element that can be attached to an embodiment of a lens that can be included in the eyewear depicted in FIG. 1 or FIG. 2C.

FIG. 4 illustrates an embodiment of a functional element 400 that can be attached to the lens 102. The functional element 400 can be attached to the lens 102 by lamination. The functional element 400 can include one or more functional layers that can provide variable attenuation to control the amount of light transmitted through the element and vary the spectral profile of the transmitted light to provide chroma enhancement. The element 400 includes a plurality of functional layers 304, 404 and 406 sandwiched between two substrate layers 406. The substrate layers 406 can comprise PC, Nylon, Polyurethane, Polyethylene, Polyimide, PET, acrylic, MYLAR®, clear glass, doped glass and/or filtered glass. The plurality of functional layers 304, 404 and 406 can be attached to the substrate layer 406 using adhesive layers 308. The adhesive layers 308 can be optically clear adhesives.

The plurality of functional layers can include a variable filter 304 including an electrochromic material, static filter layers 406 that are configured to absorb light in at least one of the first, second or third spectral ranges discussed above to provide chroma enhancement and transparent conducting oxide layers 404. The static filter can comprise organic dyes or rare-earth oxides that are configured to absorb light in at least one of the first, second or third spectral ranges discussed above. The transparent conducting oxide (TCO) layers 404 can include indium tin oxide (ITO), zinc oxide (ZnO), tin oxide (SnO) or other transparent conducting materials. The variable filter 304 including the electrochromic material is sandwiched between the TCO layers 404. The TCO layers 404 can be electrically connected to a power source such as, for example, a battery. Accordingly, the variable filter 304 can be configured to switch between a first filter state having a first luminous transmittance and a second filter state having a second luminous transmittance upon application of an electrical signal from the power source to the TCO layers 404. In some implementations, the variable filter 304 may be configured to absorb light in at least one of the first, second or third spectral ranges discussed above to provide chroma enhancement. In such implementations, the variable filter 304 may be configured to vary the colorfulness (e.g., chroma or contrast) of a scene between the first and the second states. The variation of the colorfulness may be accomplished in addition to or instead of the variation in luminous transmittance.

Optical Characteristics of Embodiments of Lens Having an Optical Filter System with Variable Optical Characteristics Eyewear (e.g., sunglasses and/or goggles) including an optical filter system that provides variable attenuation can be provided for different sporting activities such as baseball, tennis, badminton, basketball, racquetball, handball, archery, target shooting, trap shooting, cricket, lacrosse, football, ice hockey, field hockey, hunting, soccer, squash, sailing, skiing, snowboarding, cycling, trail running or volleyball and/or non-sporting activities such as driving or other daily activities. Such embodiments, can allow the sportsperson or the user to control the visual environment viewable through eyewear. Consider the sport of skiing where conditions can change quickly on the ski slopes. A part of the ski slope may be bright and sunny while another part of the ski slope may be less sunny. Thus, it would be advantageous if a skier is able to control the amount of light transmitted through his/her ski goggles quickly while skiing. Additionally, it would be advantageous if the eyewear including the optical filter system also provided chroma enhancement. The optical filter system configured to provide chroma enhancement (CE) can be configured to absorb different wavelengths in the visible spectral range (e.g., between about 390 nm and about 850 nm) by different amounts in order to enhance the color quality of the visual environment viewable through eyewear and to allow the sportsperson to engage in the sporting activity to the best of his/her ability. For example, it would increase a skier's skiing experience if the CE providing optical filter system were configured to make the slope and other objects on the slope stand out from the background. As another example, including an optical filter system that can also enhance chroma in the eyewear can make a tennis ball or a baseball stand out against the grass thus improving the player's ability to spot the ball. An optical filter system that can also enhance chroma can be provided so that backgrounds are apparent, scenes appear natural, and the wearer's focus and depth perception are improved. Accordingly, eyewear including an optical filter system that can provide variable attenuation filter and/or chroma enhancement can be advantageous for various sporting activities and for activities other than sports in which it is desirable to identify, locate, or track an object against backgrounds associated with the activity such as, for example, dentistry, surgery, bird watching, fishing, or search and rescue operations. Optical filter systems that provide variable attenuation and chroma enhancement can also be provided in additional configurations such as filters for still and video cameras, or as viewing screens that are placed for the use of spectators or other observers. Optical filter systems that provide variable attenuation and chroma enhancement can be provided as lenses, unitary lenses, or as face shields. For example, an optical filter that provides variable attenuation and chroma enhancement for hockey can be included in a face shield. As another example, an optical filter having variable optical characteristics can be included in any headworn support (i.e., a headworn article that can support one or more lenses in the wearer's field of view). For example, other headworn supports can include, but are not limited to, helmets, face masks, balaclavas, and breaching shields.

Optical characteristics (e.g., transmission profile, absorbance profile, chroma profile, chromaticity, etc.) of various embodiments of lenses including one or more optical filter systems that provide variable attenuation and chroma enhancement for certain example activities are described below with references to FIGS. 5A-13G and 14A-17C. Various embodiments of lenses configured to provide variable attenuation and chroma enhancement can comprise one or more optical filter systems comprising one or more controllable optical filters and one or more optical filters that are not controlled as described above. Various embodiments of lenses configured to provide variable attenuation and chroma enhancement can comprise one or more optical filter systems comprising one or more controllable optical filters alone. The one or more optical filter systems can be configured to be switched between two or more switchable states. At least one of a luminous transmittance, a chromaticity, an attenuation of one or more visible wavelengths, or chroma of a scene viewed through the lens can be different between the two or more switchable states. The various embodiments of lenses including one or more optical filter systems that provide variable attenuation and chroma enhancement can be similar to the embodiments disclosed above with reference to FIGS. 2, 3A-3C, and/or 4. Any structure, material, component, assembly, or step, illustrated and/or described with reference to FIGS. 2, 3A-3C, and/or 4 can be used with any of the filters described with reference to FIGS. 5A-13G and 14A-17C. The one or more optical filter systems having variable attenuation and chroma enhancement can include chroma enhancement dyes, color enhancing chromophores, chromophores that have electrochromic and/or photochromic properties, electrochromic materials, photochromic materials, etc. as described in detail in this application. In various embodiments, the one or more filters can include IRIDIUM® coatings. The example lens embodiments disclosed herein suitable for use in other applications than those indicated when such applications involve environments with similar colors of interest. The embodiments of the one or more filters for the sports activities are examples, and it is understood that other suitable filters can be used for the exemplary activities described herein.

Various examples of the one or more filters for different sporting activities provided below are described as comprising one or more CE filters and/or one or more variable attenuation filters. However, it is appreciated that the various absorptance, absorbance or transmittance spectra, chromaticity or other optical characteristics of the filters/lenses described below can be achieved by embodiments of the variable CE filters that can be user controllable, sensor controllable or controllable by a signal from an electronic hardware processor. Variable CE filters can be configured to be switched between two or more states in response to an electrical stimulus, an optical stimulus, an input from a user (e.g., touch or voice), a sensor and/or an electronic hardware processor. For example, the variable CE filters can be configured to switch between the first filter state (e.g., dark state) and the second filter state (e.g., faded state) as discussed herein. As another example, the variable CE filters can be configured to switch between a first state having a first luminous transmittance and a second state having a second luminous transmittance. As yet another example, the variable CE filters can be configured to switch between a first state having a first chromaticity and a second state having a second chromaticity. As another example, the variable CE filters can be configured to switch between a first state having a first spectral absorptance or absorbance profile and a second state having a second spectral absorptance or absorbance profile. As another example, the variable CE filters can be configured to switch between a first state having a first relative chroma value and a second state having a second relative chroma value. The variable CE filters can comprise one or more electrochromic materials (e.g., electrochromic polymers).

Example Embodiment 1—Golf

Various embodiments of lenses used for golf preferably reduce glare (e.g., glare resulting from sunlight on a bright sunny day). Reducing glare can advantageously increase the ability of seeing the fairway, the hole and the ball thus allowing a golfer to play to the best of his/her ability. Accordingly, various embodiments of lenses used for golf can include coatings, layers or films that reduce glare. The glare reducing coatings, layers or films can include polarizing films and/or coatings to filter out polarized light, holographic or diffractive elements that are configured to reduce glare and/or diffusing elements. Additionally, it would be advantageous for various embodiments of lenses used for golf to include filters that make trees, sky and other objects (e.g., flags, water features, tree roots, etc.) stand out from the green grass to aid the golfer to guide the golf ball to a desired location. Making trees, sky and other objects stand out from the green grass can also enhance a players golfing experience. Various embodiments of lenses suitable for golfing can include one or more CE filters that transmit different colors in the visible spectral range with different values to create different viewing conditions. For example, some embodiments of lenses for golfing can transmit all colors of the visible spectrum such that there is little distortion on bright sunny days. As another example, some embodiments of lenses for golfing can transmit colors in the yellow and red spectral ranges and attenuate and/or absorb colors in the blue and green spectral ranges. Various embodiments of lenses used for golfing can also be tinted (e.g., grey, green, amber, brown or yellow) to increase contrast between the grass and the sky, reduce eye strain and/or for aesthetic purpose.

In addition to one or more CE filters, various embodiments of lenses suitable for golfing can include one or more variable attenuation filters that can be switched between a first filter state and a second filter state based on an input signal from the golfer. The input signal can be an electrical pulse, an electrical voltage, an electrical current or exposure to a radiation. In various embodiments, the variable attenuation filters can be configured to switch between a first filter state and a second filter state transmit when exposed to an electromagnetic radiation. The variable attenuation filter can be configured to maintain the filter state without requiring a supply of energy. In various embodiments, the variable attenuation filters can be configured to toggle between a first state and a second state based on an input from the golfer.

Figure 5A:
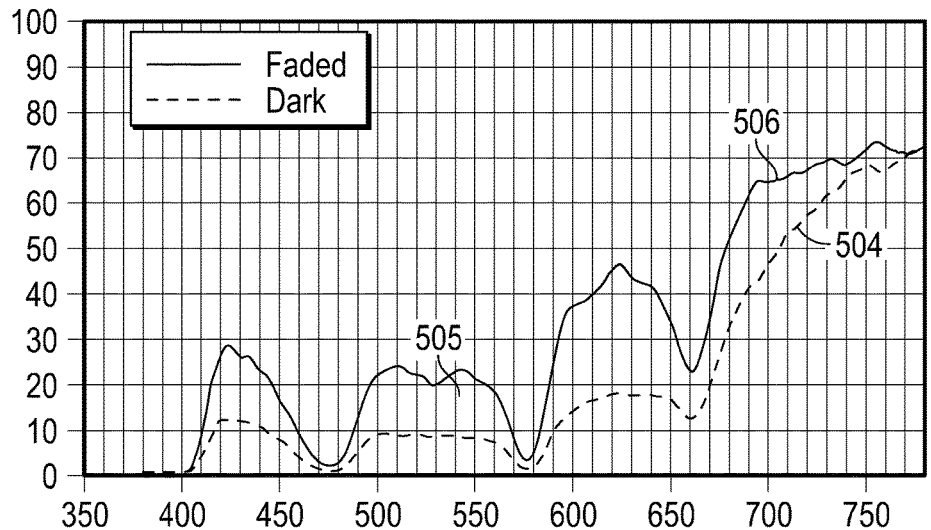
FIGS. 5A-13G illustrate optical characteristics (e.g., transmission profile, absorbance profile, chromaticity, and relative chroma profile) of various embodiments of lenses including one or more optical filters that provide variable attenuation and chroma enhancement for certain activities, such as, for example, golf, baseball, and snow sports.
Figure 5A:
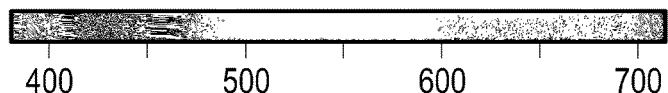
Figure 5B:
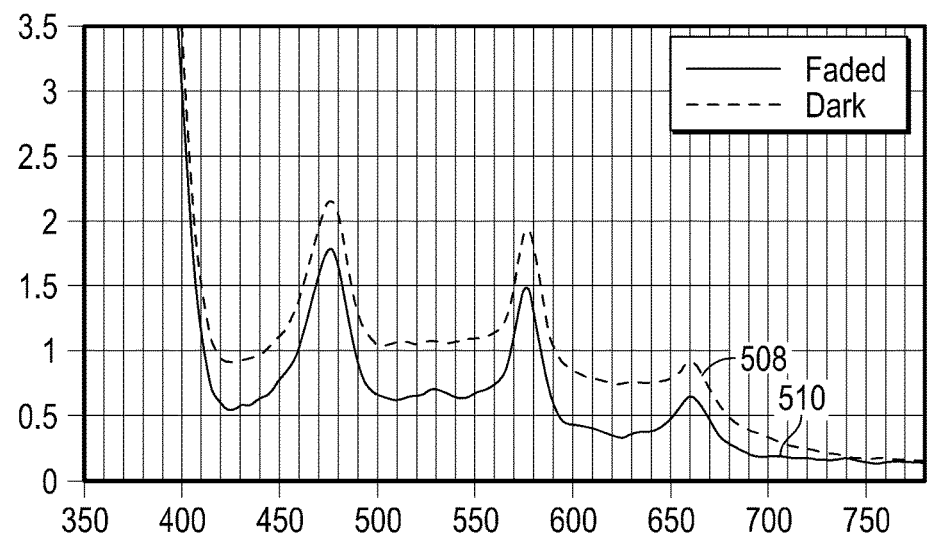
Figure 5B:
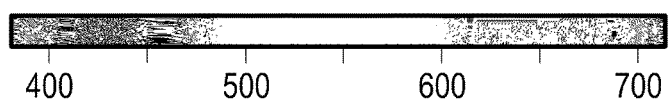

FIG. 5A illustrates the transmittance profile of an optical filter included in an embodiment of a lens that can be suitable for golf. The lens can have general structures and features similar to embodiments described above with reference to FIGS. 2-4. FIG. 5B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. In FIG. 5A, the transmittance profile of the embodiment of the filter in the dark state is represented by the curve 504 and the transmittance profile of the embodiment of the filter in the faded state is represented by the curve 506. Without any loss of generality, in various embodiments of the lens, the percentage of light transmitted in the faded and the dark state at different wavelengths can have values other than those depicted in transmittance and absorbance profiles depicted in FIGS. 5A-13G and 14A-17C. For example, referring to FIG. 5A, the percentage of light transmitted in the faded and the dark state at different wavelengths can be in the region 505 between curves 504 and 506. Accordingly, any offset between the two filter states (e.g., faded state and the dark state) is within the scope of the disclosure. The transmittance profile through the one or more filters in the dark state and the faded state has one or more "notches". The presence of the notches in the transmittance profile creates distinct "pass-bands". Wavelengths in each of the distinct pass-bands are transmitted with lower attenuation than wavelengths in the notches. The notches in the transmittance profile are depicted as "peaks" in the corresponding absorbance profile depicted in FIG. 5B and the pass-bands in the transmittance profile are depicted as "valleys" in the corresponding absorbance profile depicted in FIG. 5B. Without any loss of generality, a valley includes a region of the absorbance spectrum between two consecutive peaks. Without any loss of generality, a valley can be characterized by a full width at 10% of the average optical density between two consecutive peaks above the base line. The optical filter includes an edge filter (e.g., a violet edge filter) having an optical density of at least 1.0 for wavelengths less than 400 nm. In various embodiments, the edge filter can be configured to have a high optical density value at wavelengths less than about 410 nm and a low optical density value at wavelengths greater than about 410 nm. In various embodiments, the edge filter is configured such that the value of the optical density drops sharply from a high value to a low value at one or more wavelengths below 410 nm. In FIG. 5B, the absorbance profile of the embodiment of the filter in the dark state is represented by the curve 508 and the absorbance profile of the embodiment of the filter in the faded state is represented by the curve 510.

Referring to FIG. 5B, it is observed from curve 508 that the absorbance profile in the dark state has a first absorbance peak having a maximum absorbance value at about 475 nm and a second absorbance peak having a maximum absorbance value at about 575 nm. It is noted from curve 508 that the first peak has a full width at 80% maximum absorbance value (FW80M) of about 15-25 nm and a full width at 60% maximum absorbance value (FW60M) of about 30-40 nm. The second peak has a FW80M of about 10-15 nm a FW60M of about 20-30 nm. The absorbance profile in the faded state and the dark state indicates a sharp increase in the optical density (or absorbance value) at wavelengths less than about 410 nm consistent with the presence of an edge filter.

It is further observed from curve 508 that the absorbance profile in the dark state has first valley in the wavelength range between about 410 nm and about 460 nm; a second valley in the wavelength range between about 500 nm and about 560 nm; and a third valley in the wavelength range between about 590 nm and about 660 nm. Wavelengths in the first valley have an average absorbance value that is about 50%-60% of the first peak absorbance value. Wavelengths in the second valley have an average absorbance value that is about 50% of the maximum absorbance value of the first peak and about 60% of maximum absorbance value of the second peak. Wavelengths in the third valley have an average absorbance value that is about 40%-50% of the maximum absorbance value of the second peak.

Referring to FIG. 5B, it is observed from curve 510 that the absorbance profile in the faded state has a first absorbance peak having a maximum absorbance value at about 475 nm and a second absorbance peak having a maximum absorbance value at about 575 nm. The absorbance values for the first and second absorbance peaks in the faded state is lower than the peak absorbance values for the first and second absorbance peaks in the dark state indicating that the transmittance of light for wavelengths in the first and second peaks in the faded state is higher than the transmittance of light for wavelengths in the first and second peaks in the dark state. From curve 510 it is observed that the first peak has a FW80M of about 15-25 nm and a FW60M of about 25-35 nm. The second peak has a FW80M of about 10-15 nm and a FW60M of about 20-25 nm.

The absorbance profile in the faded state has a first valley in the wavelength range between about 410 nm and about 460 nm; a second valley in the wavelength range between about 490 nm and about 570 nm; and a third valley in the wavelength range between about 590 nm and about 650 nm. Wavelengths in the first valley have an average absorbance value that is about 40% of the first peak absorbance value. Wavelengths in the second valley have an average absorbance value that is about 40% of the maximum absorbance value of the first peak and about 40% of the maximum absorbance value of the second peak. Wavelengths in the third valley have an average absorbance value that is about 20%-30% of the maximum absorbance value of the second peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 504 in FIG. 5A, has a first pass-band configured to transmit between about 1% and about 12% of light in the violet-blue spectral ranges (e.g., between about 410 nm and about 460 nm); a second pass-band configured to transmit between about 1% and about 10% of the light in the green-yellow spectral ranges (e.g., between about 500 nm and about 570 nm); and a third pass-band configured to transmit between about 1% and about 20% of the light in the orange-red spectral ranges (e.g., between about 590 nm and about 650 nm).

The transmittance profile in the faded state represented by curve 506 in FIG. 5A, has a first pass-band configured to transmit between about 1% and about 30% of light in the violet-blue spectral ranges (e.g., between about 410 nm and about 470 nm); a second pass-band configured to transmit between about 1% and about 25% of the light in the green-yellow spectral ranges (e.g., between about 500 nm and about 570 nm); and a third pass-band configured to transmit between about 5% and about 50% of the light in the orange-red spectral ranges (e.g., between about 590 nm and about 650 nm). Accordingly, the optical filter is configured to transmit more light in the faded state than in the dark state. The amount of light transmitted in the faded state and the dark state can be characterized using luminous transmittance that is measured with respect to a suitable illuminant, such as, for example, CIE standard illuminant D65. The luminous transmittance can be determined according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 5A, is about 21.7% in the faded state (represented by curve 506) and is about 8.6% in the dark state (represented by curve 504). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 5C:
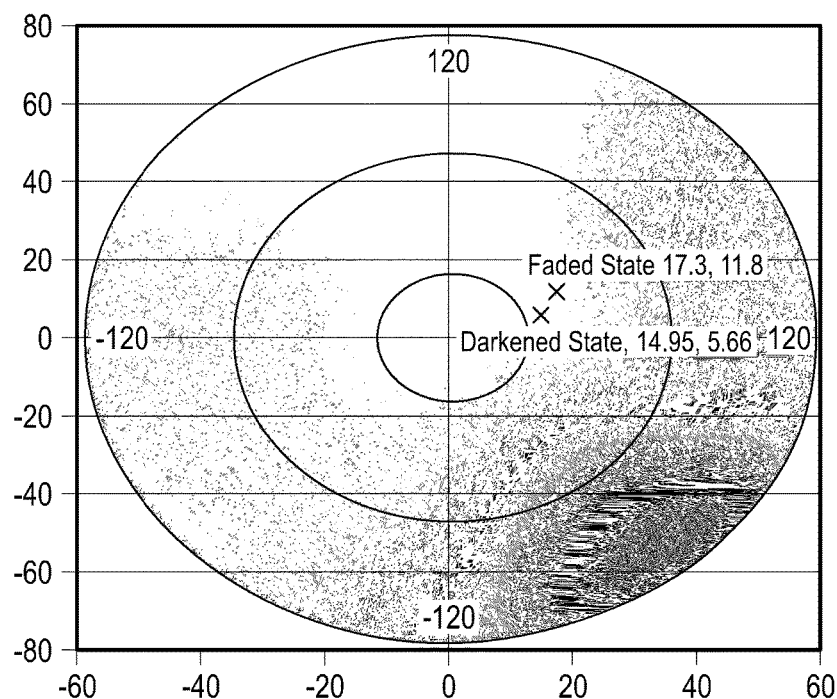
Figure 5D:
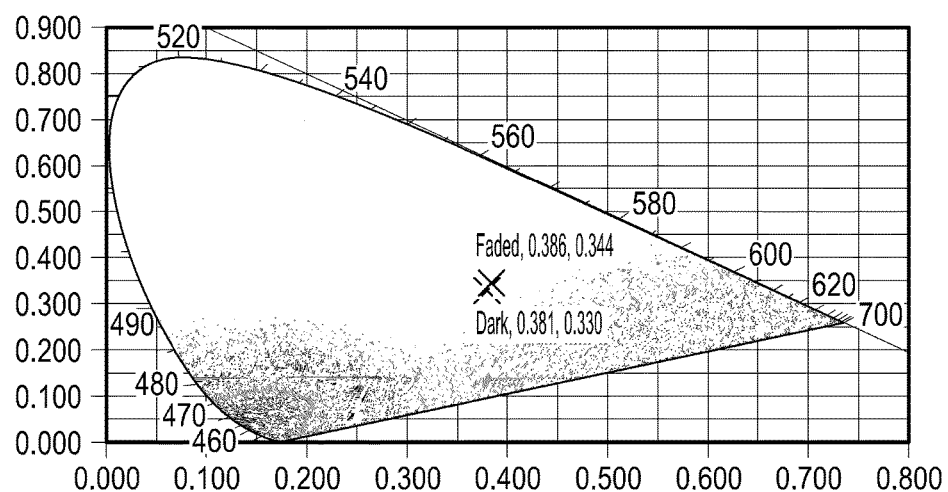

FIGS. 5C and 5D show the chromaticity diagram of the lens including the optical filter having an absorbance profile as shown in FIG. 5B. The chromaticity diagram shows the chromaticity of the optical filter or the embodiment of the lens including the optical filter (represented by 'X' marks) as well as the gamut of a color space. The chromaticity is calculated using CIE standard illuminant D65 and the CIE 1964 10° Standard Observer based on a 10-degree field of view for a standard observer. FIG. 5C shows the chromaticity diagram of the optical filter or the embodiment of the lens including the optical filter in the CIE L*u*v* color space. The CIEuv chromaticity diagram expresses chromaticity in terms of hue and chroma for a certain value of lightness. In the CIE L*u*v* chromaticity diagram the axis extending from the origin to the right horizontally is the 'red' direction, the axis extending from the origin to the left horizontally is the 'green' direction, the axis extending from the origin vertically upwards in the plane of the paper is the 'yellow' direction, and the axis extending from the origin vertically downwards in the plane of the paper is the 'blue' direction. FIG. 5C expresses chromaticity of the optical filter or the embodiment of the lens including the optical filter in terms of hue (v*) and chroma (u*) for a lightness (L*) value of 0. Referring to FIG. 5C, the chromaticity of the optical filter or the embodiment of the lens including the optical filter has a chroma value of 17.3 and a hue value of 11.8 in the faded state and can appear as reddish grey to an observer. The chromaticity of the optical filter or the embodiment of the lens including the optical filter has a chroma value of 14.95 and a hue value of 5.66 in the dark state and can appear as a neutral grey to an observer. FIG. 5D shows the chromaticity diagram of the optical filter or the embodiment of the lens including the optical filter in the CIE xyY color space. The CIE xy chromaticity diagram expresses chromaticity in terms of tri-stimulus values x and y. The chromaticity of the optical filter or the embodiment of the lens including the optical filter has a CIE x value of 0.386 and a CIE y value of 0.344 in the faded state. The chromaticity of the optical filter or the embodiment of the lens including the optical filter has a CIE x value of 0.381 and a CIE y value of 0.330 in the dark state. Although, in the illustrated embodiment, a distance between the chromaticity values in the faded and the dark state is small such that the optical filter or the lens including the optical filter appears to have similar color in the faded and the dark state, in other embodiments, a distance between the chromaticity values in the faded and the dark state can be large such the optical filter or the lens including the optical filter appears to have dissimilar color in the faded and the dark state In various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 5E:
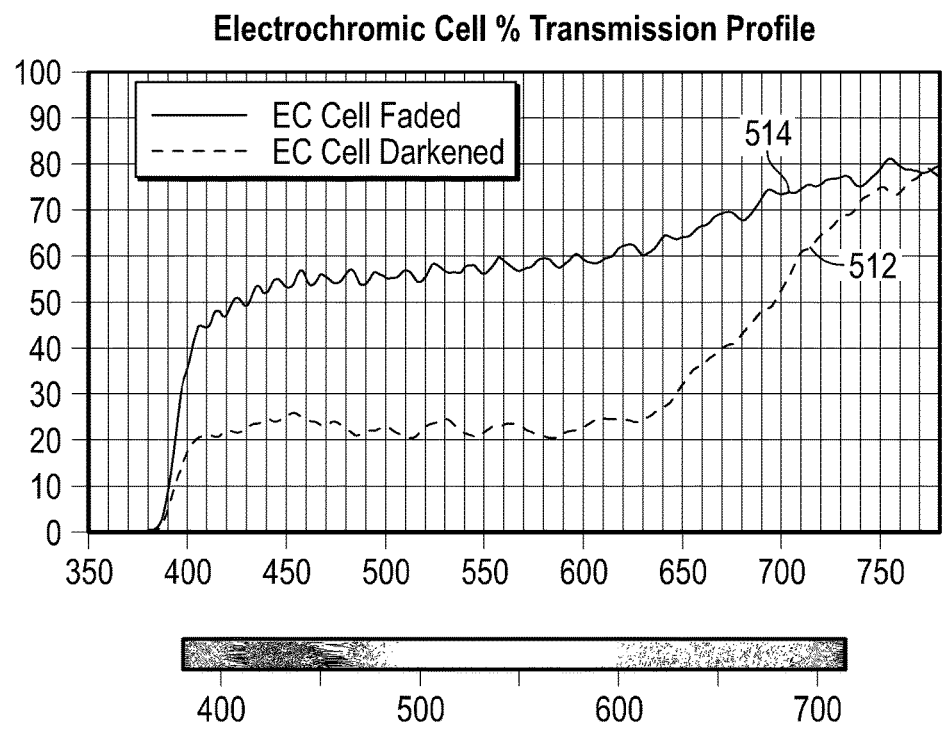

FIG. 5E illustrates the transmittance profile of the variable attenuation filter component of the optical filter whose transmittance profile is depicted in FIG. 5A and whose absorbance profile is depicted in FIG. 5B. The variable attenuation filter component can include a cell including an electro-chromic material similar to the cell disclosed in International Publication No. WO 2011/127015 which is incorporated by reference herein in its entirety. Curve 512 depicts the transmittance profile of the variable attenuation filter component in the dark state and curve 514 depicts the absorbance profile of the variable attenuation filter component in the faded state. As noted from curve 512, the variable attenuation filter component has a transmittance between about 20% and about 30% for all wavelengths in the spectral range between about 400 nm and 650 nm in the dark state. As noted from curve 514, the variable attenuation filter component has a transmittance between about 40% and about 70% for all wavelengths in the spectral range between about 400 nm and 650 nm in the faded state. It is further observed from curves 512 and 514 that the difference between the transmittance through the variable attenuation filter component between about 450 nm and about 600 nm in dark state and the faded state is approximately the same. Thus, the variable attenuation filter component can be considered to function as a neutral density filter for wavelengths between about 450 nm and about 600 nm.

Figure 5F:
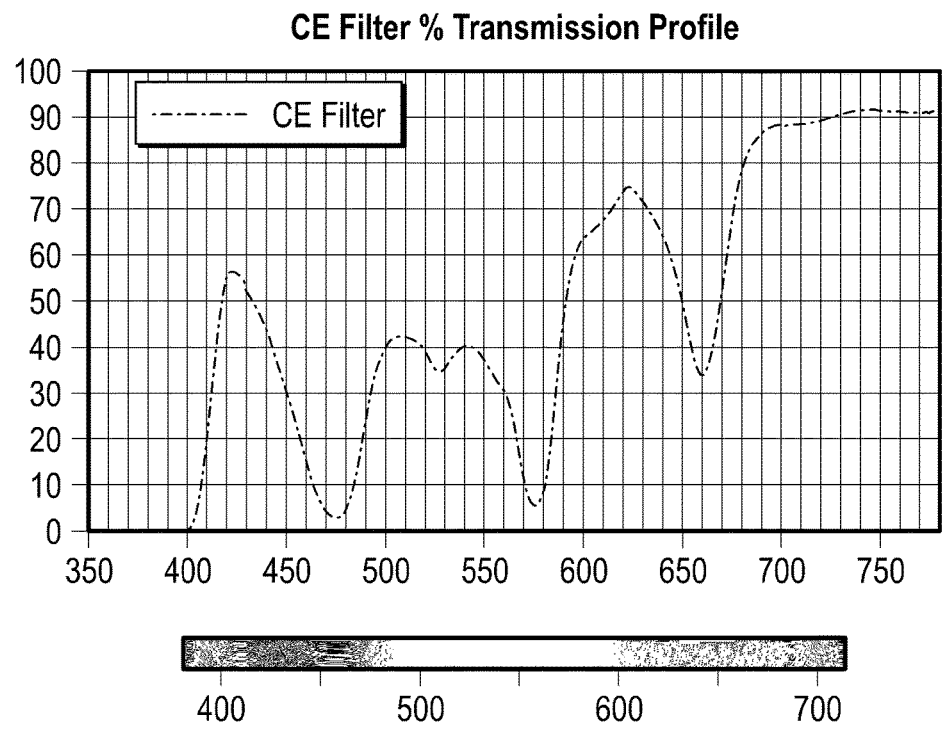

FIG. 5F illustrates the transmittance profile of the chroma enhancing filter component of the optical filter whose transmittance profile is depicted in FIG. 5A and whose absorbance profile is depicted in FIG. 5B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 580 nm and about 650 nm. It is noted from FIG. 5F that the first pass-band has a maximum transmittance at about 425 nm and the third pass-band has a maximum transmittance at about 625 nm. It is noted from FIG. 5F that the second pass-band has a transmittance of about 40% between about 500 nm and 550 nm. Without any loss of generality, the transmittance profile illustrated in FIG. 5A is a sum of the transmittance profile of the variable attenuation filter component of the optical filter depicted in FIG. 5E and the transmittance profile of the chroma enhancing filter component of the optical filter depicted in FIG. 5F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 11 mg of a first dye having an absorbance peak with a maximum absorbance value at 473 nm (e.g. EXCITON ABS 473), 20.08 mg of a second dye having an absorbance peak with a maximum absorbance value at 515 nm (e.g. EXCITON ABS 515), 15.64 mg of a third dye having an absorbance peak with a maximum absorbance value at 574 nm (e.g. EXCITON ABS 574), and 1.68 mg of a fourth dye having an absorbance peak with a maximum absorbance value at 659 nm (e.g. EXCITON ABS 659) incorporated in 1 pound of a resin.

Figure 5G:
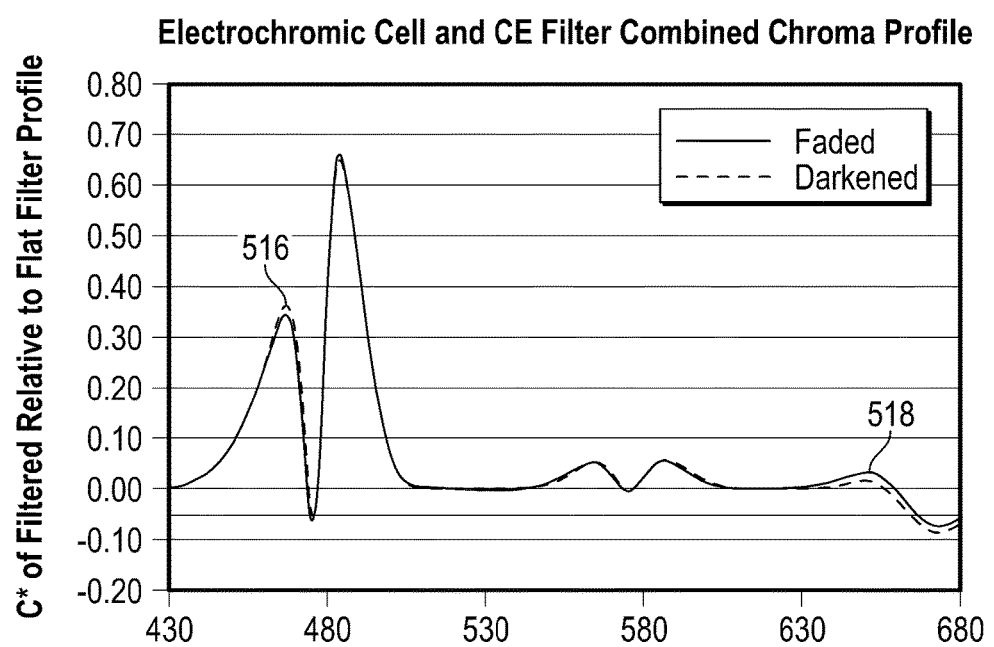

FIG. 5G shows the chroma profile of the lens including the optical filter having an absorbance profile as shown in FIG. 5B. Curve 516 is the combined chroma profile of the variable filter component and the chroma enhancing filter component in the dark state and curve 518 is the combined chroma profile of the variable filter component and the chroma enhancing filter component in the faded state. The chroma profile illustrated in FIGS. 5G, 6G, 7G, 8G, 9G, 10G, 11G, 12G, 13G, 14C, 15C, 16C and 17C is the chroma value perceived by the human visual system (HVS) when a uniform intensity stimulus having a bandwidth of 30 nm centered at a wavelength ($\lambda_{center}$) in the range between 350 nm and 700 nm is filtered by various embodiments of an optical filter including a variable filter component and a chroma enhancing filter component relative to the chroma value perceived by the HVS when the stimulus is filtered by a filter having a flat filter profile that uniformly attenuates all wavelengths in the range between 350 nm and 700 nm.

Curves 516 and 518 indicate that the optical filter having an absorbance profile as shown in FIG. 5B provides an increase in chroma in a first spectral window between 450 nm and 500 nm, a second spectral window between 550 nm and 600 nm and a third spectral window between 630 nm and 660 nm as compared to a flat filter.

It is noted from FIG. 5G that the chroma profile in the faded state and the chroma profile in the dark state coincide indicating that toggling the optical filter between the dark state and the faded state does not alter the chroma value of the transmitted light as perceived by the HVS.

Example Embodiment 2—Golf

Figure 6A:
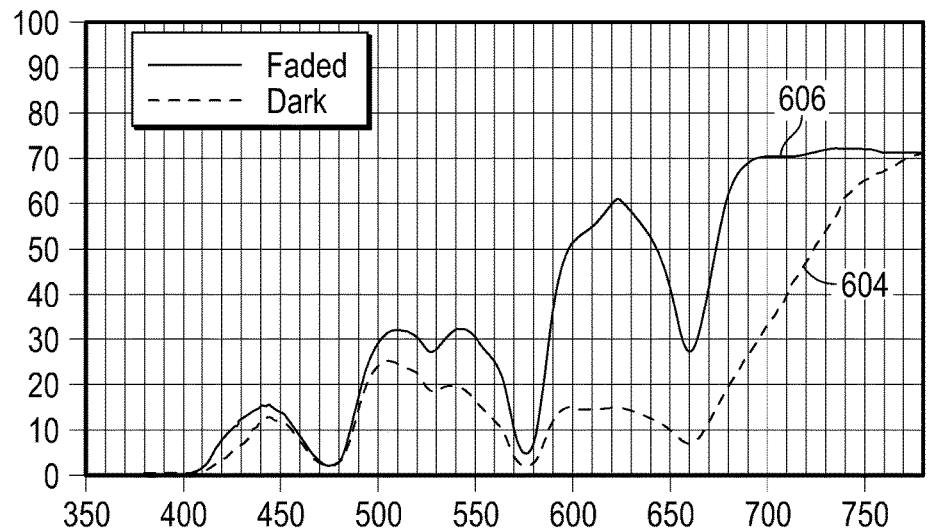
Figure 6A:
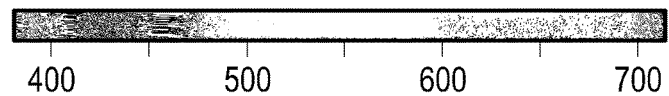
Figure 6B:
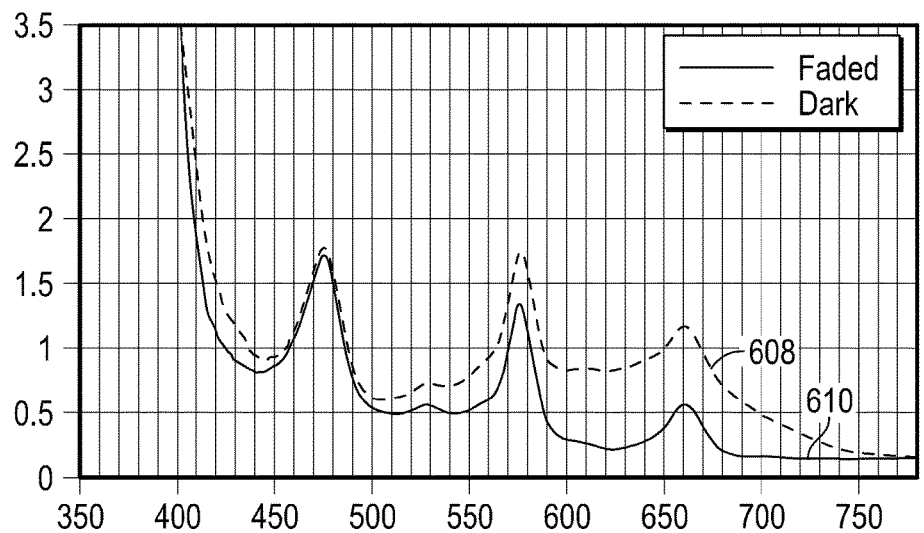
Figure 6B:
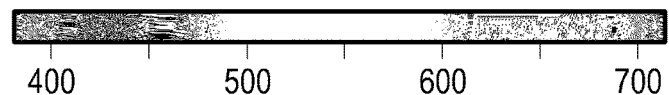

FIG. 6A illustrates the transmittance profile of another optical filter included in an embodiment of a lens that can be suitable for golf. The lens can have general structures and features similar to embodiments described above with reference to FIGS. 2-4. FIG. 6B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 6A, the transmittance profile of the embodiment of the filter in the dark state is represented by the curve 604 and the transmittance profile of the embodiment of the filter in the faded state is represented by the curve 606. In FIG. 6B, the absorbance profile of the embodiment of the filter in the dark state is represented by the curve 608 and the absorbance profile of the embodiment of the filter in the faded state is represented by the curve 610.

Referring to FIG. 6B, it is observed from curve 608 that the absorbance profile in the dark state has a first absorbance peak with a maximum absorbance value at about 475 nm and a second absorbance peak with a maximum absorbance value at about 575 nm. It is noted from curve 608 that the first peak has a FW80M of about 15-20 nm and a FW60M of about 25-30 nm. The second peak has a FW80M of about 10-15 nm and a FW60M of about 20-30 nm. The absorbance profile in the faded state and the dark state indicates a sharp increase in the absorbance at wavelengths less than about 410 nm consistent with the presence of an edge filter.

It is further observed from curve 608 that the absorbance profile in the dark state has first valley in the wavelength range between about 440 nm and about 460 nm; a second valley in the wavelength range between about 490 nm and about 560 nm; and a third valley in the wavelength range between about 590 nm and about 650 nm. Wavelengths in the first valley have an average absorbance value that is about 50%-60% of the maximum absorbance value of the first peak. Wavelengths in the second valley have an average absorbance value that is about 40% of the maximum absorbance value of the first peak and about 40% of the maximum absorbance value of the second peak. Wavelengths in the third valley have an average absorbance value that is about 50% of the maximum absorbance value of the second peak.

Referring to FIG. 6B, it is observed from curve 610 that the absorbance profile in the faded state has a first absorbance peak with a maximum absorbance value at about 475 nm and a second absorbance peak with a maximum absorbance value at about 575 nm. The maximum absorbance value for the second absorbance peak in the faded state is lower than the maximum absorbance value for the second absorbance peak in the dark state indicating that the transmittance of light for wavelengths in the second absorbance peak in the faded state is higher than the transmittance of light for wavelengths in the second absorbance peak in the dark state. From curve 610 it is observed that the first peak has a FW80M of about 15-20 nm and a FW60M of about 25-30 nm. The second peak has a FW80M of about 10-15 nm and a FW60M of about 15-20 nm.

The absorbance profile in the faded state has a first valley in the wavelength range between about 430 nm and about 460 nm; a second valley in the wavelength range between about 500 nm and about 560 nm; and a third valley in the wavelength range between about 590 nm and about 650 nm. Wavelengths in the first valley have an average absorbance value that is about 50% of the maximum absorbance value of the first peak. Wavelengths in the second valley have an average absorbance value that is about 30% of the maximum absorbance value of the first peak and about 40% of the maximum absorbance value of the second peak. Wavelengths in the third valley have an average absorbance value that is about 25%-30% of the maximum absorbance value of the second peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 604 in FIG. 6A, has a first pass-band configured to transmit between about 1% and about 12% of light in the violet-blue spectral ranges (e.g., between about 420 nm and about 470 nm); a second pass-band configured to transmit between about 1% and about 25% of the light in the green-yellow spectral ranges (e.g., between about 480 nm and about 570 nm); and a third pass-band configured to transmit between about 1% and about 15% of the light in the orange-red spectral ranges (e.g., between about 580 nm and about 650 nm).

The transmittance profile in the faded state represented by curve 606 in FIG. 6A, has a first pass-band configured to transmit between about 1% and about 15% of light in the violet-blue spectral ranges (e.g., between about 410 nm and about 470 nm); a second pass-band configured to transmit between about 1% and about 30% of the light in the green-yellow spectral ranges (e.g., between about 480 nm and about 570 nm); and a third pass-band configured to transmit between about 5% and about 60% of the light in the orange-red spectral ranges (e.g., between about 580 nm and about 650 nm). Accordingly, the optical filter is configured to transmit more light in the faded state than in the dark state. As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 6A, is about 29.5% in the faded state (represented by curve 606) and is about 14.2% in the dark state (represented by curve 604). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 6C:
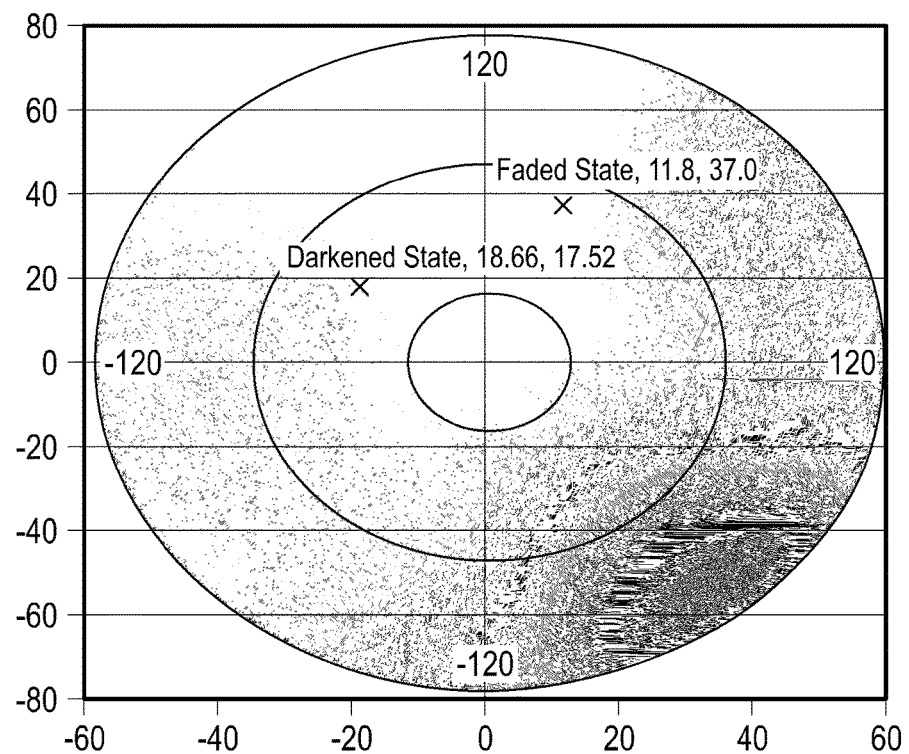
Figure 6D:
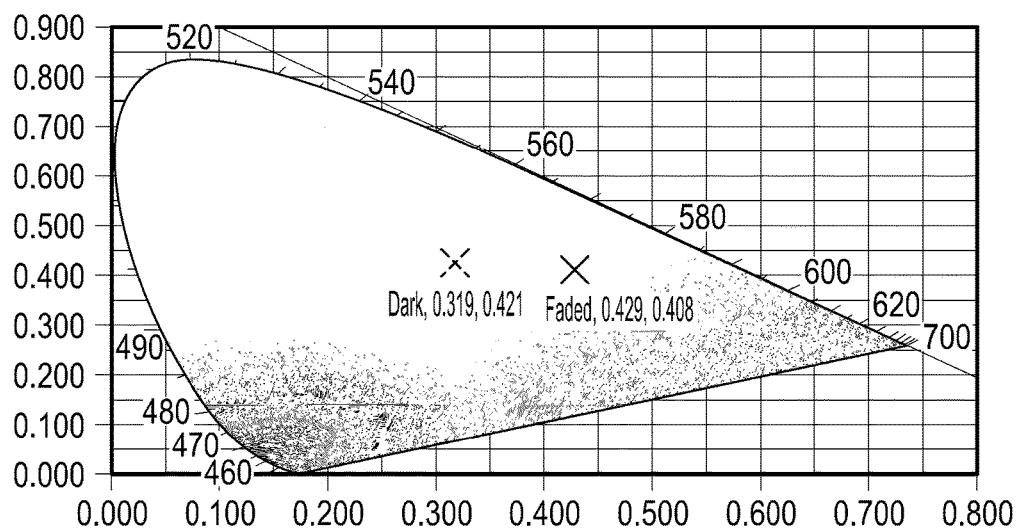

FIGS. 6C and 6D show the chromaticity diagram of the lens including the optical filter having an absorbance profile as shown in FIG. 6B. FIG. 6C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 6C, the chromaticity of the optical filter or the embodiment of the lens including the optical filter has a chroma value of 11.8 and a hue value of 37.0 in the faded state and can appear orange to an observer. The chromaticity of the optical filter or the embodiment of the lens including the optical filter has a chroma value of 18.66 and a hue value of 17.52 in the dark state and can appear greenish to an observer. FIG. 6D shows the chromaticity diagram of the optical filter or the embodiment of the lens including the optical filter in the CIE xyY color space. Referring to FIG. 6D, the chromaticity of the optical filter or the embodiment of the lens including the optical filter has a CIE x value of 0.429 and a CIE y value of 0.408 in the faded state. The chromaticity of the optical filter or the embodiment of the lens including the optical filter has a CIE x value of 0.319 and a CIE y value of 0.421 in the dark state. Although, in the illustrated embodiment, a distance between the chromaticity values in the faded and the dark state is large such that the optical filter or the lens including the optical filter appears to have dissimilar color in the faded and the dark state, in other embodiments, a distance between the chromaticity values in the faded and the dark state can be small such the optical filter or the lens including the optical filter appears to have similar color in the faded and the dark state In various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 6E:
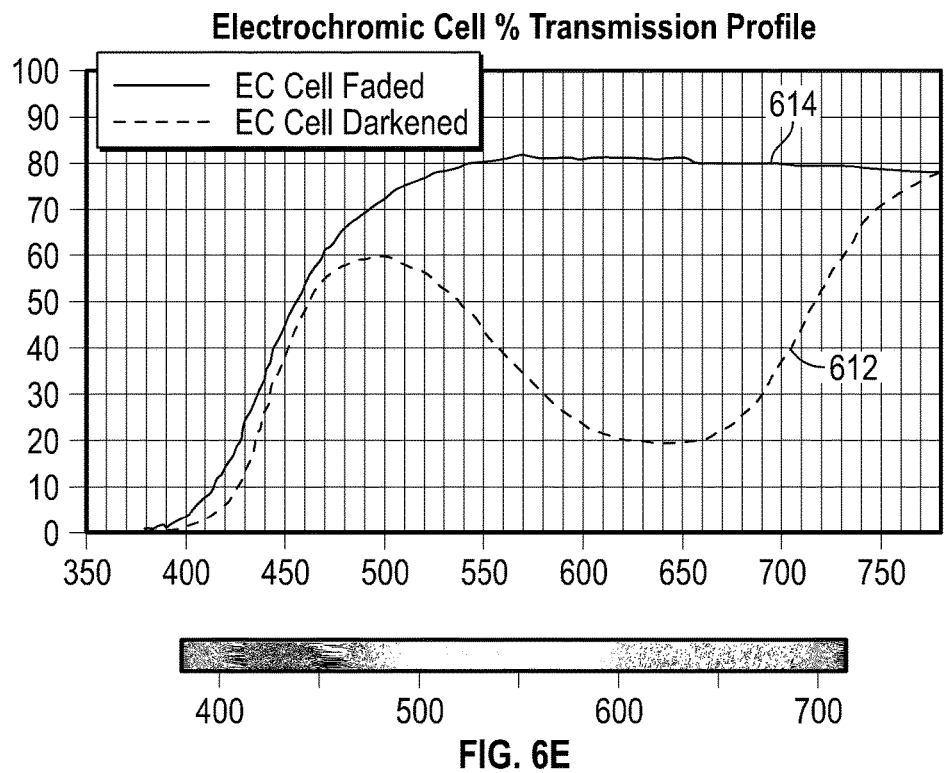

FIG. 6E illustrates the transmittance profile of the variable attenuation filter component of the optical filter whose transmittance profile is depicted in FIG. 6A and whose absorbance profile is depicted in FIG. 6B. The variable attenuation filter component can include a switching material similar to the material disclosed in U.S. Publication No. 2012/0044560 which is incorporated by reference herein in its entirety. Curve 612 depicts the transmittance profile of the variable attenuation filter component in the dark state and curve 614 depicts the absorbance profile of the variable attenuation filter component in the faded state. As noted from curve 612, the variable attenuation filter component has a maximum transmittance at about 500 nm and a reduced transmittance (corresponding to a dip) at about 650 nm. The transmittance value is about 60% for wavelengths around 500 nm. The transmittance profile has a FW80M of about 80 nm and a FW60M of about 120 nm around the wavelength of about 500 nm. The transmittance value is about 20% for wavelengths around 650 nm. Wavelengths in the range between about 580 nm and about 690 nm have a transmittance value of about 30%. Accordingly, in the dark state, the variable attenuation filter component is configured to transmit wavelengths between about 450 nm and about 560 nm (blue-green spectral region) with a higher transmittance as compared to wavelengths between about 560 nm and about 690 nm (yellow-red spectral region).

As noted from curve 614, the variable attenuation filter component has a transmittance between about 70% and about 80% for all wavelengths in the spectral range between about 490 nm and 700 nm in the faded state and a transmittance between about 10% and about 70% for all wavelengths in the spectral range between about 410 nm and 490 nm in the faded state. It is further observed from curves 612 and 614 that the difference between the transmittance through the variable attenuation filter component between about 410 nm and about 600 nm and about 660 nm and about 700 nm in dark state and the faded state varies.

Figure 6F:
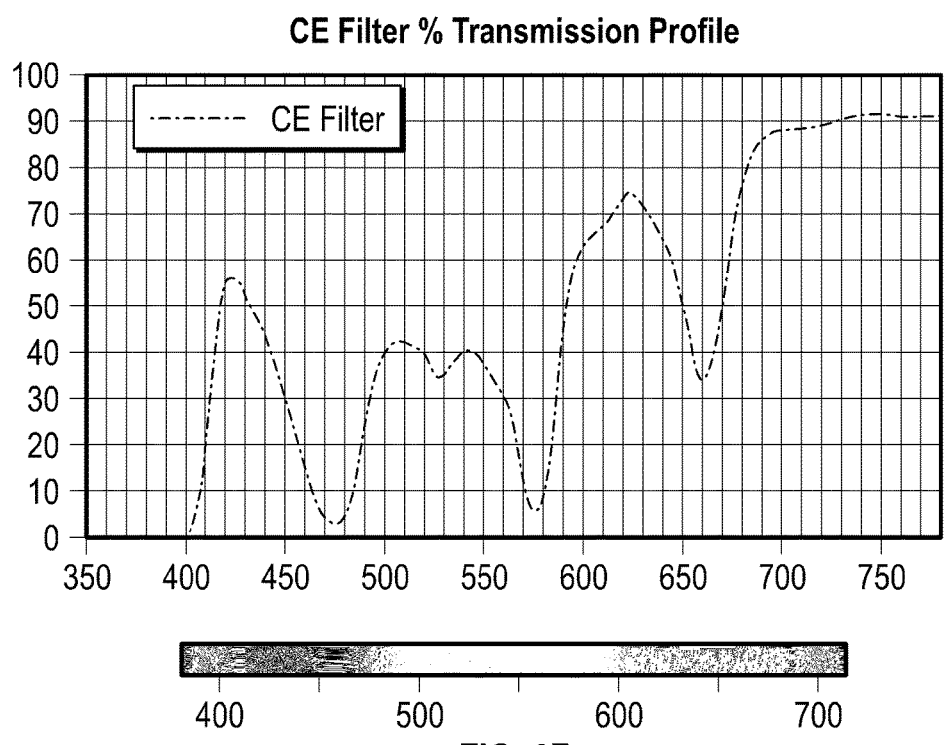

FIG. 6F illustrates the transmittance profile of the chroma enhancing filter component of the optical filter whose transmittance profile is depicted in FIG. 6A and whose absorbance profile is depicted in FIG. 6B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 580 nm and about 650 nm. It is noted from FIG. 6F that the first pass-band has maximum transmittance at about 425 nm and the third pass-band has maximum transmittance at about 625 nm. It is noted from FIG. 6F that the second pass-band has a transmittance of about 40% between about 500 nm and 550 nm. Without any loss of generality, the transmittance profile illustrated in FIG. 6A is a sum of the transmittance profile of the variable attenuation filter component of the optical filter depicted in FIG. 6E and the transmittance profile of the chroma enhancing filter component of the optical filter depicted in FIG. 6F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 11 mg of a first dye having an absorbance peak with a maximum absorbance value at 473 nm (e.g. EXCITON ABS 473), 20.08 mg of a second dye having an absorbance peak with a maximum absorbance value at 515 nm (e.g. EXCITON ABS 515), 15.64 mg of a third dye having an absorbance peak with a maximum absorbance value at 574 nm (e.g. EXCITON ABS 574), and 1.68 mg of a fourth dye having an absorbance peak with a maximum absorbance value at 659 nm (e.g. EXCITON ABS 659) incorporated in 1 pound of a resin.

Figure 6G:
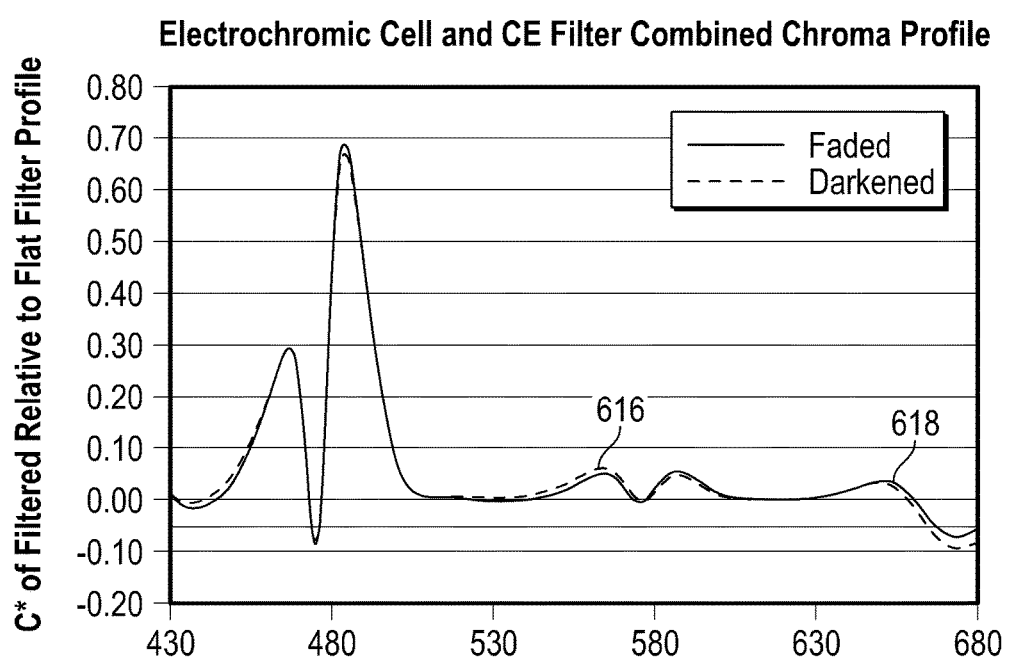

FIG. 6G shows the chroma profile of the lens including the optical filter having an absorbance profile as shown in FIG. 6B. Curve 616 is the combined chroma profile of the variable filter component and the chroma enhancing filter component in the dark state and curve 618 is the combined chroma profile of the variable filter component and the chroma enhancing filter component in the faded state. Curves 616 and 618 indicate that the optical filter having an absorbance profile as shown in FIG. 6B provides an increase in chroma in a first spectral window between 450 nm and 500 nm, a second spectral window between 550 nm and 600 nm and a third spectral window between 630 nm and 660 nm as compared to a flat filter.

It is noted from FIG. 6G that the chroma profile in the faded state and the chroma profile in the dark state coincide indicating that toggling the optical filter between the dark state and the faded state does not alter the chroma value of the transmitted light as perceived by the HVS.

Example Embodiment 3—Golf

Figure 7A:
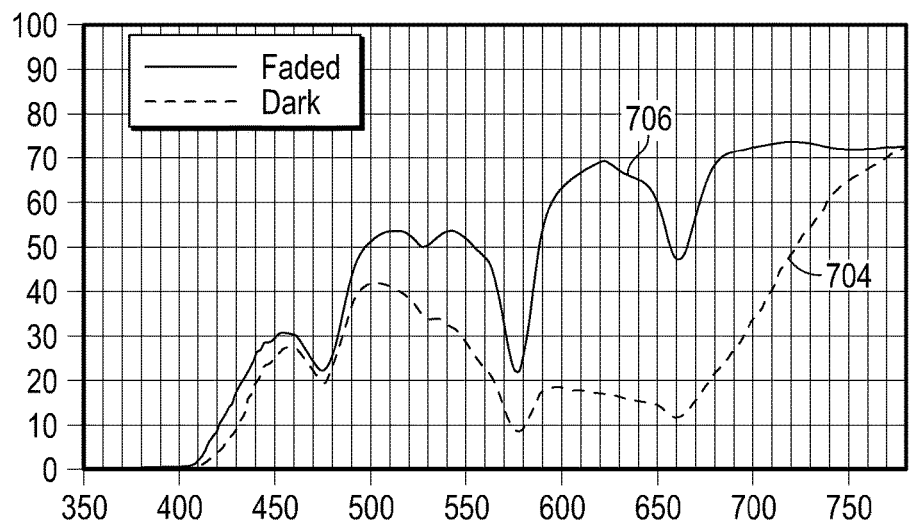
Figure 7A:
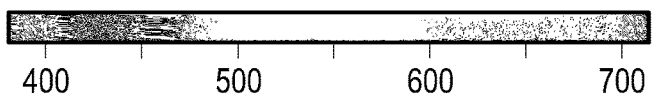
Figure 7B:
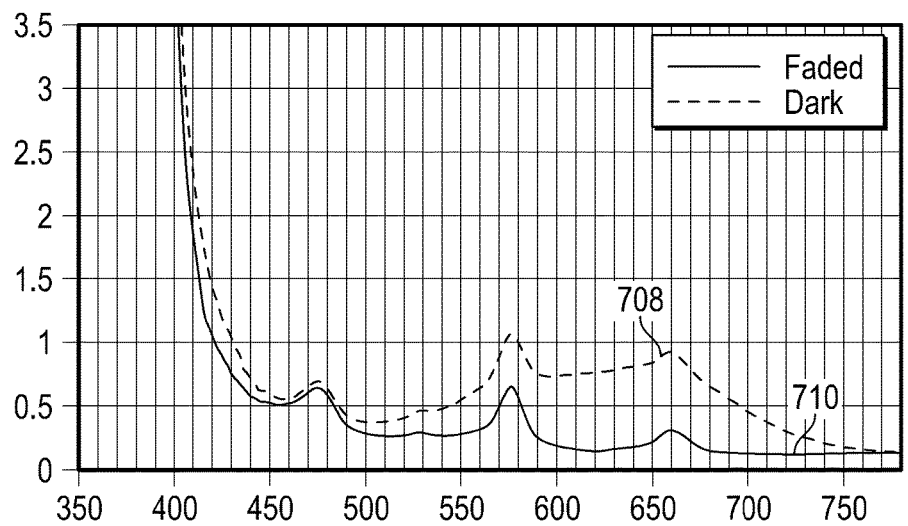
Figure 7B:
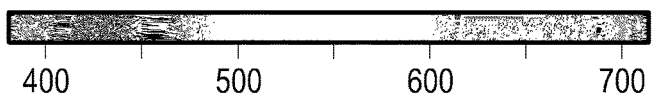

FIG. 7A illustrates the transmittance profile of another optical filter included in an embodiment of a lens that can be suitable for golf. The lens can have general structures and features similar to embodiments described above with reference to FIGS. 2-4. FIG. 7B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 7A, the transmittance profile of the embodiment of the filter in the dark state is represented by the curve 704 and the transmittance profile of the embodiment of the filter in the faded state is represented by the curve 706. In FIG. 7B, the absorbance profile of the embodiment of the filter in the dark state is represented by the curve 708 and the absorbance profile of the embodiment of the filter in the faded state is represented by the curve 710.

Referring to FIG. 7B, it is observed from curve 708 that the absorbance profile in the dark state has an absorbance peak with a maximum absorbance value at about 575 nm. The absorbance peak has a FW80M of about 10-15 nm. The absorbance profile in the faded state and the dark state indicates a sharp increase in the absorbance at wavelengths less than about 410 nm consistent with the presence of an edge filter.

It is further observed from curve 708 that the absorbance profile in the dark state has first valley in the wavelength range between about 450 nm and about 550 nm and a second valley in the wavelength range between about 590 nm and about 700 nm. Wavelengths in the first valley have an average absorbance value that is about 40%-50% of the maximum absorbance value. Wavelengths in the second valley have an average absorbance value that is about 60%-80% of the maximum absorbance value.

Referring to FIG. 7B, it is observed from curve 710 that the absorbance profile in the faded state has an absorbance peak with a maximum absorbance value at about 575 nm. The maximum absorbance value in the faded state is lower than the maximum absorbance value in the dark state indicating that the transmittance of light for wavelengths in the absorbance peak in the faded state is higher than the transmittance of light for wavelengths in the absorbance peak in the dark state. From curve 710 it is observed that the absorbance peak has a FW80M of about 10-15 nm.

The absorbance profile in the faded state has a first valley in the wavelength range between about 490 nm and about 560 nm and a second valley in the wavelength range between about 590 nm and about 700 nm. Wavelengths in the first valley have an average absorbance value that is about 50% of the maximum absorbance value. Wavelengths in the second valley have an average absorbance value that is about 50%-60% of the maximum absorbance value. The absorbance values for wavelengths in the first and second valleys in the faded state is lower than the absorbance values for wavelengths in the first and second valleys in the dark state indicating that the transmittance of light for wavelengths in the first and second valleys in the faded state is higher than the transmittance of light for wavelengths in the first and second valleys in the dark state.

The transmittance profile in the dark state represented by curve 704 in FIG. 7A shows that the transmittance in the dark state varies between about 1% and about 42% for wavelengths in the range between about 410 nm and about 700 nm. Wavelengths in the range between 480 nm and 550 nm are transmitted with higher transmittance (e.g., greater than 30%) as compared to wavelengths between 410 and 480 and between 570 and 650 nm.

The transmittance profile in the faded state represented by curve 706 in FIG. 7A, has a first pass-band configured to transmit between about 30% and about 53% of light in the green-yellow spectral ranges (e.g., between about 480 nm and about 570 nm) and a second pass-band configured to transmit between about 50% and about 70% of the light in the orange-red spectral ranges (e.g., between about 590 nm and about 660 nm). Accordingly, the optical filter is configured to transmit more light in the faded state than in the dark state. As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 7A, is about 49.2% in the faded state (represented by curve 706) and is about 25.1% in the dark state (represented by curve 704). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 7C:
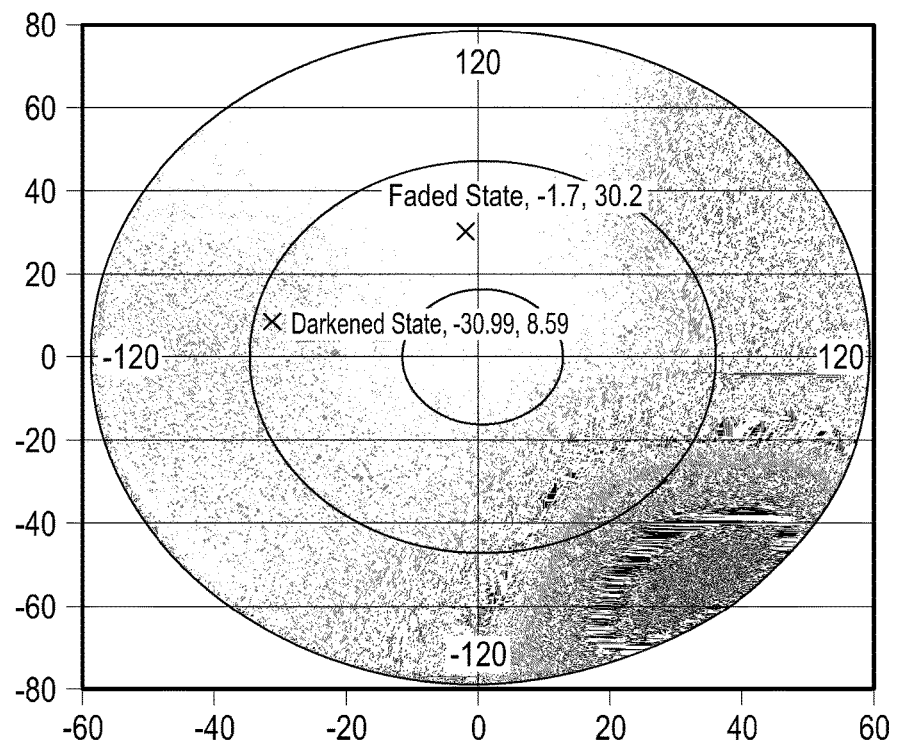
Figure 7D:
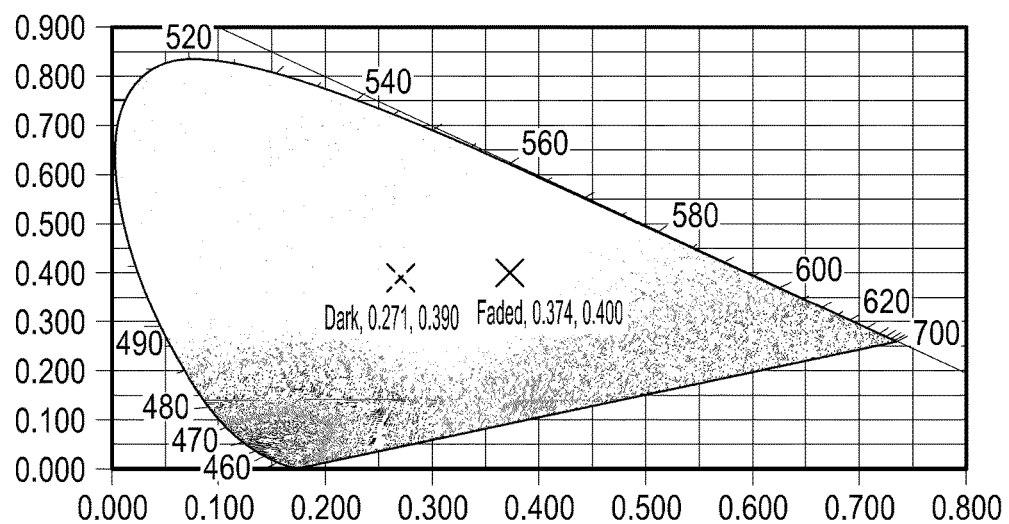

FIGS. 7C and 7D show the chromaticity diagram of the lens including the optical filter having an absorbance profile as shown in FIG. 7B. FIG. 7C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 7C, the chromaticity of the optical filter or the embodiment of the lens including the optical filter has a chroma value of −1.7 and a hue value of 30.2 in the faded state and can appear greenish yellow to an observer. The chromaticity of the optical filter or the embodiment of the lens including the optical filter has a chroma value of −30.99 and a hue value of 8.59 in the dark state and can appear green to an observer. FIG. 7D shows the chromaticity diagram of the optical filter or the embodiment of the lens including the optical filter in the CIE xyY color space. Referring to FIG. 7D, the chromaticity of the optical filter or the embodiment of the lens including the optical filter has a CIE x value of 0.374 and a CIE y value of 0.400 in the faded state. The chromaticity of the optical filter or the embodiment of the lens including the optical filter has a CIE x value of 0.271 and a CIE y value of 0.39 in the dark state. In various embodiments a distance between the chromaticity values in the faded and the dark state can be large such that the optical filter or the lens including the optical filter appears to have dissimilar color in the faded and the dark state or small such the optical filter or the lens including the optical filter appears to have similar color in the faded and the dark state In various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 7E:
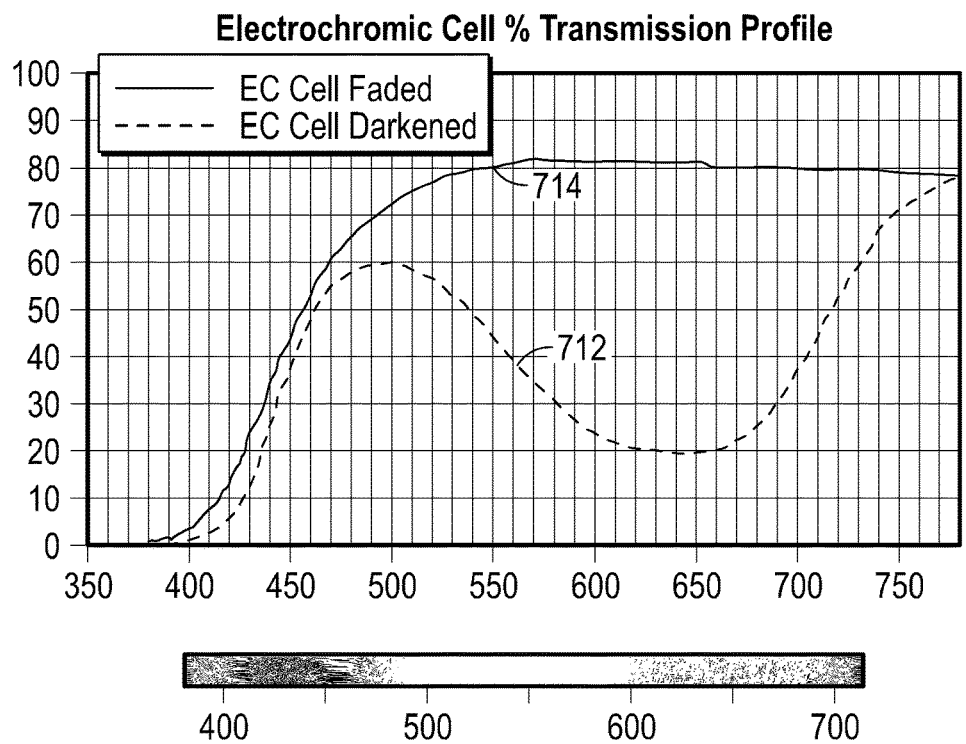

FIG. 7E illustrates the transmittance profile of the variable attenuation filter component of the optical filter whose transmittance profile is depicted in FIG. 6A and whose absorbance profile is depicted in FIG. 7B. The variable attenuation filter component can include a switching material similar to the material disclosed in U.S. Publication No. 2012/0044560 which is incorporated by reference herein in its entirety. Curve 712 depicts the transmittance profile of the variable attenuation filter component in the dark state and curve 714 depicts the absorbance profile of the variable attenuation filter component in the faded state. As noted from curve 712, the variable attenuation filter component has a maximum transmittance at about 500 nm and a reduced transmittance at about 650 nm. The transmittance value is about 60% for wavelengths around 500 nm. The transmittance profile has a FW80M of about 80 nm and a FW60M of about 120 nm around 500 nm. The transmittance value is about 20% for wavelengths around 650 nm. Wavelengths in the range between about 580 nm and about 690 nm have a transmittance value of about 30%. Accordingly, in the dark state, the variable attenuation filter component is configured to transmit wavelengths between about 450 nm and about 560 nm (blue-green spectral region) with a higher transmittance as compared to wavelengths between about 560 nm and about 690 nm (yellow-red spectral region).

As noted from curve 714, the variable attenuation filter component has a transmittance between about 70% and about 80% for all wavelengths in the spectral range between about 490 nm and 700 nm in the faded state and a transmittance between about 10% and about 70% for all wavelengths in the spectral range between about 410 nm and 490 nm in the faded state. It is further observed from curves 712 and 714 that the difference between the transmittance through the variable attenuation filter component between about 410 nm and about 600 nm and about 660 nm and about 700 nm in dark state and the faded state varies.

Figure 7F:
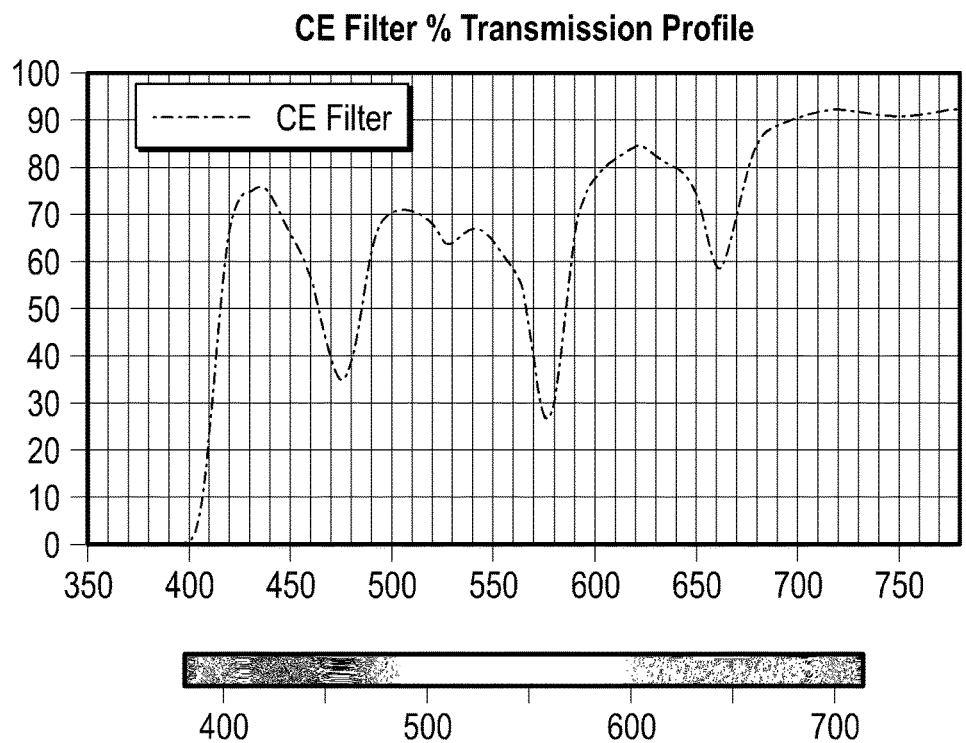

FIG. 7F illustrates the transmittance profile of the chroma enhancing filter component of the optical filter whose transmittance profile is depicted in FIG. 7A and whose absorbance profile is depicted in FIG. 7B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 590 nm and about 650 nm. It is noted from FIG. 7F that the first pass-band has a transmittance between about 50% and about 78% in the wavelength range between about 415 nm and about 465 nm; a second pass-band has a transmittance between about 50% and about 70% in the wavelength range between about 485 nm and about 565 nm; and the third pass-band has a transmittance between about 60% and about 85% in the wavelength range between about 590 nm and about 660 nm. Without any loss of generality, the transmittance profile illustrated in FIG. 7A is a sum of the transmittance profile of the variable attenuation filter component of the optical filter depicted in FIG. 7E and the transmittance profile of the chroma enhancing filter component of the optical filter depicted in FIG. 7F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 3 mg of a first dye having an absorbance peak with a maximum absorbance value at 473 nm (e.g. EXCITON ABS 473), 6 mg of a second dye having an absorbance peak with a maximum absorbance value at 515 nm (e.g. EXCITON ABS 515), 7 mg of a third dye having an absorbance peak with a maximum absorbance value at 574 nm (e.g. EXCITON ABS 574), and 1.0 mg of a fourth dye having an absorbance peak with a maximum absorbance value at 659 nm (e.g. EXCITON ABS 659) incorporated in 1 pound of a resin.

Figure 7G:
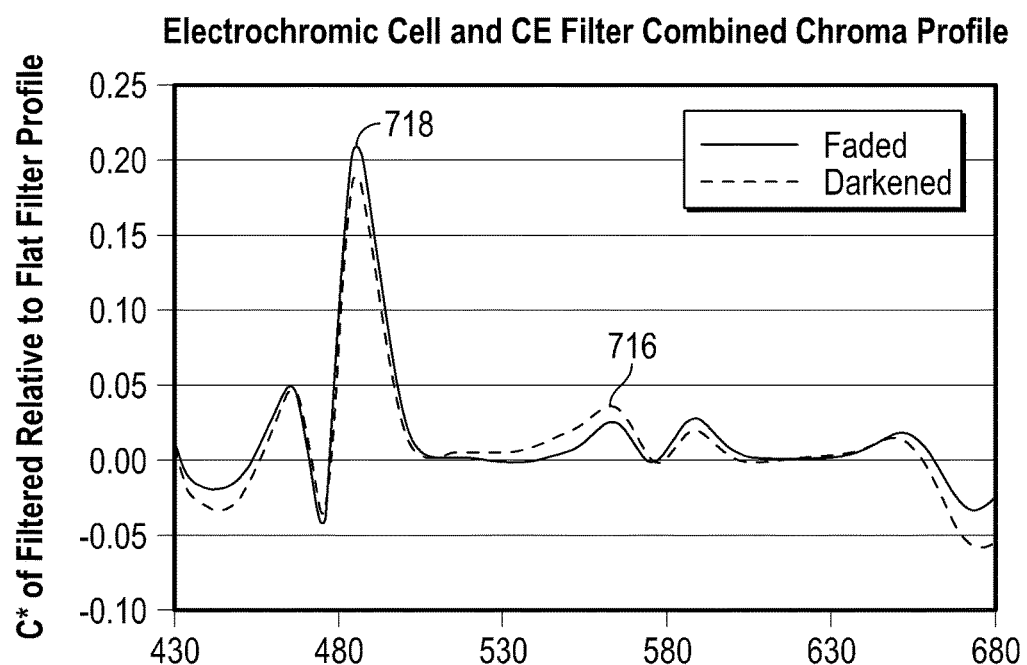

FIG. 7G shows the chroma profile of the lens including the optical filter having an absorbance profile as shown in FIG. 7B. Curve 716 is the combined chroma profile of the variable filter component and the chroma enhancing filter component in the dark state and curve 718 is the combined chroma profile of the variable filter component and the chroma enhancing filter component in the faded state. Curves 716 and 718 indicate that the optical filter having an absorbance profile as shown in FIG. 7B provides an increase in chroma in a first spectral window between 450 nm and 500 nm, a second spectral window between 550 nm and 600 nm and a third spectral window between 630 nm and 660 nm as compared to a flat filter.

It is noted from FIG. 7G that the chroma profile in the faded state is different from the chroma profile in the dark state indicating that toggling the optical filter between the dark state and the faded state alter the chroma value of the transmitted light as perceived by the HVS.

Example Embodiment 4—Baseball Outfield

Various embodiments of lenses used for baseball preferably allow the ball player to spot the baseball in different lighting conditions (e.g., bright lighting on sunny days, diffused lighting on cloudy days, spot lighting and flood lighting for playing at night, etc.). It would also be advantageous to include filters that made the baseball stand out against the sky and the field in various embodiments of the lenses used for baseball. Additionally, various embodiments of the lenses used for baseball can include coatings, layers or films that reduce glare (e.g., glare resulting from sunlight on bright sunny days or spot lights and flood light in the night). The coatings, layers or films that reduce glare can include polarizing films and/or coatings to filter out polarized light, holographic or diffractive elements that are configured to reduce glare and/or diffusing elements. Various embodiments of lenses suitable for baseball can include one or more filters that transmit different colors in the visible spectral range with different values to create different viewing conditions. For example, some embodiments of lenses for baseball can transmit all colors of the visible spectrum such that there is little distortion on bright sunny days. As another example, some embodiments of lenses for baseball can transmit colors in the yellow and red spectral ranges and attenuate and/or absorb colors in the blue and green spectral ranges such that the baseball can stand out against the blue sky or the green grass. Various embodiments of lenses used for baseball can also be tinted (e.g., grey, green, amber, brown or yellow) to increase visibility of baseball against the sky or the grass, reduce eye strain and/or for aesthetic purpose.

In addition to one or more CE filters, various embodiments of lenses suitable for golfing can include one or more variable attenuation filters that can be switched between a first filter state and a second filter state based on an input signal from the baseball player. The input signal can be an electrical pulse, an electrical voltage, an electrical current or exposure to a radiation. In various embodiments, the variable attenuation filters can be configured to switch between a first filter state and a second filter state transmit when exposed to an electromagnetic radiation. The variable attenuation filter can be configured to maintain the filter state without requiring a supply of energy. In various embodiments, the variable attenuation filters can be configured to toggle between a first state and a second state based on an input from the baseball player.

Figure 8A:
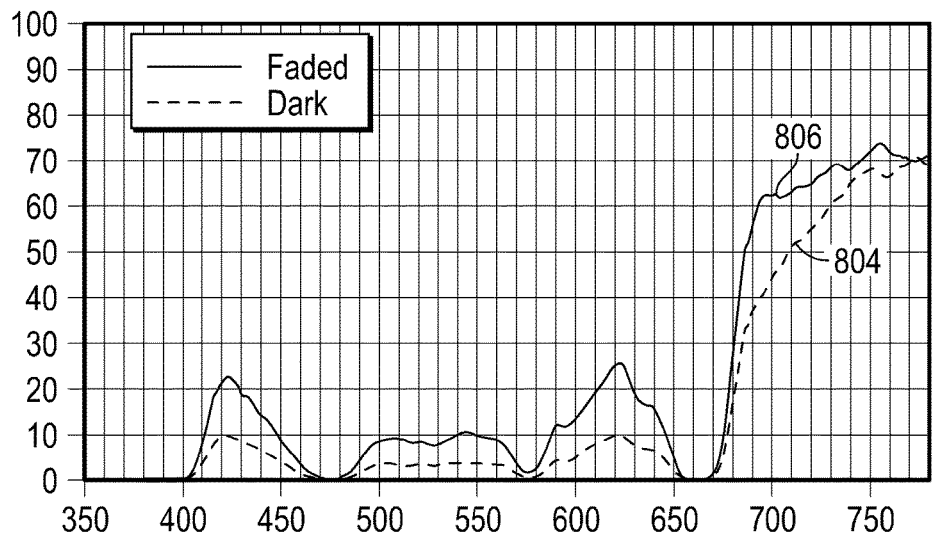
Figure 8A:
Figure 8B:
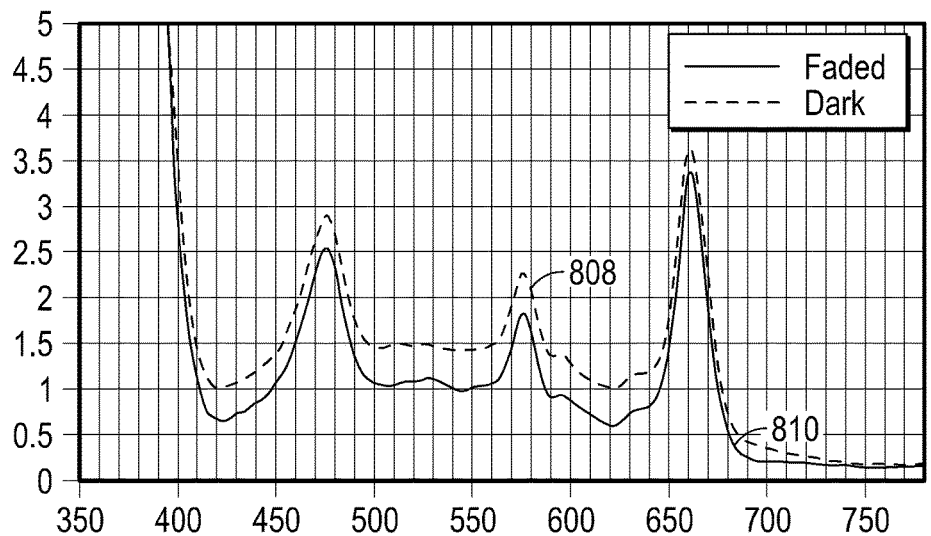
Figure 8B:

FIG. 8A illustrates the transmittance profile of an optical filter included in an embodiment of a lens that can be suitable for players in the outfield. The lens can have general structures and features similar to embodiments described above with reference to FIGS. 2-4. FIG. 8B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 8A, the transmittance profile of the embodiment of the filter in the dark state is represented by the curve 804 and the transmittance profile of the embodiment of the filter in the faded state is represented by the curve 806. In FIG. 8B, the absorbance profile of the embodiment of the filter in the dark state is represented by the curve 808 and the absorbance profile of the embodiment of the filter in the faded state is represented by the curve 810.

Referring to FIG. 8B, it is observed from curve 808 that the absorbance profile in the dark state has a first absorbance peak with a maximum absorbance value at about 475 nm, a second absorbance peak with a maximum absorbance value at about 575 nm and a third absorbance peak with a maximum absorbance value at about 660 nm. It is noted from curve 808 that the first peak has a FW80M of about 18-25 nm and a FW60M of about 25-35 nm. The second peak has a FW80M of about 10-15 nm and a full width at 70% maximum absorbance value (FW70M) of about 15-20 nm. The third peak has a FW80M of about 10-15 nm and a FW60M of about 15-20 nm. The absorbance profile in the faded state and the dark state indicates a sharp increase in the absorbance at wavelengths less than about 410 nm consistent with the presence of an edge filter.

It is further observed from curve 808 that the absorbance profile in the dark state has first valley in the wavelength range between about 410 nm and about 450 nm; a second valley in the wavelength range between about 500 nm and about 550 nm; and a third valley in the wavelength range between about 590 nm and about 650 nm. Wavelengths in the first valley have an average absorbance value that is about 40%-50% of the maximum absorbance value of the first peak. Wavelengths in the second valley have an average absorbance value that is about 50% of the maximum absorbance value of the first peak and about 60%-70% of the maximum absorbance value of the second peak. Wavelengths in the third valley have an average absorbance value that is about 50%-60% of the maximum absorbance value of the second peak and about 30%-40% of the maximum absorbance value of the third peak.

Referring to FIG. 8B, it is observed from curve 810 that the absorbance profile in the faded state has a first absorbance peak with a maximum absorbance value at about 475 nm, a second absorbance peak with a maximum absorbance value at about 575 nm and a third absorbance peak with a maximum absorbance value at about 660 nm. The maximum absorbance value for the first, second and third absorbance peaks in the faded state is lower than the maximum absorbance value for the first, second and third absorbance peaks in the dark state indicating that the transmittance of light for wavelengths in the first, second and third absorbance peaks in the faded state is higher than the transmittance of light for wavelengths in the first, second and third absorbance peaks in the dark state. From curve 810 it is observed that the first peak has a FW80M of about 15-20 nm and a FW60M of about 25-30 nm. The second peak has a FW80M of about 10-15 nm and a FW60M of about 15-20 nm. The third peak has a FW80M of about 10-15 nm and a FW60M of about 15-20 nm.

The absorbance profile in the faded state has a first valley in the wavelength range between about 410 nm and about 450 nm; a second valley in the wavelength range between about 500 nm and about 560 nm; and a third valley in the wavelength range between about 590 nm and about 650 nm. Wavelengths in the first valley have an average absorbance value that is about 30%-40% of the maximum absorbance value of the first peak. Wavelengths in the second valley have an average absorbance value that is about 30%-40% of the maximum absorbance value of the first peak and about 50%-60% of the maximum absorbance value of the second peak. Wavelengths in the third valley have an average absorbance value that is about 40%-50% of the maximum absorbance value of the second peak and about 20%-30% of the maximum absorbance value of the third peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 804 in FIG. 8A, has a first pass-band configured to transmit between about 1% and about 10% of light in the violet-blue spectral ranges (e.g., between about 410 nm and about 460 nm); a second pass-band configured to transmit between about 1% and about 5% of the light in the green-yellow spectral ranges (e.g., between about 490 nm and about 570 nm); and a third pass-band configured to transmit between about 1% and about 10% of the light in the orange-red spectral ranges (e.g., between about 580 nm and about 650 nm).

The transmittance profile in the faded state represented by curve 806 in FIG. 8A, has a first pass-band configured to transmit between about 1% and about 23% of light in the violet-blue spectral ranges (e.g., between about 410 nm and about 460 nm); a second pass-band configured to transmit between about 1% and about 10% of the light in the green-yellow spectral ranges (e.g., between about 480 nm and about 570 nm); and a third pass-band configured to transmit between about 5% and about 25% of the light in the orange-red spectral ranges (e.g., between about 580 nm and about 650 nm). Accordingly, the optical filter is configured to transmit more light in the faded state than in the dark state. As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 8A, is about 9.3% in the faded state (represented by curve 806) and is about 3.7% in the dark state (represented by curve 804). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 8C:
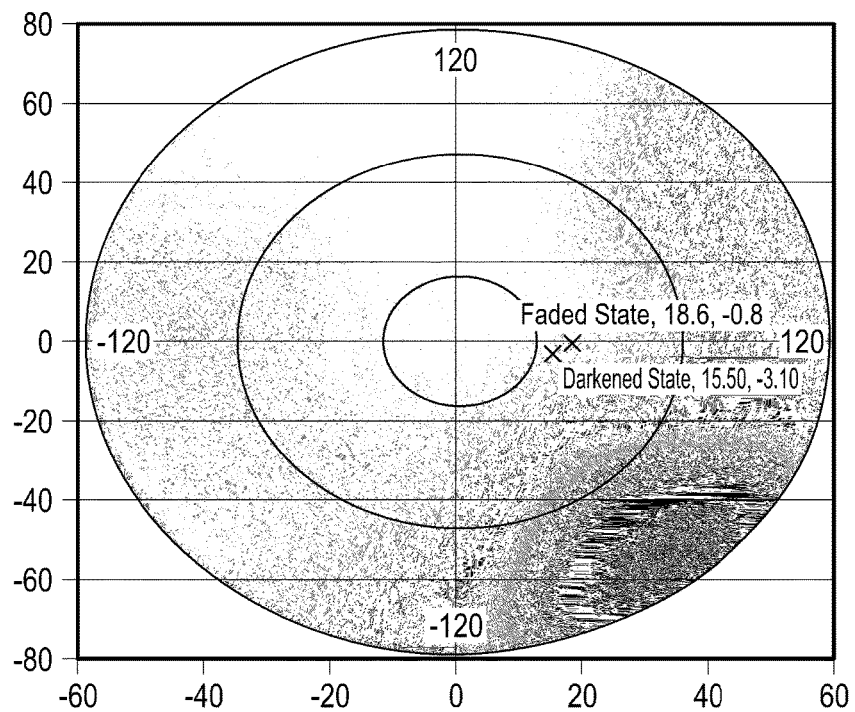
Figure 8D:
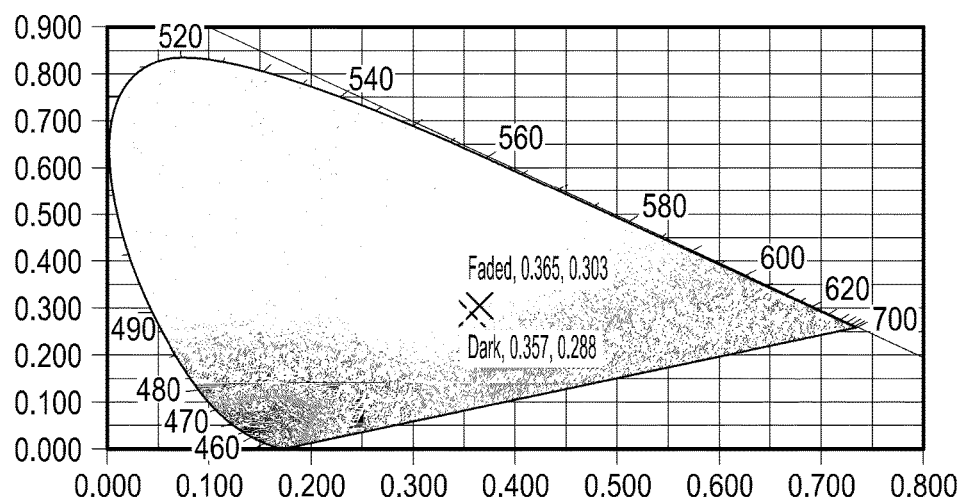

FIGS. 8C and 8D show the chromaticity diagram of the lens including the optical filter having an absorbance profile as shown in FIG. 8B. FIG. 8C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 8C, the chromaticity of the optical filter or the embodiment of the lens including the optical filter has a chroma value of 18.6 and a hue value of −0.6 in the faded state and can appear greyish purple to an observer. The chromaticity of the optical filter or the embodiment of the lens including the optical filter has a chroma value of 15.5 and a hue value of −3.1 in the dark state and can appear bluish grey to an observer. FIG. 8D shows the chromaticity diagram of the optical filter or the embodiment of the lens including the optical filter in the CIE xyY color space. Referring to FIG. 8D, the chromaticity of the optical filter or the embodiment of the lens including the optical filter has a CIE x value of 0.365 and a CIE y value of 0.303 in the faded state. The chromaticity of the optical filter or the embodiment of the lens including the optical filter has a CIE x value of 0.357 and a CIE y value of 0.288 in the dark state. Although, in the illustrated embodiment, a distance between the chromaticity values in the faded and the dark state is small such that the optical filter or the lens including the optical filter appears to have similar color in the faded and the dark state, in other embodiments, a distance between the chromaticity values in the faded and the dark state can be large such the optical filter or the lens including the optical filter appears to have dissimilar color in the faded and the dark state As discussed above, in various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 8E:
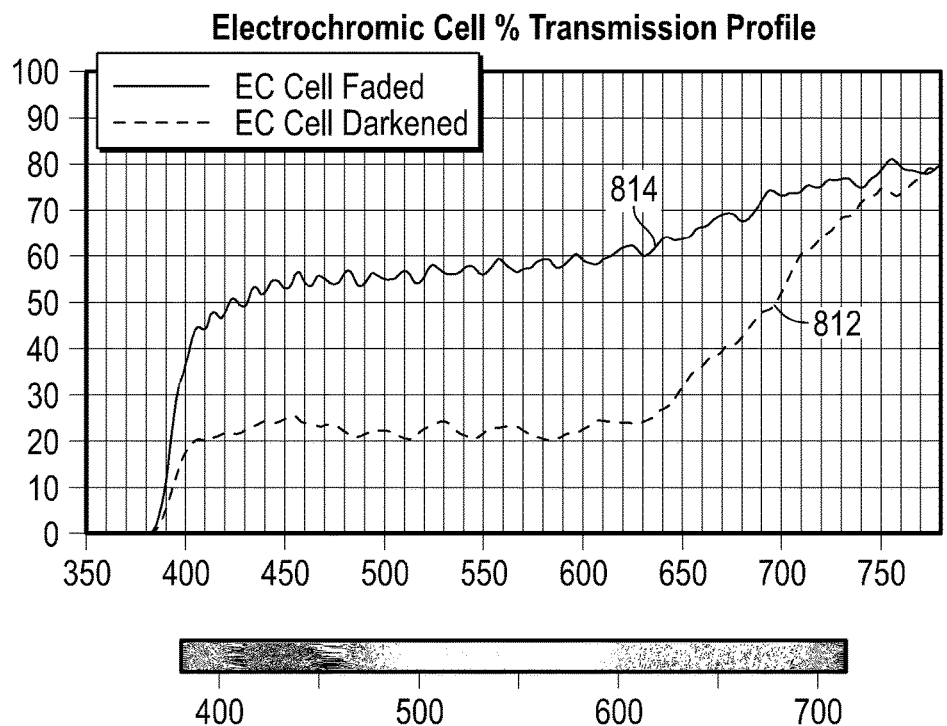

FIG. 8E illustrates the transmittance profile of the variable attenuation filter component of the optical filter whose transmittance profile is depicted in FIG. 8A and whose absorbance profile is depicted in FIG. 8B. The variable attenuation filter component can include a cell including an electro-chromic material similar to the cell disclosed in International Publication No. WO 2011/127015 which is incorporated by reference herein in its entirety. Curve 812 depicts the transmittance profile of the variable attenuation filter component in the dark state and curve 814 depicts the absorbance profile of the variable attenuation filter component in the faded state. As noted from curve 812, the variable attenuation filter component has a transmittance between about 20% and about 30% for all wavelengths in the spectral range between about 400 nm and 650 nm in the dark state. As noted from curve 814, the variable attenuation filter component has a transmittance between about 40% and about 70% for all wavelengths in the spectral range between about 400 nm and 650 nm in the faded state. It is further observed from curves 812 and 814 that the difference between the transmittance through the variable attenuation filter component between about 450 nm and about 600 nm in dark state and the faded state is approximately the same. Thus, the variable attenuation filter component can be considered to function as a neutral density filter for wavelengths between about 450 nm and about 600 nm.

Figure 8F:
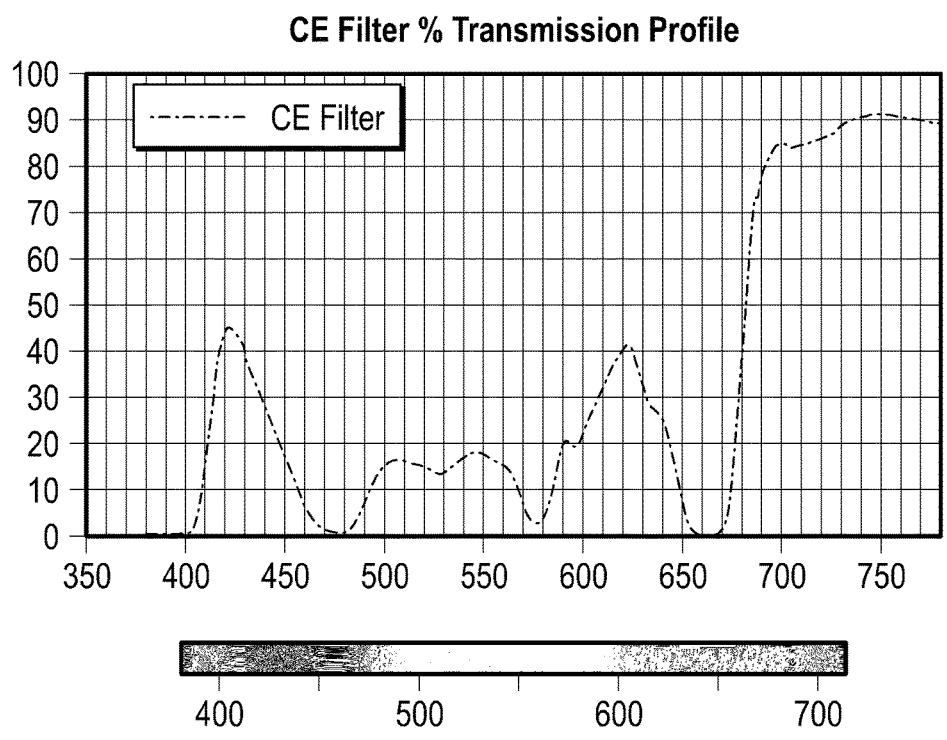

FIG. 8F illustrates the transmittance profile of the chroma enhancing filter component of the optical filter whose transmittance profile is depicted in FIG. 8A and whose absorbance profile is depicted in FIG. 8B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 580 nm and about 650 nm. It is noted from FIG. 8F that the first pass-band has a maximum transmittance at about 425 nm and third pass-band has a maximum transmittance at about 625 nm. It is noted from FIG. 8F that the second pass-band has a transmittance of about 40% between about 500 nm and 550 nm. Without any loss of generality, the transmittance profile illustrated in FIG. 8A is a sum of the transmittance profile of the variable attenuation filter component of the optical filter depicted in FIG. 8E and the transmittance profile of the chroma enhancing filter component of the optical filter depicted in FIG. 8F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 15 mg of a first dye having an absorbance peak with a maximum absorbance value at 473 nm (e.g. EXCITON ABS 473), 64.6 mg of a second dye having an absorbance peak with a maximum absorbance value at 515 nm (e.g. EXCITON ABS 515), 17.32 mg of a third dye having an absorbance peak with a maximum absorbance value at 574 nm (e.g. EXCITON ABS 574), and 18.92 mg of a fourth dye having an absorbance peak with a maximum absorbance value at 659 nm (e.g. EXCITON ABS 659) incorporated in 1 pound of a resin.

Figure 8G:
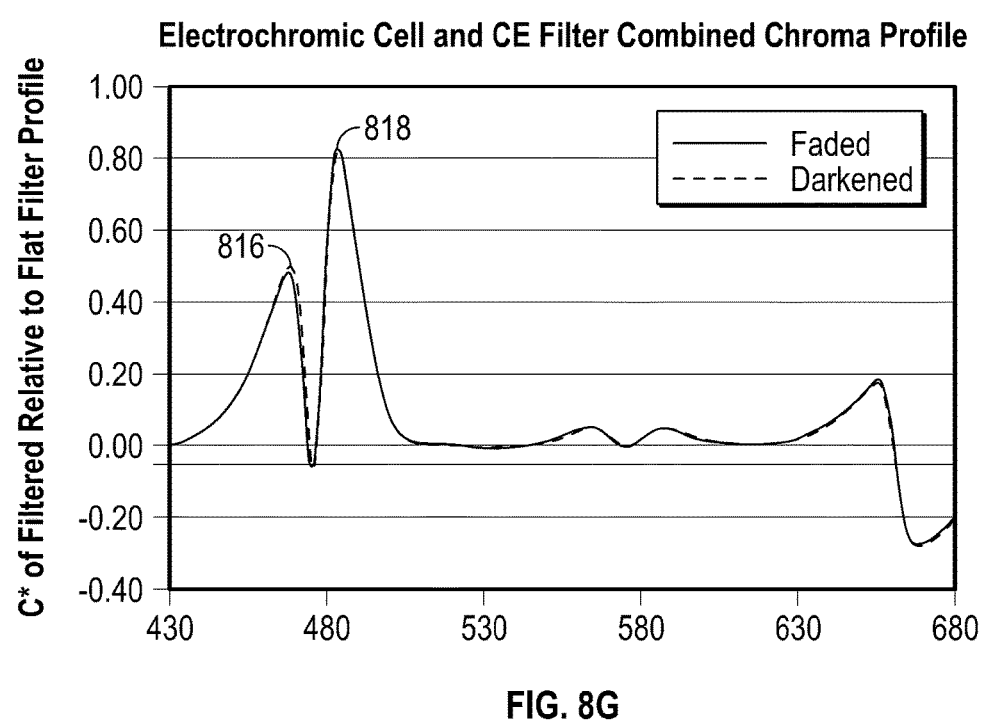

FIG. 8G shows the chroma profile of the lens including the optical filter having an absorbance profile as shown in FIG. 8B. Curve 816 is the combined chroma profile of the variable filter component and the chroma enhancing filter component in the dark state and curve 818 is the combined chroma profile of the variable filter component and the chroma enhancing filter component in the faded state.

Curves 816 and 818 indicate that the optical filter having an absorbance profile as shown in FIG. 8B provides an increase in chroma in a first spectral window between 450 nm and 500 nm, a second spectral window between 550 nm and 600 nm and a third spectral window between 630 nm and 660 nm as compared to a flat filter.

It is noted from FIG. 8G that the chroma profile in the faded state and the chroma profile in the dark state coincide indicating that toggling the optical filter between the dark state and the faded state does not alter the chroma value of the transmitted light as perceived by the HVS.

Example Embodiment 5—Baseball Outfield

Figure 9A:
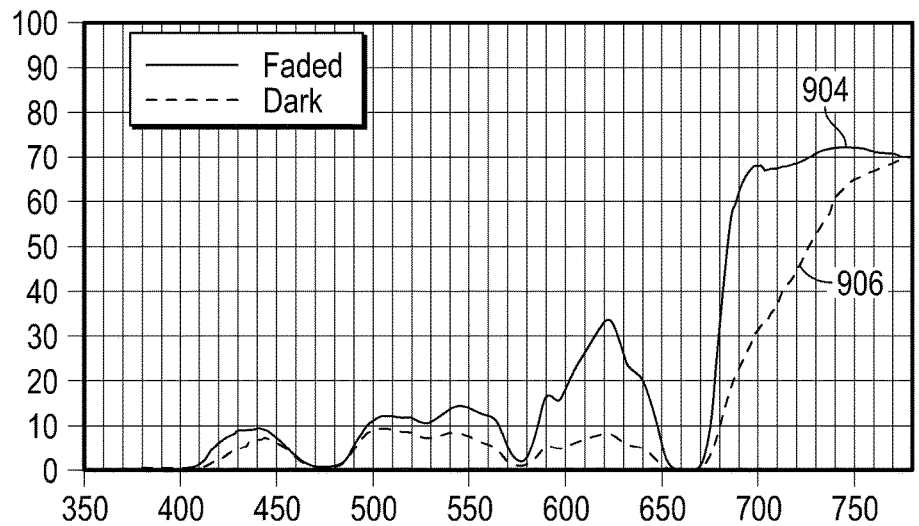
Figure 9A:
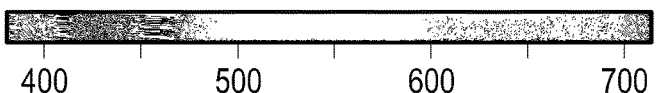
Figure 9B:
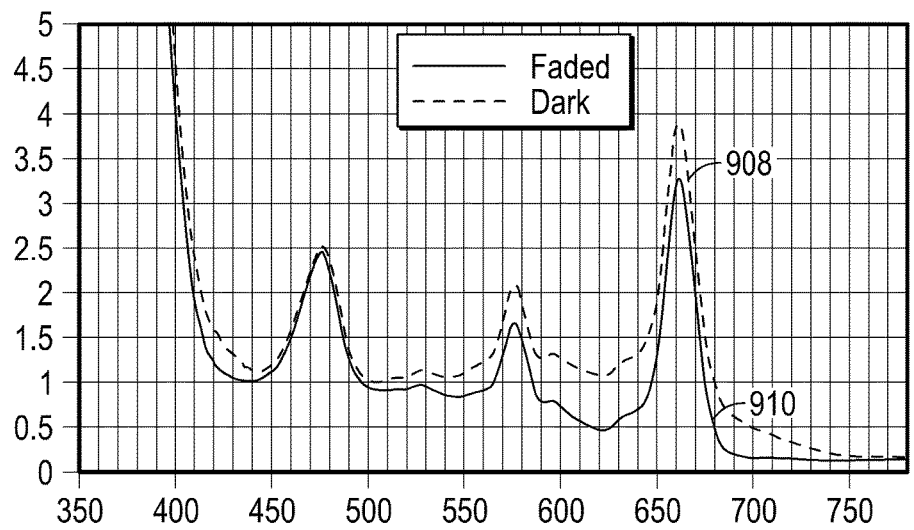
Figure 9B:
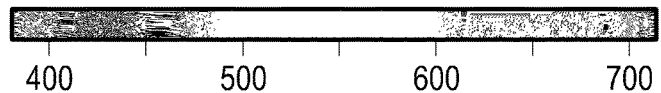

FIG. 9A illustrates the transmittance profile of another optical filter included in an embodiment of a lens that can be suitable for baseball players in the outfield. The lens can have general structures and features similar to embodiments described above with reference to FIGS. 2-4. FIG. 9B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 9A, the transmittance profile of the embodiment of the filter in the dark state is represented by the curve 904 and the transmittance profile of the embodiment of the filter in the faded state is represented by the curve 906. In FIG. 9B, the absorbance profile of the embodiment of the filter in the dark state is represented by the curve 908 and the absorbance profile of the embodiment of the filter in the faded state is represented by the curve 910.

Referring to FIG. 9B, it is observed from curve 908 that the absorbance profile in the dark state has a first absorbance peak with a maximum absorbance value at about 475 nm, a second absorbance peak with a maximum absorbance value at about 575 nm and a third absorbance peak with a maximum absorbance value at about 660 nm. It is noted from curve 908 that the first peak has a FW80M of about 15-20 nm and a FW60M of about 25-30 nm. The second peak has a FW80M of about 10-15 nm and a FW70M of about 18-25 nm. The third peak has a FW80M of about 10-15 nm and a full width at half maximum (FWHM) of about 20-25 nm. The absorbance profile in the faded state and the dark state indicates a sharp increase in the absorbance at wavelengths less than about 410 nm consistent with the presence of an edge filter.

It is further observed from curve 908 that the absorbance profile in the dark state has first valley in the wavelength range between about 430 nm and about 460 nm; a second valley in the wavelength range between about 500 nm and about 560 nm; and a third valley in the wavelength range between about 590 nm and about 650 nm. Wavelengths in the first valley have an average absorbance value that is about 40%-50% of the maximum absorbance value of the first peak. Wavelengths in the second valley have an average absorbance value that is about 40%-50% of the maximum absorbance value of the first peak and about 40%-50% of the maximum absorbance value of the second peak. Wavelengths in the third valley have an average absorbance value that is about 20%-30% of the maximum absorbance value of the second peak and about 10%-20% of the maximum absorbance value of the third peak.

Referring to FIG. 9B, it is observed from curve 910 that the absorbance profile in the faded state has a first absorbance peak with a maximum absorbance value at about 475 nm, a second absorbance peak with a maximum absorbance value at about 575 nm and a third peak with a maximum absorbance value absorbance value at 660 nm. The maximum absorbance value for the second and third absorbance peaks in the faded state is lower than the maximum absorbance value for the second and third absorbance peaks in the dark state indicating that the transmittance of light for wavelengths in the second and third absorbance peaks in the faded state is higher than the transmittance of light for wavelengths in the second and third absorbance peaks in the dark state. From curve 910 it is observed that the first peak has a FW80M of about 15-20 nm and a FW60M of about 25-30 nm. The second peak has a FW80M of about 10-15 nm and a FW60M of about 15-20 nm. The third peak has a FW80M of about 10-15 nm and a FWHM of about 15-20 nm.

The absorbance profile in the faded state has a first valley in the wavelength range between about 420 nm and about 450 nm; a second valley in the wavelength range between about 500 nm and about 560 nm; and a third valley in the wavelength range between about 590 nm and about 650 nm. Wavelengths in the first valley have an average absorbance value that is about 40% of the maximum absorbance value of the first peak. Wavelengths in the second valley have an average absorbance value that is about 40% of the maximum absorbance value of the first peak and about 50% of the maximum absorbance value of the second peak. Wavelengths in the third valley have an average absorbance value that is about 40% of the maximum absorbance value of the second peak and about 20%-30% of the maximum absorbance value of the third peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 904 in FIG. 9A, has a first pass-band configured to transmit between about 1% and about 8% of light in the violet-blue spectral ranges (e.g., between about 410 nm and about 470 nm); a second pass-band configured to transmit between about 1% and about 10% of the light in the green-yellow spectral ranges (e.g., between about 480 nm and about 570 nm); and a third pass-band configured to transmit between about 1% and about 9% of the light in the orange-red spectral ranges (e.g., between about 580 nm and about 650 nm).

The transmittance profile in the faded state represented by curve 906 in FIG. 9A, has a first pass-band configured to transmit between about 1% and about 10% of light in the violet-blue spectral ranges (e.g., between about 410 nm and about 470 nm); a second pass-band configured to transmit between about 1% and about 15% of the light in the green-yellow spectral ranges (e.g., between about 480 nm and about 570 nm); and a third pass-band configured to transmit between about 5% and about 35% of the light in the orange-red spectral ranges (e.g., between about 580 nm and about 650 nm). Accordingly, the optical filter is configured to transmit more light in the faded state than in the dark state.

As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 9A, is about 12.7% in the faded state (represented by curve 906) and is about 6.0% in the dark state (represented by curve 904). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 9C:
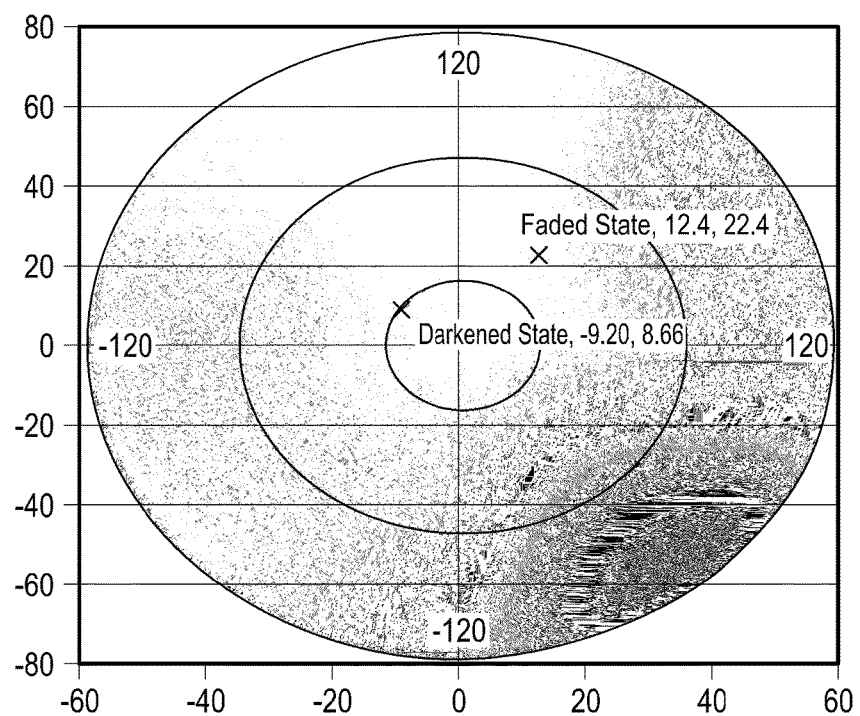
Figure 9D:
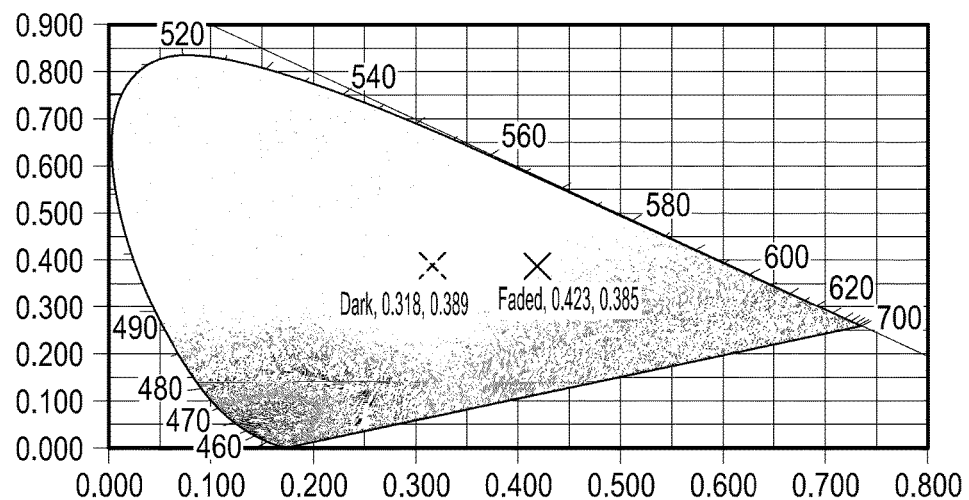

FIGS. 9C and 9D show the chromaticity diagram of the lens including the optical filter having an absorbance profile as shown in FIG. 9B. FIG. 9C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 9C, the chromaticity of the optical filter or the embodiment of the lens including the optical filter has a chroma value of 12.4 and a hue value of 22.4 in the faded state and can appear orange to an observer. The chromaticity of the optical filter or the embodiment of the lens including the optical filter has a chroma value of −9.2 and a hue value of 8.66 in the dark state and can appear greenish blue to an observer. FIG. 9D shows the chromaticity diagram of the optical filter or the embodiment of the lens including the optical filter in the CIE xyY color space. Referring to FIG. 9D, the chromaticity of the optical filter or the embodiment of the lens including the optical filter has a CIE x value of 0.423 and a CIE y value of 0.385 in the faded state. The chromaticity of the optical filter or the embodiment of the lens including the optical filter has a CIE x value of 0.318 and a CIE y value of 0.389 in the dark state. Although, in the illustrated embodiment, a distance between the chromaticity values in the faded and the dark state is large such that the optical filter or the lens including the optical filter appears to have dissimilar color in the faded and the dark state, in other embodiments, a distance between the chromaticity values in the faded and the dark state can be small such the optical filter or the lens including the optical filter appears to have similar color in the faded and the dark state In various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 9E:
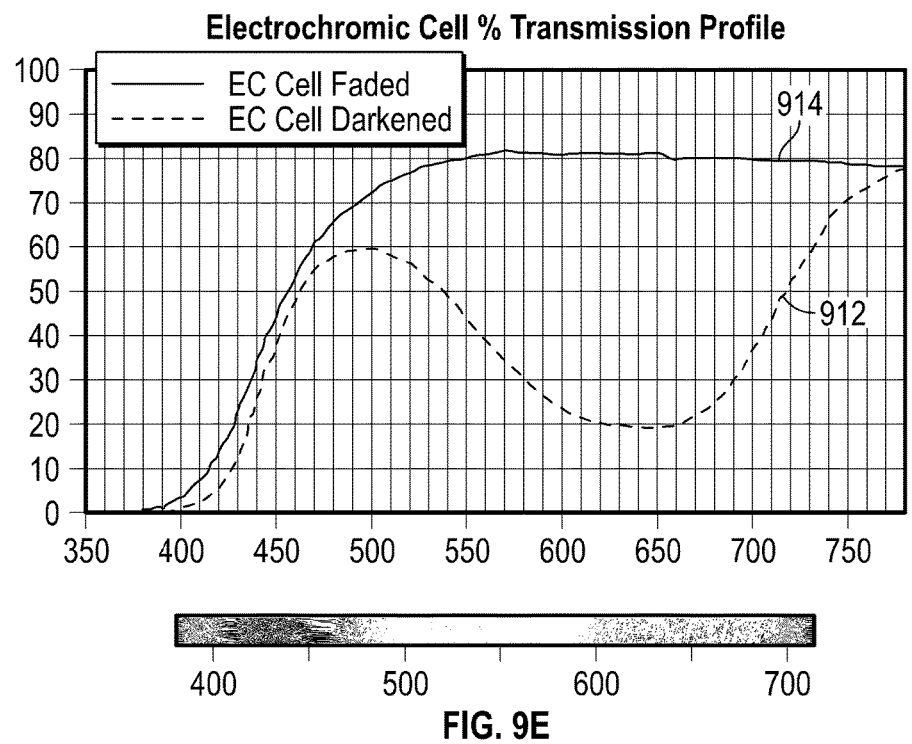

FIG. 9E illustrates the transmittance profile of the variable attenuation filter component of the optical filter whose transmittance profile is depicted in FIG. 9A and whose absorbance profile is depicted in FIG. 9B. The variable attenuation filter component can include a switching material similar to the material disclosed in U.S. Publication No. 2012/0044560 which is incorporated by reference herein in its entirety. Curve 912 depicts the transmittance profile of the variable attenuation filter component in the dark state and curve 914 depicts the absorbance profile of the variable attenuation filter component in the faded state. As noted from curve 912, the variable attenuation filter component has a maximum transmittance at about 500 nm and a reduced transmittance at about 650 nm. The transmittance value is about 60% for wavelengths around 500 nm. The transmittance profile has a FW80M of about 80 nm and a FW60M of about 120 nm around 500 nm. The transmittance value is about 20% for wavelengths around 650 nm. Wavelengths in the range between about 580 nm and about 690 nm have a transmittance value of about 30%. Accordingly, in the dark state, the variable attenuation filter component is configured to transmit wavelengths between about 450 nm and about 560 nm (blue-green spectral region) with a higher transmittance as compared to wavelengths between about 560 nm and about 690 nm (yellow-red spectral region).

As noted from curve 914, the variable attenuation filter component has a transmittance between about 70% and about 80% for all wavelengths in the spectral range between about 490 nm and 700 nm in the faded state and a transmittance between about 10% and about 70% for all wavelengths in the spectral range between about 410 nm and 490 nm in the faded state. It is further observed from curves 912 and 914 that the difference between the transmittance through the variable attenuation filter component between about 410 nm and about 600 nm and about 660 nm and about 700 nm in dark state and the faded state varies.

Figure 9F:
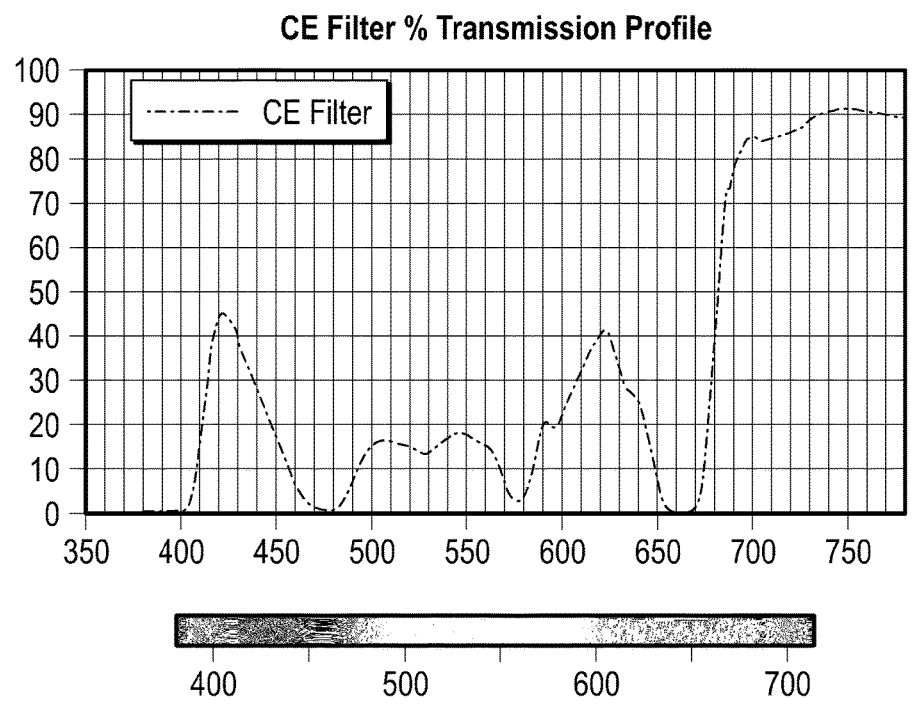

FIG. 9F illustrates the transmittance profile of the chroma enhancing filter component of the optical filter whose transmittance profile is depicted in FIG. 9A and whose absorbance profile is depicted in FIG. 9B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 580 nm and about 650 nm. It is noted from FIG. 9F that the first pass-band has a maximum transmittance at about 425 nm and third pass-band has a maximum transmittance at about 625 nm. It is noted from FIG. 9F that the second pass-band has a transmittance of about 40% between about 500 nm and 550 nm. Without any loss of generality, the transmittance profile illustrated in FIG. 9A is a sum of the transmittance profile of the variable attenuation filter component of the optical filter depicted in FIG. 9E and the transmittance profile of the chroma enhancing filter component of the optical filter depicted in FIG. 9F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 15 mg of a first dye having an absorbance peak with a maximum absorbance value at 473 nm (e.g. EXCITON ABS 473), 64.6 mg of a second dye having an absorbance peak with a maximum absorbance value at 515 nm (e.g. EXCITON ABS 515), 17.32 mg of a third dye having an absorbance peak with a maximum absorbance value at 574 nm (e.g. EXCITON ABS 574), and 18.92 mg of a fourth dye having an absorbance peak with a maximum absorbance value at 659 nm (e.g. EXCITON ABS 659) incorporated in 1 pound of a resin.

Figure 9G:
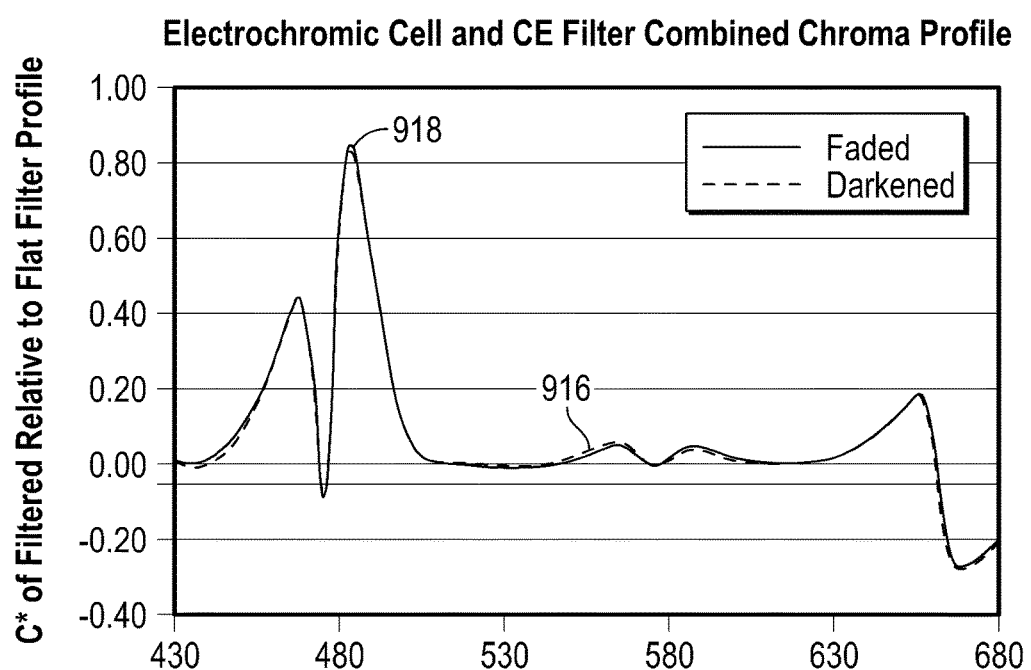

FIG. 9G shows the chroma profile of the lens including the optical filter having an absorbance profile as shown in FIG. 9B. Curve 916 is the combined chroma profile of the variable filter component and the chroma enhancing filter component in the dark state and curve 918 is the combined chroma profile of the variable filter component and the chroma enhancing filter component in the faded state. Curves 916 and 918 indicate that the optical filter having an absorbance profile as shown in FIG. 9B provides an increase in chroma in a first spectral window between 450 nm and 500 nm, a second spectral window between 550 nm and 600 nm and a third spectral window between 630 nm and 660 nm as compared to a flat filter.

It is noted from FIG. 9G that the chroma profile in the faded state and the chroma profile in the dark state coincide indicating that toggling the optical filter between the dark state and the faded state does not alter the chroma value of the transmitted light as perceived by the HVS.

Example Embodiment 6—Baseball Infield

Figure 10A:
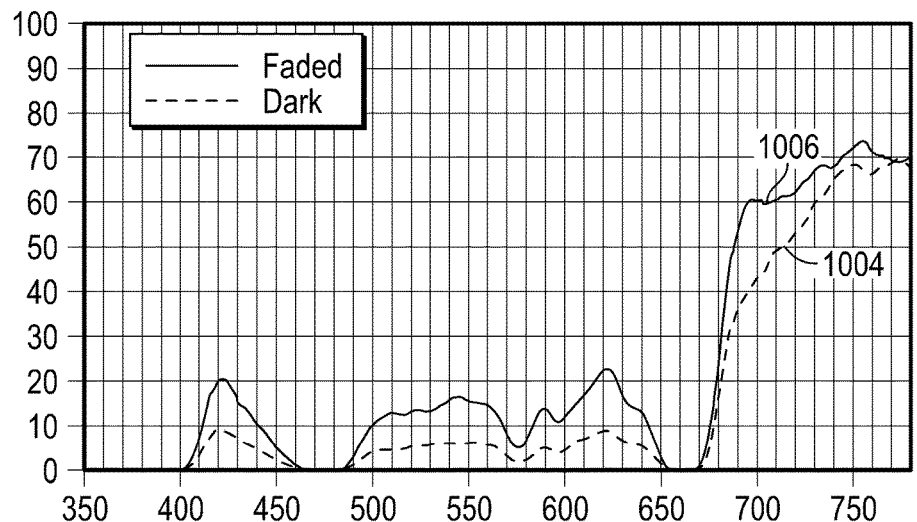
Figure 10A:
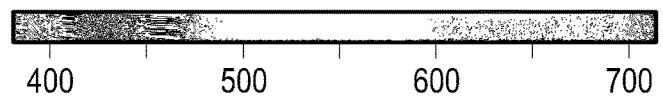
Figure 10B:
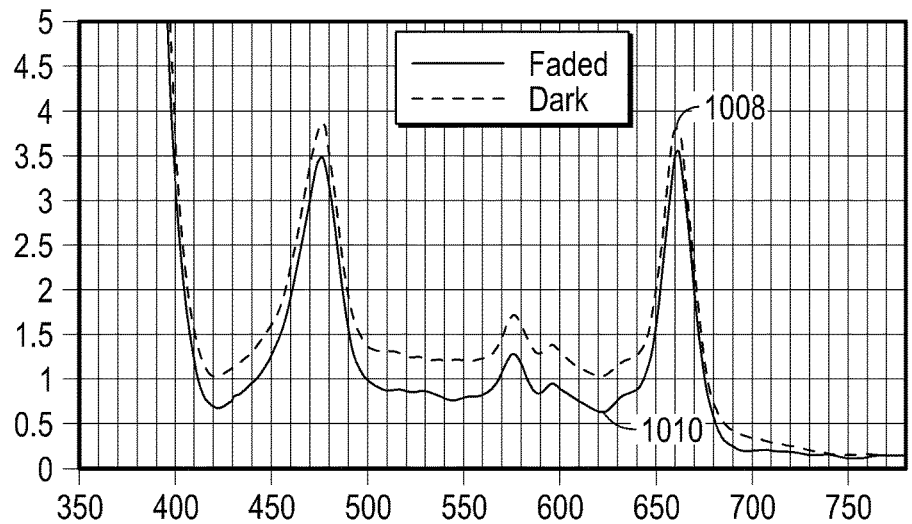
Figure 10B:
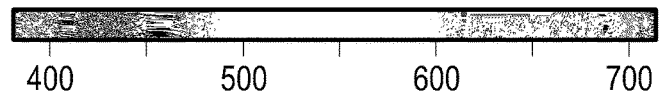

FIG. 10A illustrates the transmittance profile of an optical filter included in an embodiment of a lens that can be suitable for players in the infield. The lens can have general structures and features similar to embodiments described above with reference to FIGS. 2-4. FIG. 10B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 10A, the transmittance profile of the embodiment of the filter in the dark state is represented by the curve 1004 and the transmittance profile of the embodiment of the filter in the faded state is represented by the curve 1006. In FIG. 10B, the absorbance profile of the embodiment of the filter in the dark state is represented by the curve 1008 and the absorbance profile of the embodiment of the filter in the faded state is represented by the curve 1010.

Referring to FIG. 10B, it is observed from curve 1008 that the absorbance profile in the dark state has a first absorbance peak with a maximum absorbance value at about 475 nm, a second absorbance peak with a maximum absorbance value at about 575 nm and a third absorbance peak with a maximum absorbance value at about 660 nm. It is noted from curve 908 that the first peak has a FW80M of about 10-15 nm and a FW60M of about 18-25 nm. The second peak has a full width at 90% maximum absorbance value (FW90M) of about 10-15 nm. The third peak has a FW80M of about 10-15 nm and a FW60M of about 15-25 nm. The absorbance profile in the faded state and the dark state indicates a sharp increase in the absorbance at wavelengths less than about 410 nm consistent with the presence of an edge filter.

It is further observed from curve 1008 that the absorbance profile in the dark state has first valley in the wavelength range between about 410 nm and about 450 nm; a second valley in the wavelength range between about 500 nm and about 550 nm; and a third valley in the wavelength range between about 590 nm and about 640 nm. Wavelengths in the first valley have an average absorbance value that is about 30%-40% of the maximum absorbance value of the first peak. Wavelengths in the second valley have an average absorbance value that is about 30%-40% of the maximum absorbance value of the first peak and about 70%-80% of the maximum absorbance value of the second peak. Wavelengths in the third valley have an average absorbance value that is about 60%-70% of the maximum absorbance value of the second peak and about 20%-30% of the maximum absorbance value of the third peak.

Referring to FIG. 10B, it is observed from curve 1010 that the absorbance profile in the faded state has a first absorbance peak with a maximum absorbance value at about 475 nm, a second absorbance peak with a maximum absorbance value at about 575 nm and a third absorbance peak with a maximum absorbance value at about 660 nm. The maximum absorbance value for the first, second and third absorbance peaks in the faded state is lower than the maximum absorbance value for the first, second and third absorbance peaks in the dark state indicating that the transmittance of light for wavelengths in the first, second and third absorbance peaks in the faded state is higher than the transmittance of light for wavelengths in the first, second and third absorbance peaks in the dark state. From curve 1010 it is observed that the first peak has a FW80M of about 12-18 nm and a FW60M of about 20-25 nm. The second peak has a FW90M of about 10-15 nm. The third peak has a FW80M of about 10-15 nm and a FW60M of about 18-25 nm.

The absorbance profile in the faded state has a first valley in the wavelength range between about 410 nm and about 450 nm; a second valley in the wavelength range between about 500 nm and about 570 nm; and a third valley in the wavelength range between about 590 nm and about 640 nm. Wavelengths in the first valley have an average absorbance value that is about 20%-30% of the maximum absorbance value of the first peak. Wavelengths in the second valley have an average absorbance value that is about 20%-30% of the maximum absorbance value of the first peak and about 70%-80% of the maximum absorbance value of the second peak. Wavelengths in the third valley have an average absorbance value that is about 50%-60% of the maximum absorbance value of the second peak and about 15%-25% of the maximum absorbance value of the third peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

Comparing the absorbance profile of the optical filter configured for use by players in the infield shown in FIG. 10B with optical filters configured for use by players in the outfield shown in FIGS. 8B and 9B, it is noted that the optical filter configured for use by players in the infield shown in FIG. 10B has: (i) a lower absorbance for wavelengths in a bandwidth around 575 nm as compared to absorbance of optical filters configured for use by players in the outfield shown in FIGS. 8B and 9B; and (ii) a higher absorbance for wavelengths in a bandwidth around 475 nm as compared to absorbance of optical filters configured for use by players in the outfield shown in FIGS. 8B and 9B.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 1004 in FIG. 10A, has a first pass-band configured to transmit between about 1% and about 10% of light in the violet-blue spectral ranges (e.g., between about 410 nm and about 460 nm); a second pass-band configured to transmit between about 1% and about 8% of the light in the green-yellow spectral ranges (e.g., between about 490 nm and about 570 nm); and a third pass-band configured to transmit between about 5% and about 10% of the light in the orange-red spectral ranges (e.g., between about 590 nm and about 650 nm).

The transmittance profile in the faded state represented by curve 1006 in FIG. 10A, has a first pass-band configured to transmit between about 1% and about 20% of light in the violet-blue spectral ranges (e.g., between about 410 nm and about 460 nm); a second pass-band configured to transmit between about 1% and about 18% of the light in the green-yellow spectral ranges (e.g., between about 480 nm and about 570 nm); and a third pass-band configured to transmit between about 10% and about 22% of the light in the orange-red spectral ranges (e.g., between about 580 nm and about 650 nm). Accordingly, the optical filter is configured to transmit more light in the faded state than in the dark state.

As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 10A, is about 12.4% in the faded state (represented by curve 1006) and is about 4.9% in the dark state (represented by curve 1004). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 10C:
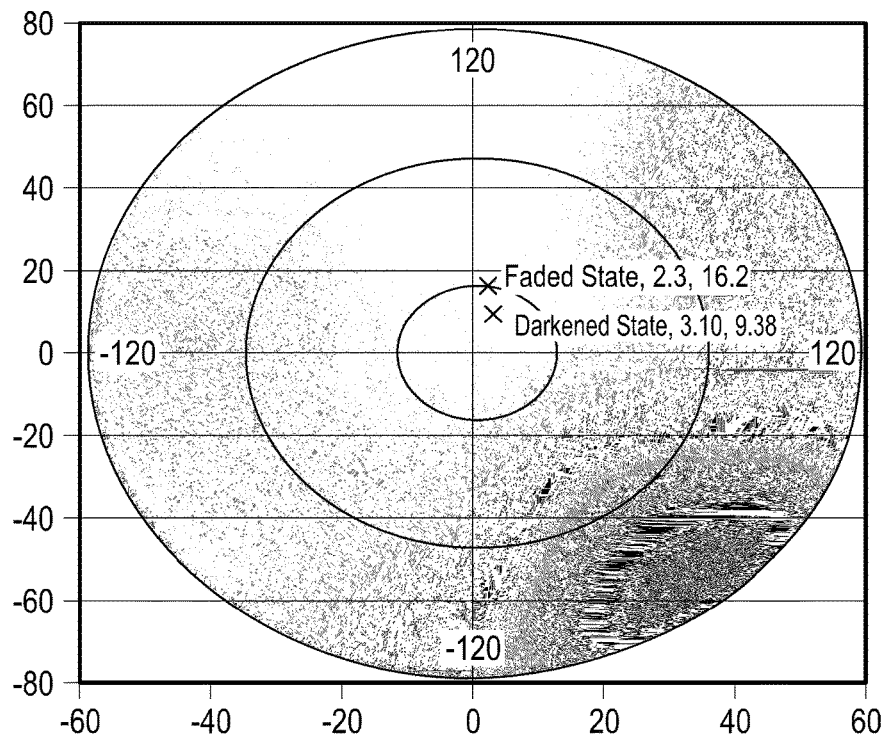
Figure 10D:
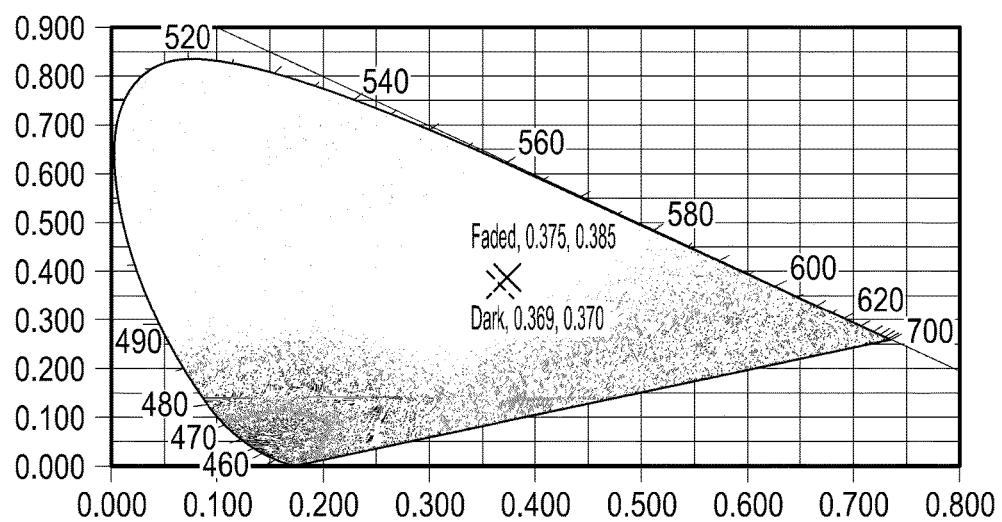

FIGS. 10C and 10D show the chromaticity diagram of the lens including the optical filter having an absorbance profile as shown in FIG. 10B. FIG. 10C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 6C, the chromaticity of the optical filter or the embodiment of the lens including the optical filter has a chroma value of 2.3 and a hue value of 16.2 in the faded state and can appear greenish grey to an observer. The chromaticity of the optical filter or the embodiment of the lens including the optical filter has a chroma value of 3.1 and a hue value of 9.38 in the dark state and can appear neutral grey to an observer. FIG. 10D shows the chromaticity diagram of the optical filter or the embodiment of the lens including the optical filter in the CIE xyY color space. Referring to FIG. 10D, the chromaticity of the optical filter or the embodiment of the lens including the optical filter has a CIE x value of 0.375 and a CIE y value of 0.385 in the faded state. The chromaticity of the optical filter or the embodiment of the lens including the optical filter has a CIE x value of 0.369 and a CIE y value of 0.370 in the dark state. Although, in the illustrated embodiment, a distance between the chromaticity values in the faded and the dark state is small such that the optical filter or the lens including the optical filter appears to have similar color in the faded and the dark state, in other embodiments, a distance between the chromaticity values in the faded and the dark state can be large such the optical filter or the lens including the optical filter appears to have dissimilar color in the faded and the dark state As discussed above, in various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 10E:
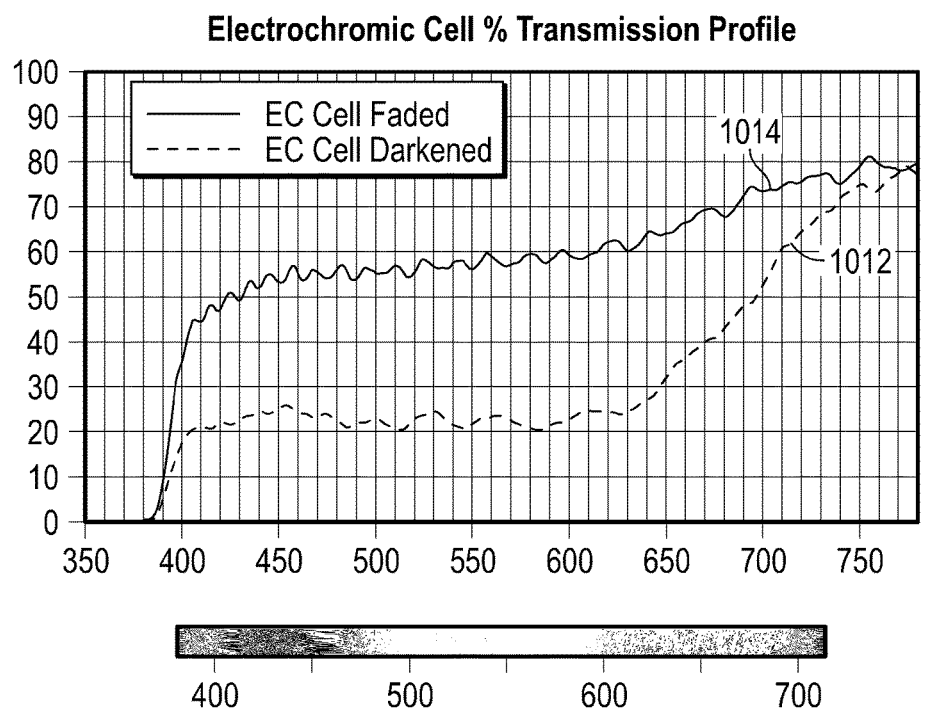

FIG. 10E illustrates the transmittance profile of the variable attenuation filter component of the optical filter whose transmittance profile is depicted in FIG. 10A and whose absorbance profile is depicted in FIG. 10B. The variable attenuation filter component can include a cell including an electro-chromic material similar to the cell disclosed in International Publication No. WO 2011/127015 which is incorporated by reference herein in its entirety. Curve 1012 depicts the transmittance profile of the variable attenuation filter component in the dark state and curve 1014 depicts the absorbance profile of the variable attenuation filter component in the faded state. As noted from curve 1012, the variable attenuation filter component has a transmittance between about 20% and about 30% for all wavelengths in the spectral range between about 400 nm and 650 nm in the dark state. As noted from curve 1014, the variable attenuation filter component has a transmittance between about 40% and about 70% for all wavelengths in the spectral range between about 400 nm and 650 nm in the faded state. It is further observed from curves 1012 and 1014 that the difference between the transmittance through the variable attenuation filter component between about 450 nm and about 600 nm in dark state and the faded state is approximately the same. Thus, the variable attenuation filter component can be considered to function as a neutral density filter for wavelengths between about 450 nm and about 600 nm.

Figure 10F:
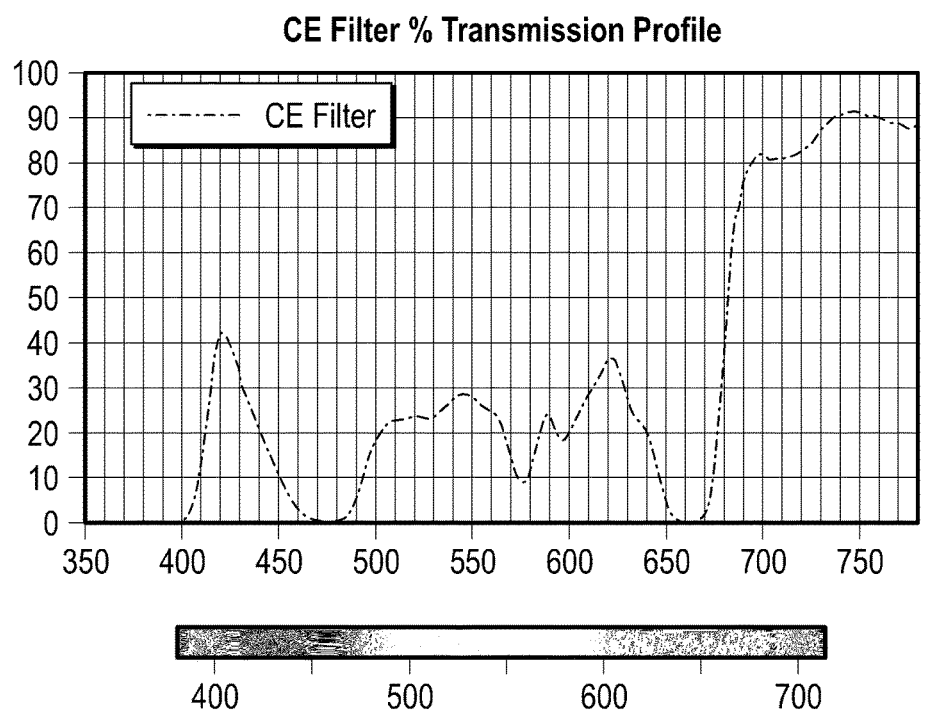

FIG. 10F illustrates the transmittance profile of the chroma enhancing filter component of the optical filter whose transmittance profile is depicted in FIG. 10A and whose absorbance profile is depicted in FIG. 8B. The transmittance profile has three distinct pass-bands: (i) a first pass-band in the blue-violet spectral region between about 410 nm and about 460 nm; (ii) a second pass-band in the green-yellow spectral region between about 490 nm and about 570 nm; and (iii) a third pass-band in the orange-red spectral region between about 580 nm and about 650 nm. It is noted from FIG. 10F that the first pass-band has a maximum transmittance at about 420 nm and the third pass-band has a maximum transmittance at about 620 nm. It is noted from FIG. 10F that the second pass-band has a transmittance between about 20% and about 30% between about 500 nm and 560 nm. Without any loss of generality, the transmittance profile illustrated in FIG. 10A is a sum of the transmittance profile of the variable attenuation filter component of the optical filter depicted in FIG. 10E and the transmittance profile of the chroma enhancing filter component of the optical filter depicted in FIG. 10F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 24 mg of a first dye having an absorbance peak with a maximum absorbance value at 473 nm (e.g. EXCITON ABS 473), 41.2 mg of a second dye having an absorbance peak with a maximum absorbance value at 515 nm (e.g. EXCITON ABS 515), 10 mg of a third dye having an absorbance peak with a maximum absorbance value at 574 nm (e.g. EXCITON ABS 574), and 19.2 mg of a fourth dye having an absorbance peak with a maximum absorbance value at 659 nm (e.g. EXCITON ABS 659) incorporated in 1 pound of a resin.

Figure 10G:
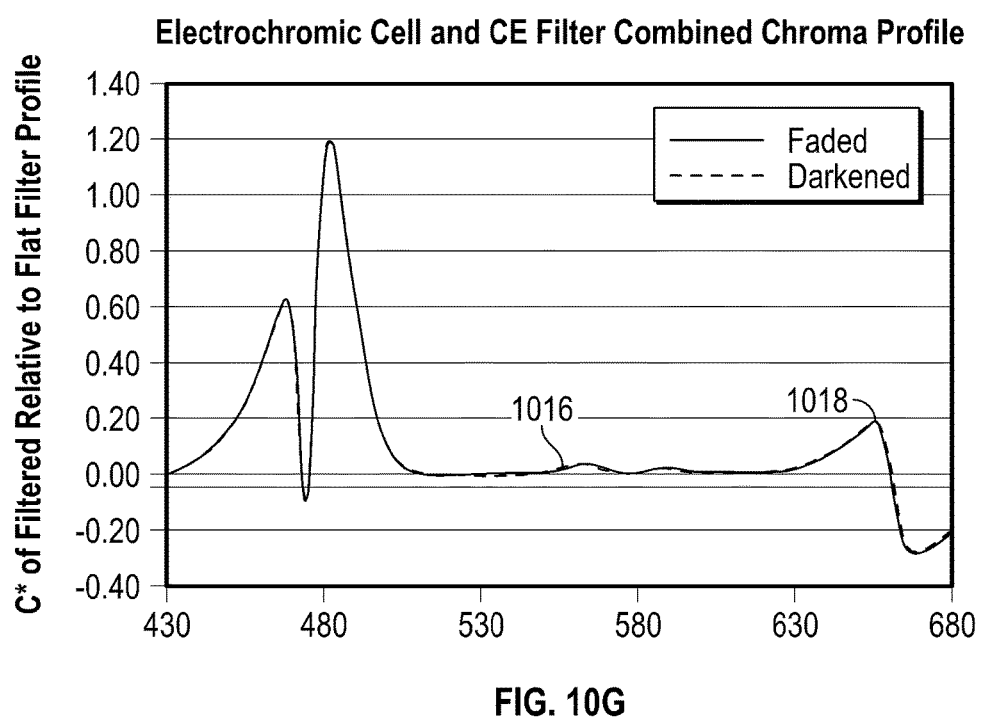

FIG. 10G shows the chroma profile of the lens including the optical filter having an absorbance profile as shown in FIG. 10B. Curve 1016 is the combined chroma profile of the variable filter component and the chroma enhancing filter component in the dark state and curve 1018 is the combined chroma profile of the variable filter component and the chroma enhancing filter component in the faded state.

Curves 1016 and 1018 indicate that the optical filter having an absorbance profile as shown in FIG. 10B provides an increase in chroma in a first spectral window between 450 nm and 500 nm, a second spectral window between 550 nm and 600 nm and a third spectral window between 630 nm and 660 nm as compared to a flat filter.

It is noted from FIG. 10G that the chroma profile in the faded state and the chroma profile in the dark state coincide indicating that toggling the optical filter between the dark state and the faded state does not alter the chroma value of the transmitted light as perceived by the HVS.

Example Embodiment 7—Baseball Infield

Figure 11A:
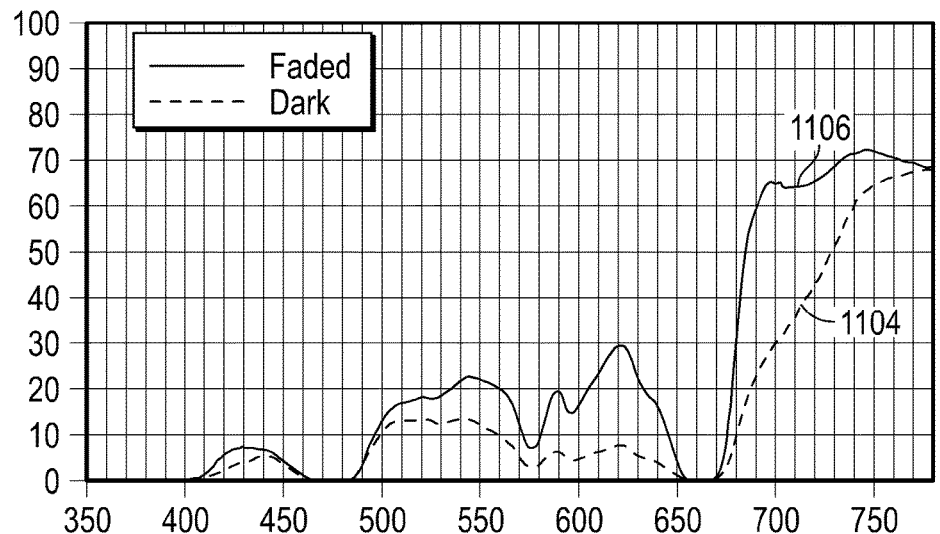
Figure 11A:
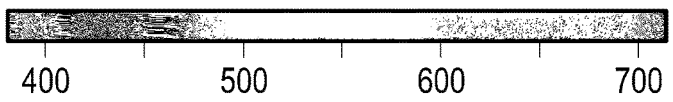
Figure 11B:
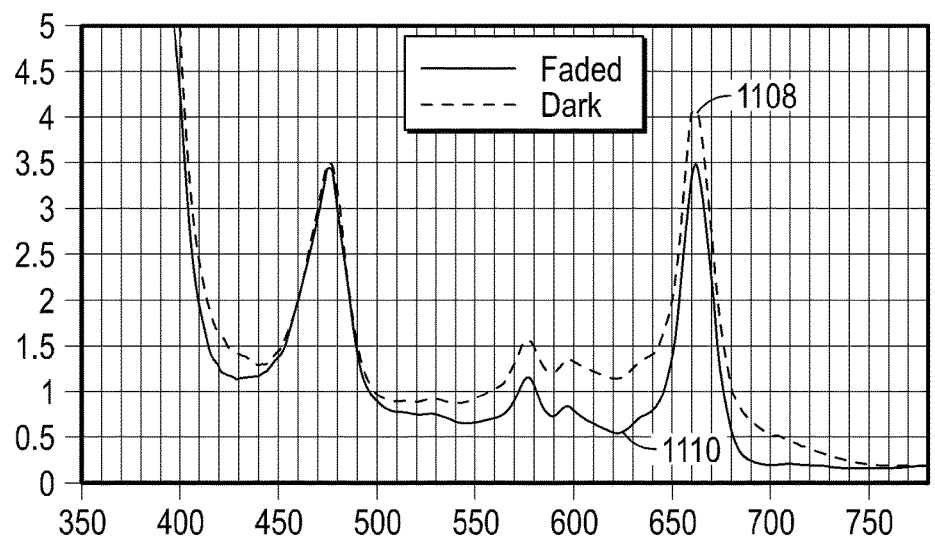
Figure 11B:
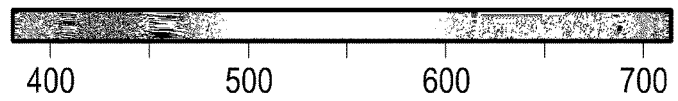

FIG. 11A illustrates the transmittance profile of another optical filter included in an embodiment of a lens that can be suitable for baseball players in the infield. The lens can have general structures and features similar to embodiments described above with reference to FIGS. 2-4. FIG. 11B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 11A, the transmittance profile of the embodiment of the filter in the dark state is represented by the curve 1104 and the transmittance profile of the embodiment of the filter in the faded state is represented by the curve 1106. In FIG. 11B, the absorbance profile of the embodiment of the filter in the dark state is represented by the curve 1108 and the absorbance profile of the embodiment of the filter in the faded state is represented by the curve 1110.

Referring to FIG. 11B, it is observed from curve 1108 that the absorbance profile in the dark state has a first absorbance peak with a maximum absorbance value at about 475 nm and a second absorbance peak with a maximum absorbance value at about 660 nm. It is noted from curve 1108 that the first peak has a FW80M of about 12-15 nm and a FW60M of about 20-30 nm. The second peak has a FW80M of about 10-15 nm and a FWHM of about 18-25 nm. The absorbance profile in the faded state and the dark state indicates a sharp increase in the absorbance at wavelengths less than about 410 nm consistent with the presence of an edge filter.

It is further observed from curve 1108 that the absorbance profile in the dark state has first valley in the wavelength range between about 430 nm and about 450 nm and a second valley in the wavelength range between about 490 nm and about 640 nm. Wavelengths in the first valley have an average absorbance value that is about 40%-50% of the maximum absorbance value of the first peak. Wavelengths in the second valley have an average absorbance value that is about 30%-40% of the maximum absorbance value of the first and second peaks.

Referring to FIG. 11B, it is observed from curve 1110 that the absorbance profile in the faded state has a first absorbance peak with a maximum absorbance value at about 475 nm and a second absorbance peak with a maximum absorbance value at about 660 nm. The maximum absorbance value for the second absorbance peak in the faded state is lower than the maximum absorbance value for the second absorbance peak in the dark state indicating that the transmittance of light for wavelengths in the second absorbance peak in the faded state is higher than the transmittance of light for wavelengths in the second absorbance peak in the dark state. From curve 1110 it is observed that the first peak has a FW80M of about 12-15 nm and a FW60M of about 20-30 nm. The second peak has a FW80M of about 10-15 nm and a FWHM of about 18-25 nm.

The absorbance profile in the faded state has a first valley in the wavelength range between about 410 nm and about 450 nm and a second valley in the wavelength range between about 500 nm and about 650 nm. Wavelengths in the first valley have an average absorbance value that is about 30%-40% of the maximum absorbance value of the first peak. Wavelengths in the second valley have an average absorbance value that is about 20%-30% of the maximum absorbance value of the first and second peaks. The absorbance values for wavelengths in the first and second valleys in the faded state is lower than the absorbance values for wavelengths in the first and second valleys in the dark state indicating that the transmittance of light for wavelengths in the first and second valleys in the faded state is higher than the transmittance of light for wavelengths in the first and second valleys in the dark state.

Comparing the absorbance profile of the optical filter configured for use by players in the infield shown in FIG. 11B with optical filters configured for use by players in the outfield shown in FIGS. 8B and 9B, it is noted that the optical filter configured for use by players in the infield shown in FIG. 11B has: (i) a lower absorbance for wavelengths in a bandwidth around 575 nm as compared to absorbance of optical filters configured for use by players in the outfield shown in FIGS. 8B and 9B; and (ii) a higher absorbance for wavelengths in a bandwidth around 475 nm as compared to absorbance of optical filters configured for use by players in the outfield shown in FIGS. 8B and 9B.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 1104 in FIG. 11A, has a first pass-band configured to transmit between about 1% and about 5% of light in the violet-blue spectral ranges (e.g., between about 410 nm and about 460 nm) and a second pass-band configured to transmit between about 1% and about 15% of the light in the green-red spectral ranges (e.g., between about 490 nm and about 650 nm).

The transmittance profile in the faded state represented by curve 1106 in FIG. 11A, has a first pass-band configured to transmit between about 1% and about 8% of light in the violet-blue spectral ranges (e.g., between about 410 nm and about 460 nm) and a second pass-band configured to transmit between about 1% and about 30% of the light in the green-red spectral ranges (e.g., between about 490 nm and about 650 nm). Accordingly, the optical filter is configured to transmit more light in the faded state than in the dark state.

As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 11A, is about 17.0% in the faded state (represented by curve 1106) and is about 8.6% in the dark state (represented by curve 1104). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 11C:
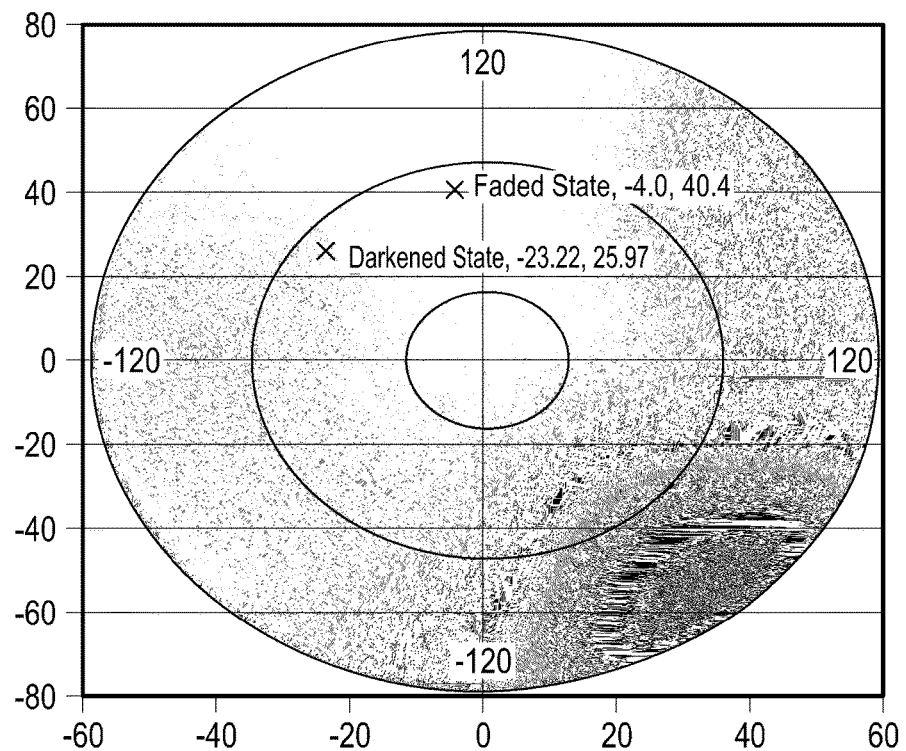
Figure 11D:
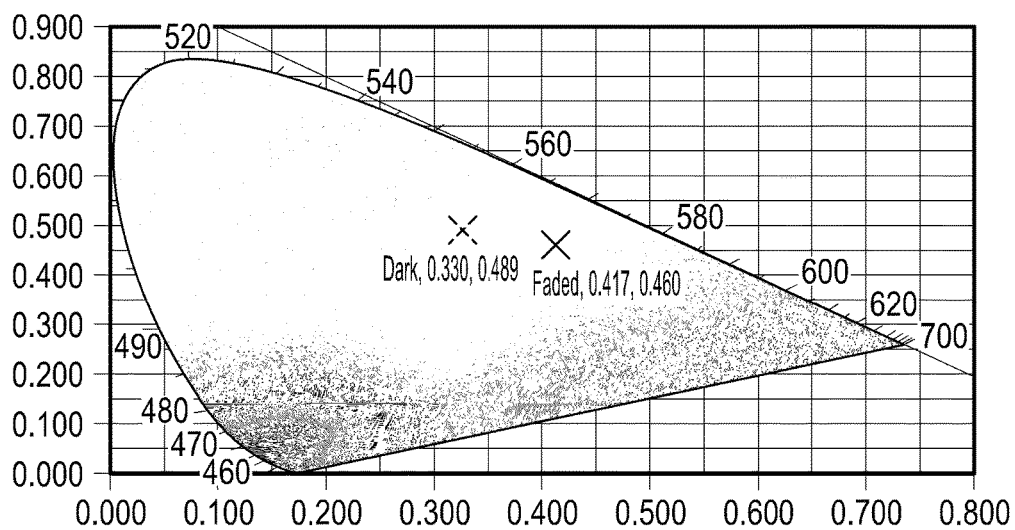

FIGS. 11C and 11D show the chromaticity diagram of the lens including the optical filter having an absorbance profile as shown in FIG. 11B. FIG. 11C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 11C, the chromaticity of the optical filter or the embodiment of the lens including the optical filter has a chroma value of −4.0 and a hue value of 40.4 in the faded state and can appear yellowish green to an observer. The chromaticity of the optical filter or the embodiment of the lens including the optical filter has a chroma value of −23.22 and a hue value of 25.97 in the dark state and can appear green to an observer. FIG. 11D shows the chromaticity diagram of the optical filter or the embodiment of the lens including the optical filter in the CIE xyY color space. Referring to FIG. 11D, the chromaticity of the optical filter or the embodiment of the lens including the optical filter has a CIE x value of 0.417 and a CIE y value of 0.460 in the faded state. The chromaticity of the optical filter or the embodiment of the lens including the optical filter has a CIE x value of 0.330 and a CIE y value of 0.489 in the dark state. Although, in the illustrated embodiment, a distance between the chromaticity values in the faded and the dark state is large such that the optical filter or the lens including the optical filter appears to have dissimilar color in the faded and the dark state, in other embodiments, a distance between the chromaticity values in the faded and the dark state can be small such the optical filter or the lens including the optical filter appears to have similar color in the faded and the dark state In various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 11E:
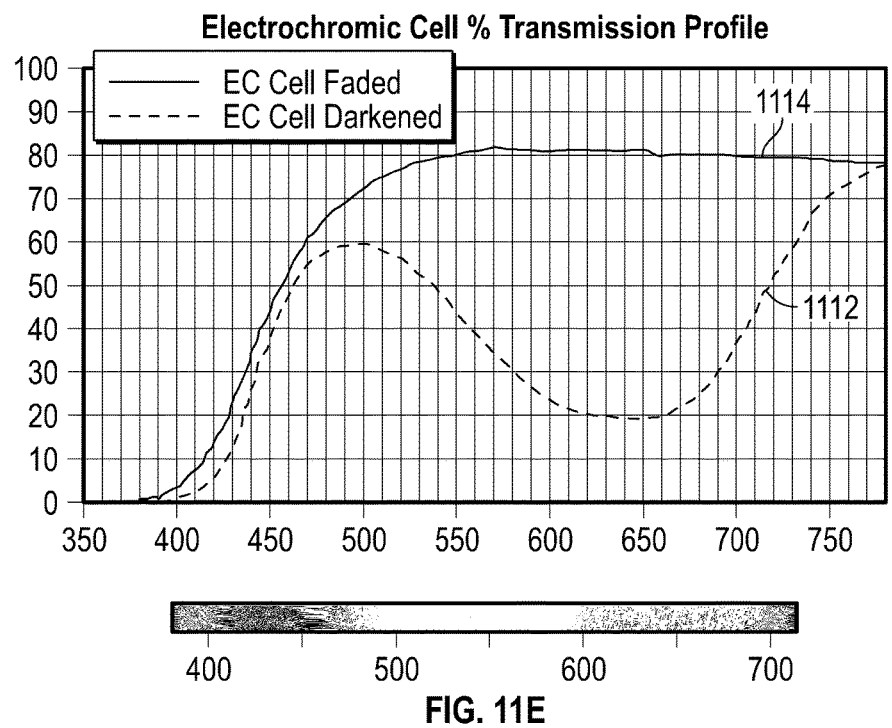

FIG. 11E illustrates the transmittance profile of the variable attenuation filter component of the optical filter whose transmittance profile is depicted in FIG. 11A and whose absorbance profile is depicted in FIG. 11B. The variable attenuation filter component can include a switching material similar to the material disclosed in U.S. Publication No. 2012/0044560 which is incorporated by reference herein in its entirety. Curve 1112 depicts the transmittance profile of the variable attenuation filter component in the dark state and curve 1114 depicts the absorbance profile of the variable attenuation filter component in the faded state. As noted from curve 1112, the variable attenuation filter component has a maximum transmittance at about 500 nm and a reduced transmittance at about 650 nm. The transmittance value is about 60% for wavelengths around 500 nm. The transmittance profile has a FW80M of about 80 nm and a FW60M of about 120 nm around 500 nm. The transmittance value is about 20% for wavelengths around 650 nm. Wavelengths in the range between about 580 nm and about 690 nm have a transmittance value of about 30%. Accordingly, in the dark state, the variable attenuation filter component is configured to transmit wavelengths between about 450 nm and about 560 nm (blue-green spectral region) with a higher transmittance as compared to wavelengths between about 560 nm and about 690 nm (yellow-red spectral region).

As noted from curve 1114, the variable attenuation filter component has a transmittance between about 70% and about 80% for all wavelengths in the spectral range between about 490 nm and 700 nm in the faded state and a transmittance between about 10% and about 70% for all wavelengths in the spectral range between about 410 nm and 490 nm in the faded state. It is further observed from curves 1112 and 1114 that the difference between the transmittance through the variable attenuation filter component between about 410 nm and about 600 nm and about 660 nm and about 700 nm in dark state and the faded state varies.

Figure 11F:
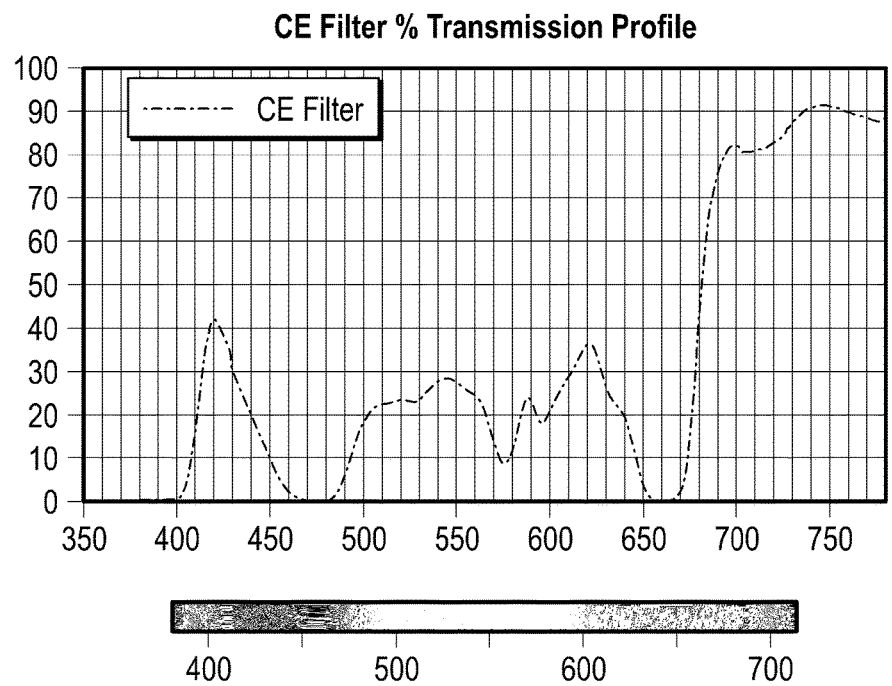

FIG. 11F illustrates the transmittance profile of the chroma enhancing filter component of the optical filter whose transmittance profile is depicted in FIG. 11A and whose absorbance profile is depicted in FIG. 11B. The transmittance profile has three distinct pass-bands: (i) a first pass-band in the blue-violet spectral region between about 410 nm and about 460 nm; and (ii) a second pass-band in the green-yellow spectral region between about 490 nm and about 650 nm. It is noted from FIG. 11F that the first pass-band has a maximum transmittance at about 420 nm. It is noted from FIG. 11F that the second pass-band has a transmittance of about 20%-30% between about 500 nm and 570 nm. It is further noted from FIG. 11F that the second pass-band has a transmittance of about 20%-38% between about 600 nm and 640 nm Without any loss of generality, the transmittance profile illustrated in FIG. 11A is a sum of the transmittance profile of the variable attenuation filter component of the optical filter depicted in FIG. 11E and the transmittance profile of the chroma enhancing filter component of the optical filter depicted in FIG. 11F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 24 mg of a first dye having an absorbance peak with a maximum absorbance value at 473 nm (e.g. EXCITON ABS 473), 41.2 mg of a second dye having an absorbance peak with a maximum absorbance value at 515 nm (e.g. EXCITON ABS 515), 10 mg of a third dye having an absorbance peak with a maximum absorbance value at 574 nm (e.g. EXCITON ABS 574), and 19.2 mg of a fourth dye having an absorbance peak with a maximum absorbance value at 659 nm (e.g. EXCITON ABS 659) incorporated in 1 pound of a resin.

Figure 11G:
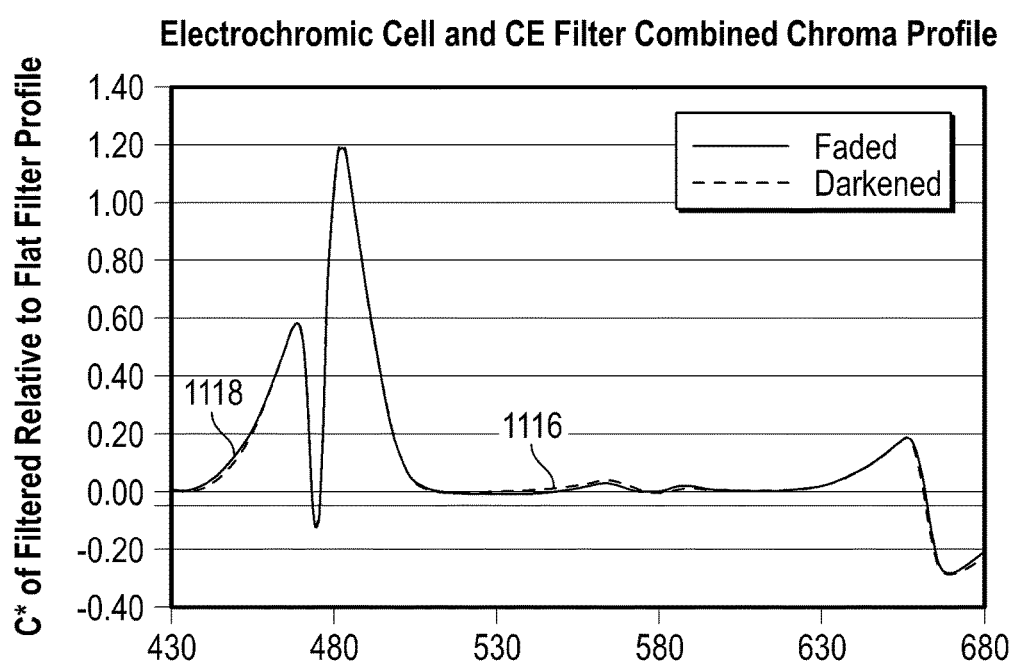

FIG. 11G shows the chroma profile of the lens including the optical filter having an absorbance profile as shown in FIG. 11B. Curve 1116 is the combined chroma profile of the variable filter component and the chroma enhancing filter component in the dark state and curve 1118 is the combined chroma profile of the variable filter component and the chroma enhancing filter component in the faded state. Curves 1116 and 1118 indicate that the optical filter having an absorbance profile as shown in FIG. 11B provides an increase in chroma in a first spectral window between 450 nm and 500 nm, a second spectral window between 550 nm and 600 nm and a third spectral window between 630 nm and 660 nm as compared to a flat filter.

It is noted from FIG. 11G that the chroma profile in the faded state and the chroma profile in the dark state coincide indicating that toggling the optical filter between the dark state and the faded state does not alter the chroma value of the transmitted light as perceived by the HVS.

Example Embodiment 8—Snow Activities

Various embodiments of lenses used for snow activities (e.g., skiing, snowboarding, sledding, etc.) preferably reduce glare (e.g., glare resulting from sunlight reflected from the snow). Reducing glare can advantageously increase the ability of seeing objects on the surface of the slope and thereby allow a snow sportsman to perform to the best of his/her ability. Accordingly, various embodiments of lenses used for snow sports can include coatings, layers or films that reduce glare. The glare reducing coatings, layers or films can include polarizing films and/or coatings to filter out polarized light, holographic or diffractive elements that are configured to reduce glare and/or diffusing elements. Additionally, it would be advantageous for various embodiments of lenses used for snow sports to include filters that make trees, sky and other objects (e.g., stones, boulders, tree roots, etc.) stand out from the snow to enhance the experience of the snow sportsman. Making trees, sky and other objects (e.g., stones, boulders, tree roots, etc.) stand out from the snow can also allow the snow sportsman to safely engage in the sporting activity of his/her choice. Additionally, since the lighting conditions can change on the slope, it would be advantageous to tailor different embodiments of lenses for different lighting conditions. For example, some embodiments of lenses for snow sports can be configured for viewing in bright light, such as on bright sunny days. As another example, some embodiments of lenses for snow sports can be configured for viewing in low light, such as on cloudy days. As yet another example, some embodiments of lenses for snow sports can be configured for viewing in bright as well as low light. Various embodiments of lenses suitable for snow sports can include one or more filters that transmit different colors in the visible spectral range with different values to create different viewing conditions. For example, some embodiments of lenses for snow sports can transmit all colors of the visible spectrum such that there is little distortion on bright sunny days. As another example, some embodiments of lenses for snow sports can transmit colors in the yellow and red spectral ranges and attenuate and/or absorb colors in the blue and green spectral ranges. Various embodiments of lenses used for snow sports can also be tinted (e.g., grey, green, amber, brown or yellow) to increase contrast between the snow and the sky and/or trees, reduce eye strain and/or for aesthetic purpose.

In addition to one or more CE filters, various embodiments of lenses suitable for golfing can include one or more variable attenuation filters that can be switched between a first filter state and a second filter state based on an input signal from the person engaged in the snow activity. The input signal can be an electrical pulse, an electrical voltage, an electrical current or exposure to a radiation. In various embodiments, the variable attenuation filters can be configured to switch between a first filter state and a second filter state transmit when exposed to an electromagnetic radiation. The variable attenuation filter can be configured to maintain the filter state without requiring a supply of energy. In various embodiments, the variable attenuation filters can be configured to toggle between a first state and a second state based on an input from the person engaged in the snow activity.

Figure 12A:
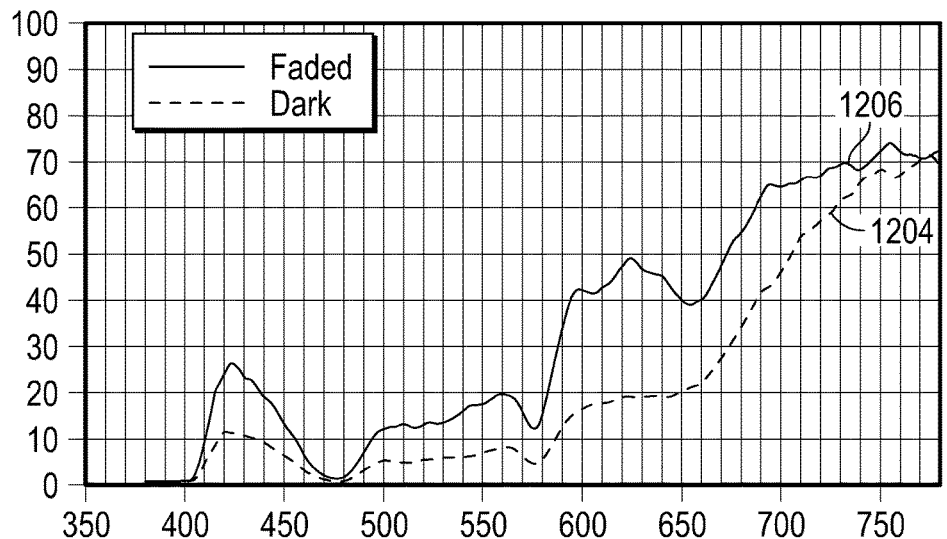
Figure 12A:
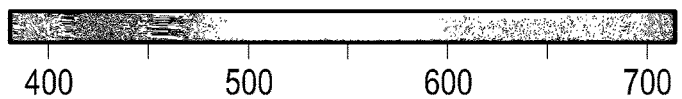
Figure 12B:
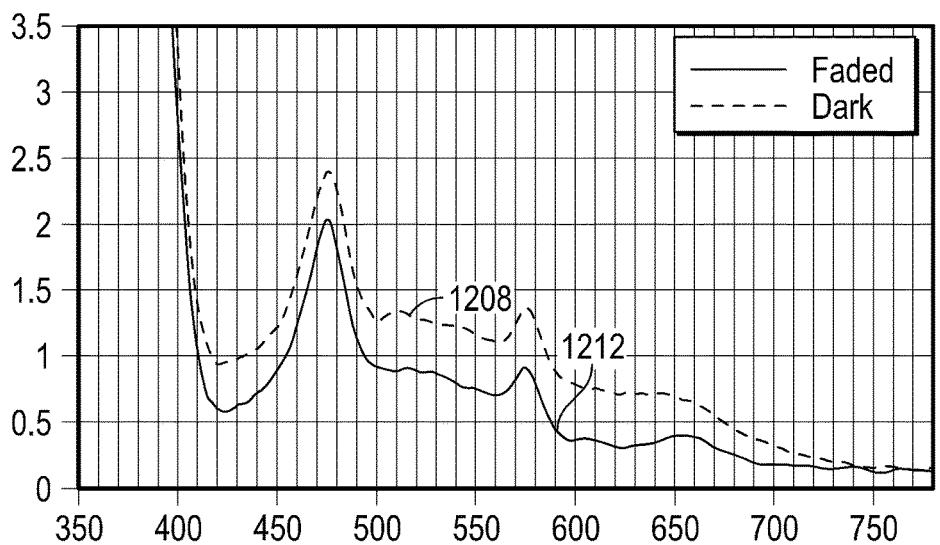
Figure 12B:
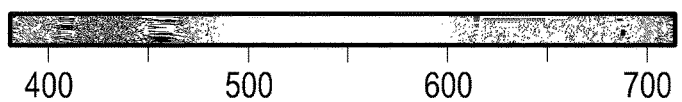

FIG. 12A illustrates the transmittance profile of an optical filter included in an embodiment of a lens that can be suitable for players in the infield. The lens can have general structures and features similar to embodiments described above with reference to FIGS. 2-4. FIG. 12B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 12A, the transmittance profile of the embodiment of the filter in the dark state is represented by the curve 1204 and the transmittance profile of the embodiment of the filter in the faded state is represented by the curve 1206. In FIG. 12B, the absorbance profile of the embodiment of the filter in the dark state is represented by the curve 1208 and the absorbance profile of the embodiment of the filter in the faded state is represented by the curve 1210.

Referring to FIG. 12B, it is observed from curve 1208 that the absorbance profile in the dark state has a first absorbance peak with a maximum absorbance value at about 475 nm and a second absorbance peak with a maximum absorbance value at about 575 nm. It is noted from curve 1208 that the first peak has a FW80M of about 15-25 nm and a FW60M of about 30-34 nm. The second peak has a FW90M of about 10-15 nm. The absorbance profile in the faded state and the dark state indicates a sharp increase in the absorbance at wavelengths less than about 410 nm consistent with the presence of an edge filter.

It is further observed from curve 1208 that the absorbance profile in the dark state has first valley in the wavelength range between about 410 nm and about 450 nm; a second valley in the wavelength range between about 500 nm and about 560 nm; and a third valley in the wavelength range between about 590 nm and about 650 nm. Wavelengths in the first valley have an average absorbance value that is about 40%-50% of the maximum absorbance value of the first peak. Wavelengths in the second valley have an average absorbance value that is about 50%-60% of the maximum absorbance value of the first peak and about 80%-90% of the maximum absorbance value of the second peak. Wavelengths in the third valley have an average absorbance value that is about 50%-60% of the maximum absorbance value of the second peak.

Referring to FIG. 12B, it is observed from curve 1210 that the absorbance profile in the faded state has a first absorbance peak with a maximum absorbance value at about 475 nm and a second absorbance peak with a maximum absorbance value at about 575 nm. The maximum absorbance value for the first and second absorbance peaks in the faded state is lower than the maximum absorbance value for the first and second absorbance peaks in the dark state indicating that the transmittance of light for wavelengths in the first and second absorbance peaks in the faded state is higher than the transmittance of light for wavelengths in the first and second absorbance peaks in the dark state. From curve 1210 it is observed that the first peak has a FW80M of about 15-20 nm and a FW60M of about 25-30 nm. The second peak has a FW90M of about 8-10 nm.

The absorbance profile in the faded state has a first valley in the wavelength range between about 410 nm and about 450 nm; a second valley in the wavelength range between about 500 nm and about 560 nm; and a third valley in the wavelength range between about 600 nm and about 700 nm. Wavelengths in the first valley have an average absorbance value that is about 25%-35% of the maximum absorbance value of the first peak. Wavelengths in the second valley have an average absorbance value that is about 25%-35% of the maximum absorbance value of the first peak and about 80%-90% of the maximum absorbance value of the second peak. Wavelengths in the third valley have an average absorbance value that is about 40%-50% of the maximum absorbance value of the second peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 1204 in FIG. 12A, has a first pass-band configured to transmit between about 1% and about 10% of light in the violet-blue spectral ranges (e.g., between about 410 nm and about 460 nm); a second pass-band configured to transmit between about 1% and about 9% of the light in the green-yellow spectral ranges (e.g., between about 490 nm and about 570 nm); and a third pass-band configured to transmit between about 12% and about 20% of the light in the orange-red spectral ranges (e.g., between about 590 nm and about 650 nm).

The transmittance profile in the faded state represented by curve 1206 in FIG. 12A, has a first pass-band configured to transmit between about 1% and about 28% of light in the violet-blue spectral ranges (e.g., between about 410 nm and about 460 nm); a second pass-band configured to transmit between about 1% and about 20% of the light in the green-yellow spectral ranges (e.g., between about 480 nm and about 570 nm); and a third pass-band configured to transmit between about 20% and about 50% of the light in the orange-red spectral ranges (e.g., between about 580 nm and about 650 nm). Accordingly, the optical filter is configured to transmit more light in the faded state than in the dark state.

As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 12A, is about 21.1% in the faded state (represented by curve 1206) and is about 8.4% in the dark state (represented by curve 1204). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 12C:
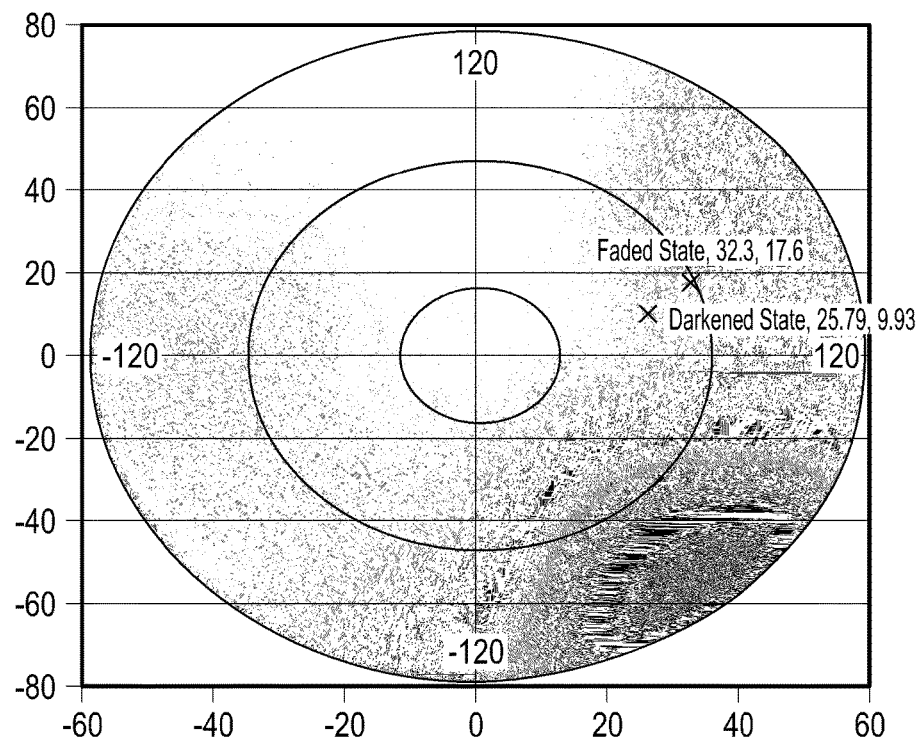
Figure 12D:
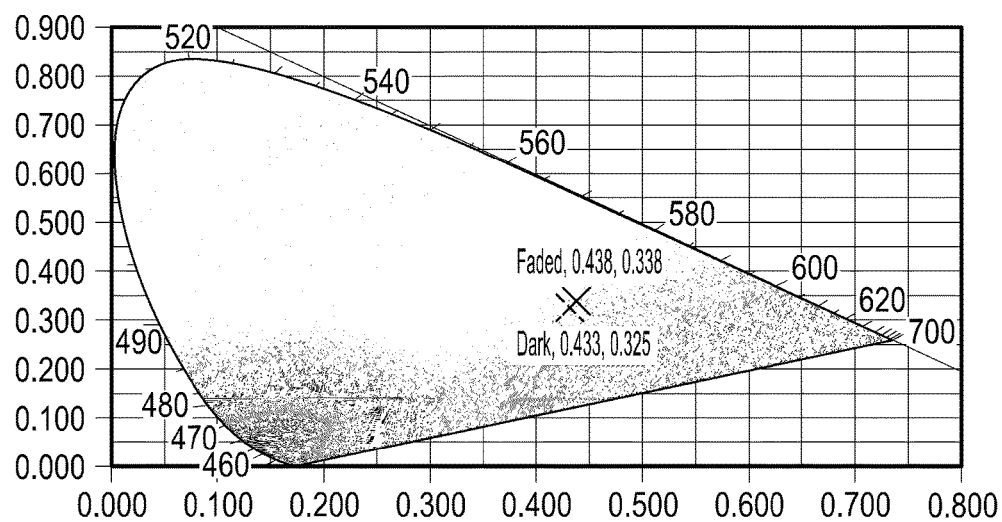

FIGS. 12C and 12D show the chromaticity diagram of the lens including the optical filter having an absorbance profile as shown in FIG. 12B. FIG. 12C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 6C, the chromaticity of the optical filter or the embodiment of the lens including the optical filter has a chroma value of 32.3 and a hue value of 17.6 in the faded state and can appear reddish pink to an observer. The chromaticity of the optical filter or the embodiment of the lens including the optical filter has a chroma value of 25.79 and a hue value of 9.93 in the dark state and can appear purple to an observer. FIG. 12D shows the chromaticity diagram of the optical filter or the embodiment of the lens including the optical filter in the CIE xyY color space. Referring to FIG. 12D, the chromaticity of the optical filter or the embodiment of the lens including the optical filter has a CIE x value of 0.438 and a CIE y value of 0.338 in the faded state. The chromaticity of the optical filter or the embodiment of the lens including the optical filter has a CIE x value of 0.433 and a CIE y value of 0.325 in the dark state. In various embodiments, a distance between the chromaticity values in the faded and the dark state can be small such that the optical filter or the lens including the optical filter appears to have similar color in the faded and the dark state, or large such the optical filter or the lens including the optical filter appears to have dissimilar color in the faded and the dark state As discussed above, in various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 12E:
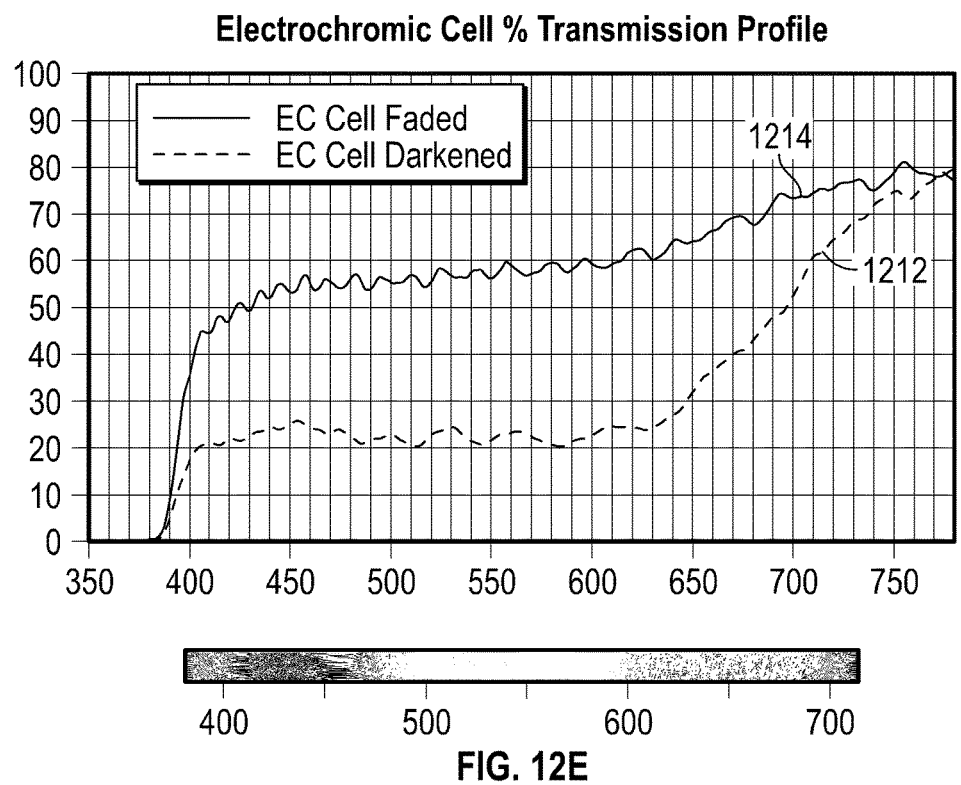

FIG. 12E illustrates the transmittance profile of the variable attenuation filter component of the optical filter whose transmittance profile is depicted in FIG. 12A and whose absorbance profile is depicted in FIG. 12B. The variable attenuation filter component can include a cell including an electro-chromic material similar to the cell disclosed in International Publication No. WO 2011/127015 which is incorporated by reference herein in its entirety. Curve 1212 depicts the transmittance profile of the variable attenuation filter component in the dark state and curve 1214 depicts the absorbance profile of the variable attenuation filter component in the faded state. As noted from curve 1212, the variable attenuation filter component has a transmittance between about 20% and about 30% for all wavelengths in the spectral range between about 400 nm and 650 nm in the dark state. As noted from curve 1214, the variable attenuation filter component has a transmittance between about 40% and about 70% for all wavelengths in the spectral range between about 400 nm and 650 nm in the faded state. It is further observed from curves 1212 and 1214 that the difference between the transmittance through the variable attenuation filter component between about 450 nm and about 600 nm in dark state and the faded state is approximately the same. Thus, the variable attenuation filter component can be considered to function as a neutral density filter for wavelengths between about 450 nm and about 600 nm.

Figure 12F:
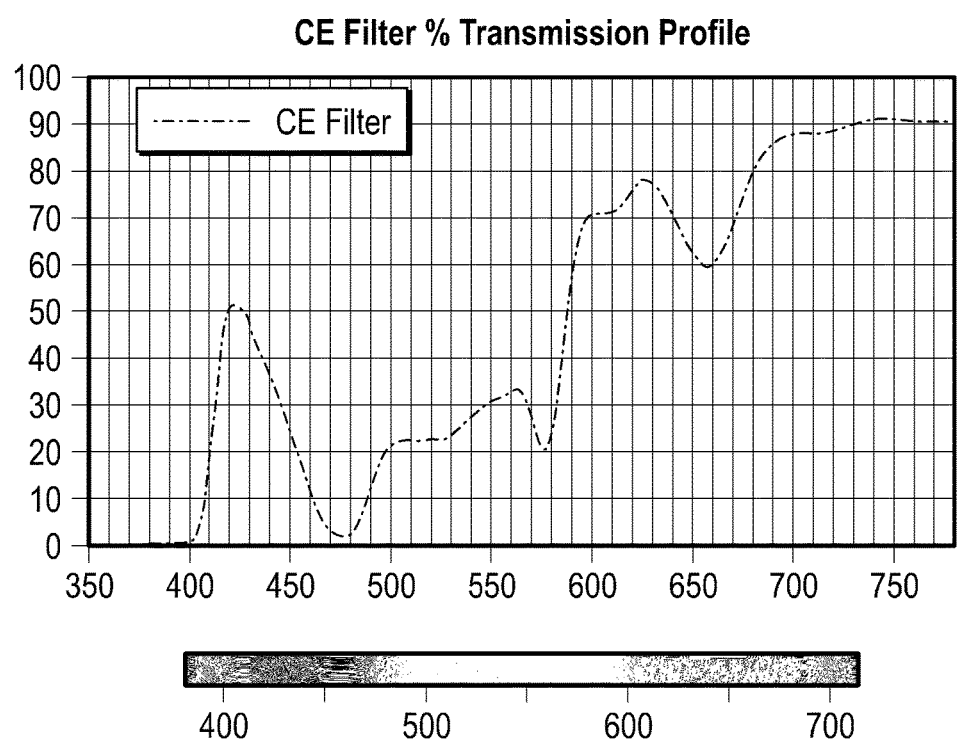

FIG. 12F illustrates the transmittance profile of the chroma enhancing filter component of the optical filter whose transmittance profile is depicted in FIG. 12A and whose absorbance profile is depicted in FIG. 12B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 590 nm and about 650 nm. It is noted from FIG. 12F that the first pass-band has a maximum transmittance at about 420 nm. It is noted from FIG. 12F that the second pass-band has a transmittance between about 20% and about 33% between about 500 nm and 570 nm and the third pass-band has a transmittance between about 60% and about 80% for wavelengths in the range between 590 nm and 650 nm. Without any loss of generality, the transmittance profile illustrated in FIG. 12A is a sum of the transmittance profile of the variable attenuation filter component of the optical filter depicted in FIG. 12E and the transmittance profile of the chroma enhancing filter component of the optical filter depicted in FIG. 12F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 11.3832 mg of a first dye having an absorbance peak with a maximum absorbance value at 473 nm (e.g. EXCITON ABS 473), 57.67488 mg of a second dye having an absorbance peak with a maximum absorbance value at 515 nm (e.g. EXCITON ABS 515) and 6.82992 mg of a third dye having an absorbance peak with a maximum absorbance value at 574 nm (e.g. EXCITON ABS 574) incorporated in 1 pound of a resin.

Figure 12G:
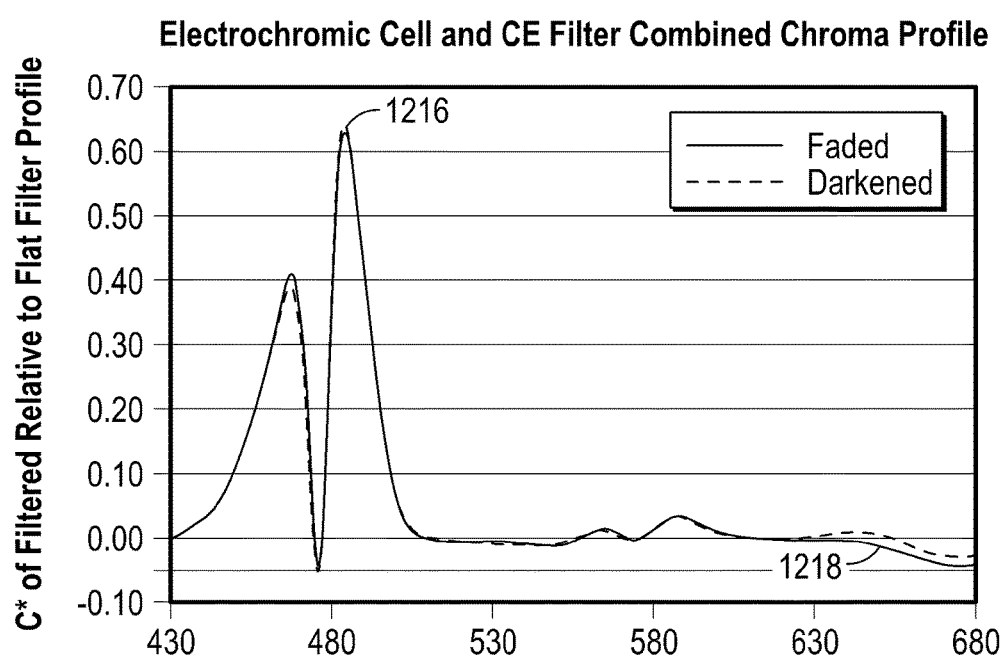

FIG. 12G shows the chroma profile of the lens including the optical filter having an absorbance profile as shown in FIG. 12B. Curve 1216 is the combined chroma profile of the variable filter component and the chroma enhancing filter component in the dark state and curve 1218 is the combined chroma profile of the variable filter component and the chroma enhancing filter component in the faded state.

Curves 1216 and 1218 indicate that the optical filter having an absorbance profile as shown in FIG. 12B provides an increase in chroma in a first spectral window between 450 nm and 500 nm and a second spectral window between 550 nm as compared to a flat filter.

It is noted from FIG. 12G that the chroma profile in the faded state and the chroma profile in the dark state coincide indicating that toggling the optical filter between the dark state and the faded state does not alter the chroma value of the transmitted light as perceived by the HVS.

Example Embodiment 8—Snow Activities

Figure 13A:
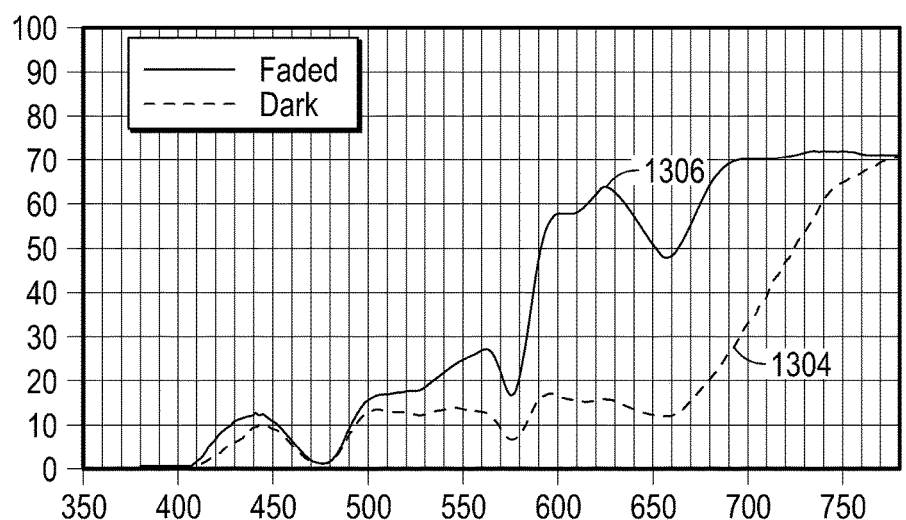
Figure 13A:
Figure 13B:
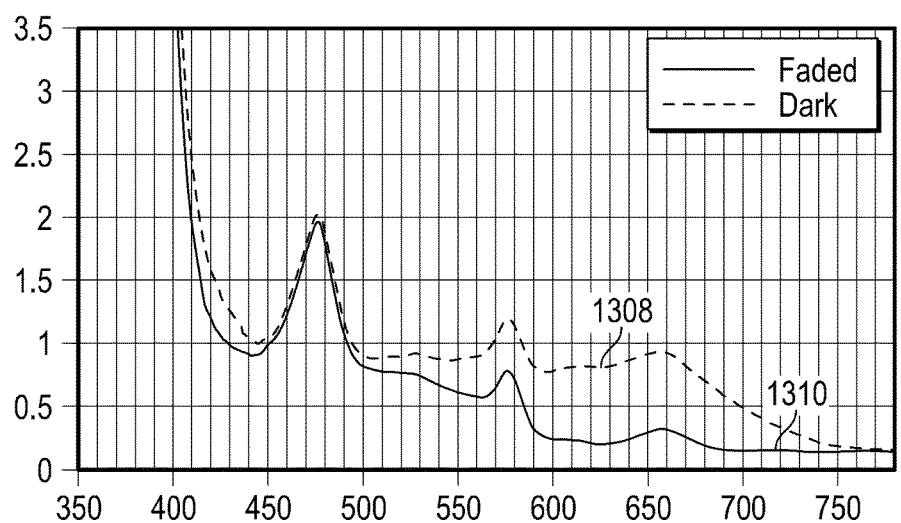
Figure 13B:
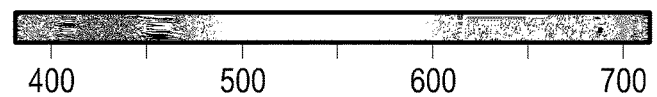

FIG. 13A illustrates the transmittance profile of another optical filter included in an embodiment of a lens that can be suitable for snow activities (e.g., skiing, sledding, snowboarding, etc.). The lens can have general structures and features similar to embodiments described above with reference to FIGS. 2-4. FIG. 13B illustrates an absorbance profile of the same optical filter. The optical filter is configured to provide variable attenuation as well as chroma enhancement. For example, in various embodiments, the optical filter can be configured to switch between a first state (dark state) and a second state (faded state) and provide chroma enhancement in the first state and the second state. The optical filter includes an edge filter (e.g., a violet edge filter) that absorbs wavelengths less than about 410 nm and transmits wavelengths greater than about 410 nm. In various embodiments, the edge filter can be configured to have a high absorbance value at wavelengths less than about 410 nm and a low absorbance value at wavelengths greater than about 410 nm. In various embodiments, the edge filter is configured such that the absorbance drops sharply from a high absorbance value to a low absorbance value at one or more wavelengths below 410 nm. In FIG. 13A, the transmittance profile of the embodiment of the filter in the dark state is represented by the curve 1304 and the transmittance profile of the embodiment of the filter in the faded state is represented by the curve 1306. In FIG. 13B, the absorbance profile of the embodiment of the filter in the dark state is represented by the curve 1308 and the absorbance profile of the embodiment of the filter in the faded state is represented by the curve 1310.

Referring to FIG. 13B, it is observed from curve 1308 that the absorbance profile in the dark state has a first absorbance peak with a maximum absorbance value at about 475 nm and a second absorbance peak with a maximum absorbance value at about 575 nm. It is noted from curve 1308 that the first peak has a FW80M of about 15-25 nm and a FW60M of about 25-35 nm. The second peak has a FW90M of about 10-15 nm. The absorbance profile in the faded state and the dark state indicates a sharp increase in the absorbance at wavelengths less than about 410 nm consistent with the presence of an edge filter.

It is further observed from curve 1308 that the absorbance profile in the dark state has first valley in the wavelength range between about 435 nm and about 455 nm; a second valley in the wavelength range between about 500 nm and about 560 nm; and a third valley in the wavelength range between about 590 nm and about 650 nm. Wavelengths in the first valley have an average absorbance value that is about 50%-60% of the maximum absorbance value of the first peak. Wavelengths in the second valley have an average absorbance value that is about 50%-50% of the maximum absorbance value of the first peak and about 80%-90% of the maximum absorbance value of the second peak. Wavelengths in the third valley have an average absorbance value that is about 80%-90% of the maximum absorbance value of the second peak.

Referring to FIG. 13B, it is observed from curve 1310 that the absorbance profile in the faded state has a first absorbance peak with a maximum absorbance value at about 475 nm and a second absorbance peak with a maximum absorbance value at about 575 nm. The maximum absorbance value for the second absorbance peak in the faded state is lower than the maximum absorbance value for the second absorbance peak in the dark state indicating that the transmittance of light for wavelengths in the second absorbance peak in the faded state is higher than the transmittance of light for wavelengths in the second absorbance peak in the dark state. From curve 1310 it is observed that the first peak has a FW80M of about 15-25 nm and a FW60M of about 25-35 nm. The second peak has a FW90M of about 8-12 nm.

The absorbance profile in the faded state has a first valley in the wavelength range between about 430 nm and about 450 nm; a second valley in the wavelength range between about 500 nm and about 560 nm; and a third valley in the wavelength range between about 590 nm and about 700 nm. Wavelengths in the first valley have an average absorbance value that is about 40%-50% of the maximum absorbance value of the first peak. Wavelengths in the second valley have an average absorbance value that is about 30%-40% of the maximum absorbance value of the first peak and about 85%-95% of the maximum absorbance value of the second peak. Wavelengths in the third valley have an average absorbance value that is about 50%-60% of the maximum absorbance value of the second peak. The absorbance values for wavelengths in the first, second and third valleys in the faded state is lower than the absorbance values for wavelengths in the first, second and third valleys in the dark state indicating that the transmittance of light for wavelengths in the first, second and third valleys in the faded state is higher than the transmittance of light for wavelengths in the first, second and third valleys in the dark state.

As discussed above, the peaks in the absorbance profile correspond to notches in the transmittance profile. The presence of notches in the effective transmittance profile creates distinct pass-bands. Wavelengths in each of the distinct pass-bands are transmitted with lower attenuation than wavelengths in the notches. The transmittance profile in the dark state represented by curve 1304 in FIG. 13A, has a first pass-band configured to transmit between about 1% and about 10% of light in the violet-blue spectral ranges (e.g., between about 410 nm and about 470 nm); a second pass-band configured to transmit between about 1% and about 15% of the light in the green-yellow spectral ranges (e.g., between about 480 nm and about 570 nm); and a third pass-band configured to transmit between about 10% and about 18% of the light in the orange-red spectral ranges (e.g., between about 590 nm and about 650 nm).

The transmittance profile in the faded state represented by curve 1306 in FIG. 13A, has a first pass-band configured to transmit between about 1% and about 12% of light in the violet-blue spectral ranges (e.g., between about 410 nm and about 470 nm); a second pass-band configured to transmit between about 1% and about 28% of the light in the green-yellow spectral ranges (e.g., between about 480 nm and about 570 nm); and a third pass-band configured to transmit between about 50% and about 75% of the light in the orange-red spectral ranges (e.g., between about 590 nm and about 650 nm). Accordingly, the optical filter is configured to transmit more light in the faded state than in the dark state.

As discussed above, the amount of light transmitted in the faded state and the dark state can be characterized using luminous transmittance that is measured with respect to a suitable illuminant, such as, for example, CIE standard illuminant D65 according to a technique defined in section 5.6.1 of the ANSI Z80.3-2009 specification for nonprescription sunglass and fashion eyewear requirements. The luminous transmittance for the embodiment of the lens having the transmittance profile depicted in FIG. 12A, is about 28.8% in the faded state (represented by curve 1306) and is about 12.4% in the dark state (represented by curve 1304). In other embodiments, the luminous transmittance in the dark state can be less than about 30%, such as, for example, between about 5% and about 30%, between about 10% and about 25%, or between about 15% and about 20%. In various embodiments, the luminous transmittance in the faded state can be greater than about 15%, such as, for example, between about 20% and about 80%, between about 25% and about 75%, between about 30% and about 70%, between about 35% and about 65%, between about 40% and about 60%, between about 45% and about 55%, between about 50% and about 55% or greater than 80%.

Figure 13C:
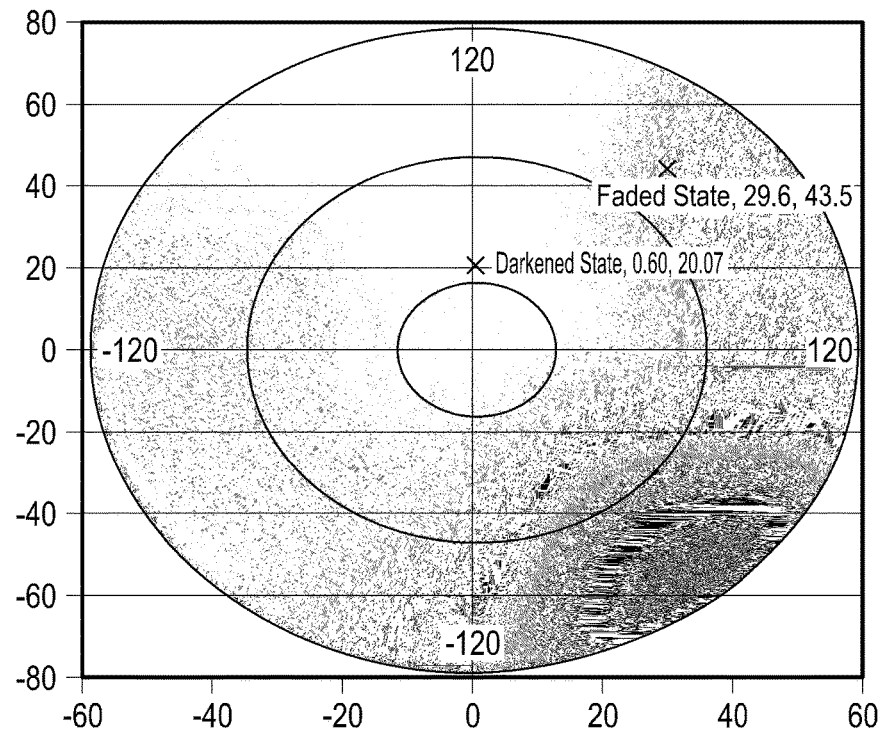
Figure 13D:
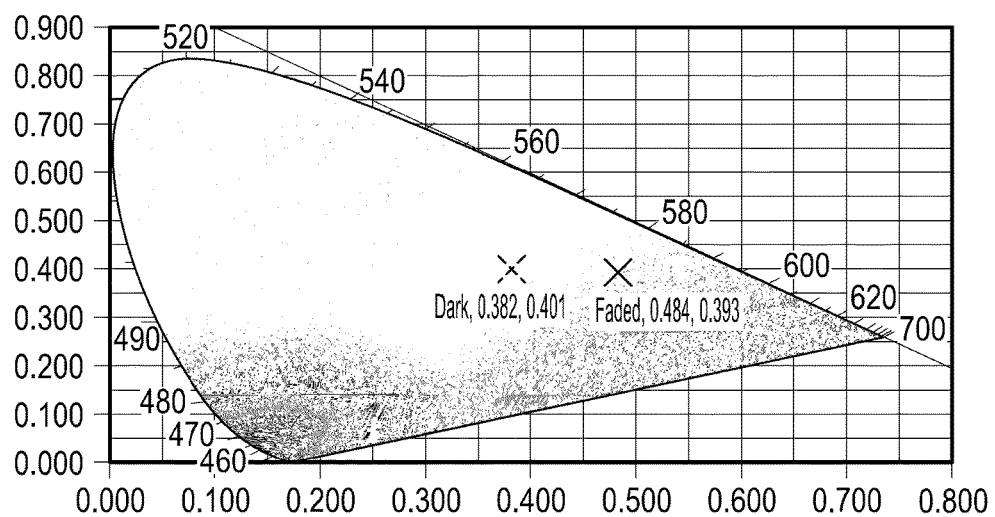

FIGS. 13C and 13D show the chromaticity diagram of the lens including the optical filter having an absorbance profile as shown in FIG. 13B. FIG. 13C shows the chromaticity diagram of the optical filter or the embodiment of the lens including the optical filter in the CIEL*u*v* color space calculated using CIE standard illuminant D65 and the CIE 1964 10° Standard Observer based on a 10-degree field of view for a standard observer. Referring to FIG. 13C, the chromaticity of the optical filter or the embodiment of the lens including the optical filter has a chroma value of 29.6 and a hue value of 43.5 in the faded state and can appear red to an observer. The chromaticity of the optical filter or the embodiment of the lens including the optical filter has a chroma value of 0.6 and a hue value of 20.07 in the dark state and can appear grey to an observer. FIG. 13D shows the chromaticity diagram of the optical filter or the embodiment of the lens including the optical filter in the CIE xyY color space. Referring to FIG. 13D, the chromaticity of the optical filter or the embodiment of the lens including the optical filter has a CIE x value of 0.484 and a CIE y value of 0.393 in the faded state. The chromaticity of the optical filter or the embodiment of the lens including the optical filter has a CIE x value of 0.382 and a CIE y value of 0.401 in the dark state. In various embodiments, a distance between the chromaticity values in the faded and the dark state can be small such that the optical filter or the lens including the optical filter appears to have similar color in the faded and the dark state, or large such the optical filter or the lens including the optical filter appears to have dissimilar color in the faded and the dark state In various embodiments, the chromaticity can depend on the transmittance and the absorbance profiles of the optical filter. Accordingly, the transmittance and the absorbance profiles of the optical filter can be adjusted to achieve a desired chromaticity. In other embodiments, the lens including the optical filter may be provided with various tints to change the overall chromaticity of the lens for aesthetic or other purposes.

Figure 13E:
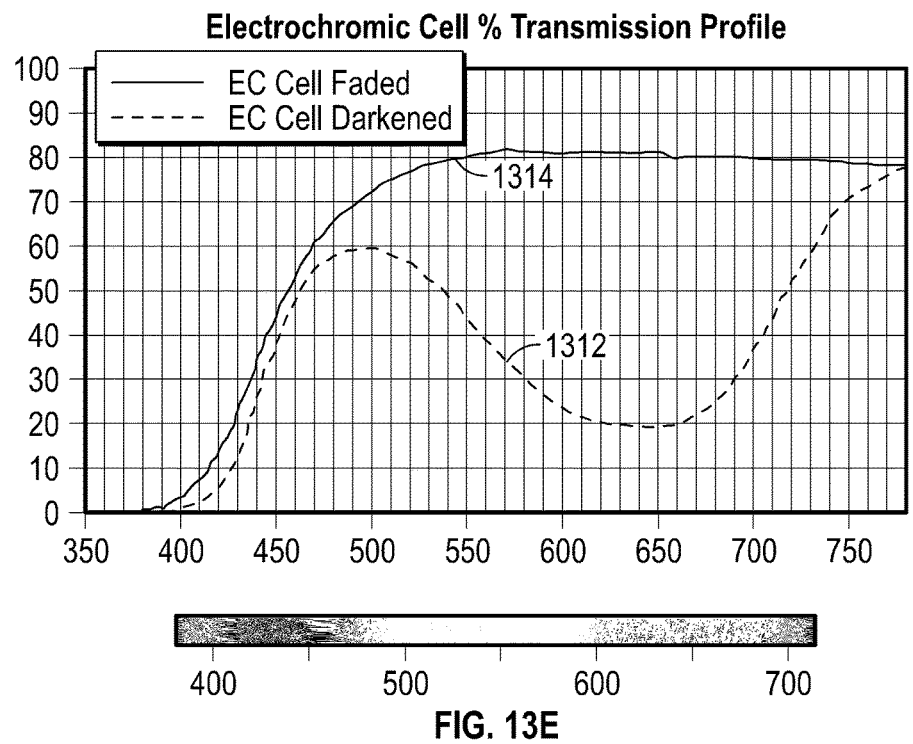

FIG. 13E illustrates the transmittance profile of the variable attenuation filter component of the optical filter whose transmittance profile is depicted in FIG. 13A and whose absorbance profile is depicted in FIG. 13B. The variable attenuation filter component can include a switching material similar to the material disclosed in U.S. Publication No. 2012/0044560 which is incorporated by reference herein in its entirety. Curve 1312 depicts the transmittance profile of the variable attenuation filter component in the dark state and curve 1314 depicts the absorbance profile of the variable attenuation filter component in the faded state. As noted from curve 1312, the variable attenuation filter component has a maximum transmittance at about 500 nm and a reduced transmittance at about 650 nm. The transmittance value is about 60% for wavelengths around 500 nm. The transmittance profile has a FW80M of about 80 nm and a FW60M of about 120 nm around 500 nm. The transmittance value is about 20% for wavelengths around 650 nm. Wavelengths in the range between about 580 nm and about 690 nm have a transmittance value of about 30%. Accordingly, in the dark state, the variable attenuation filter component is configured to transmit wavelengths between about 450 nm and about 560 nm (blue-green spectral region) with a higher transmittance as compared to wavelengths between about 560 nm and about 690 nm (yellow-red spectral region).

As noted from curve 1314, the variable attenuation filter component has a transmittance between about 70% and about 80% for all wavelengths in the spectral range between about 490 nm and 700 nm in the faded state and a transmittance between about 10% and about 70% for all wavelengths in the spectral range between about 410 nm and 490 nm in the faded state. It is further observed from curves 1312 and 1314 that the difference between the transmittance through the variable attenuation filter component between about 410 nm and about 600 nm and about 660 nm and about 700 nm in dark state and the faded state varies.

Figure 13F:
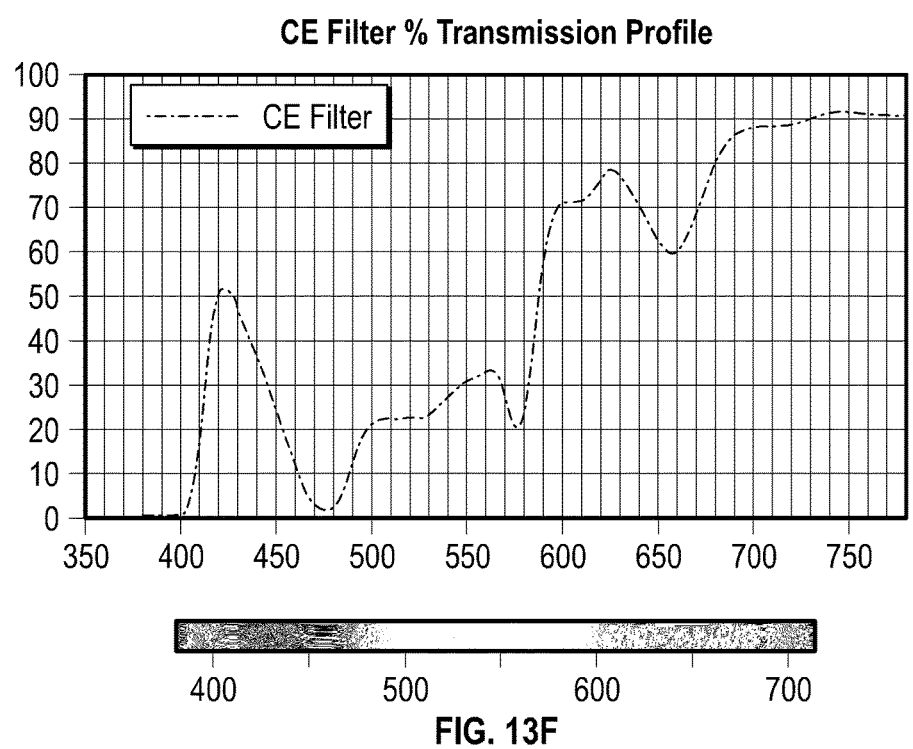

FIG. 13F illustrates the transmittance profile of the chroma enhancing filter component of the optical filter whose transmittance profile is depicted in FIG. 13A and whose absorbance profile is depicted in FIG. 13B. The transmittance profile has three distinct pass-bands: (i) a first pass-band in the blue-violet spectral region between about 410 nm and about 470 nm; (ii) a second pass-band in the green-yellow spectral region between about 480 nm and about 570 nm; and (iii) a third pass-band in the orange-red spectral region between about 590 nm and about 650 nm. It is noted from FIG. 13F that the first pass-band has a maximum transmittance at about 420 nm. It is noted from FIG. 13F that the second pass-band has a transmittance between about 20% and about 33% between about 500 nm and 570 nm and the third pass-band has a transmittance between about 60% and about 80% for wavelengths in the range between 590 nm and 650 nm. Without any loss of generality, the transmittance profile illustrated in FIG. 13A is a sum of the transmittance profile of the variable attenuation filter component of the optical filter depicted in FIG. 13E and the transmittance profile of the chroma enhancing filter component of the optical filter depicted in FIG. 13F.

The chroma enhancing filter can include one or more dyes (e.g., organic dyes) dissolved in a solvent (e.g., toluene, chloroform, cyclohexanone, cyclopentanone or a polymeric resin). An embodiment of the chroma enhancing filter includes 11.3832 mg of a first dye having an absorbance peak with a maximum absorbance value at 473 nm (e.g. EXCITON ABS 473), 57.67488 mg of a second dye having an absorbance peak with a maximum absorbance value at 515 nm (e.g. EXCITON ABS 515) and 6.82992 mg of a third dye having an absorbance peak with a maximum absorbance value at 574 nm (e.g. EXCITON ABS 574) incorporated in 1 pound of a resin.

Figure 13G:
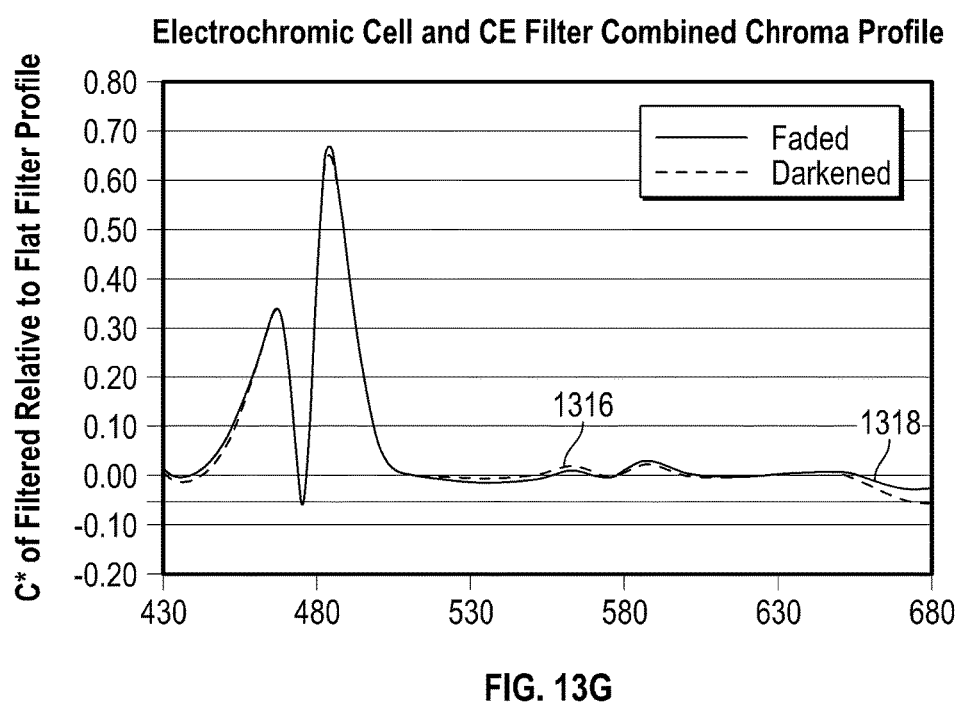

FIG. 13G shows the chroma profile of the lens including the optical filter having an absorbance profile as shown in FIG. 13B. Curve 1316 is the combined chroma profile of the variable filter component and the chroma enhancing filter component in the dark state and curve 1318 is the combined chroma profile of the variable filter component and the chroma enhancing filter component in the faded state. Curves 1316 and 1318 indicate that the optical filter having an absorbance profile as shown in FIG. 13B provides an increase in chroma in a first spectral window between 450 nm and 500 nm and a second spectral window between 550 nm and 600 nm as compared to a flat filter.

It is noted from FIG. 13G that the chroma profile in the faded state and the chroma profile in the dark state coincide indicating that toggling the optical filter between the dark state and the faded state does not alter the chroma value of the transmitted light as perceived by the HVS.

Example Embodiment 9

Figure 14A:
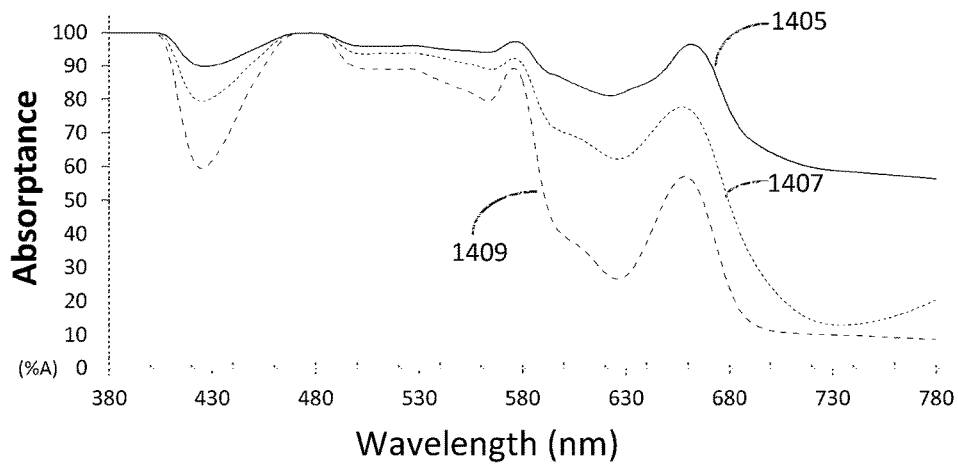
FIGS. 14A-17C illustrate optical characteristics (e.g., absorptance profile, absorbance profile, and relative chroma profile) of various embodiments of lenses including one or more optical filters that provide variable attenuation and chroma enhancement for certain activities, such as, for example, snow sports, daily activities, driving, hiking, biking, etc.
Figure 14B:
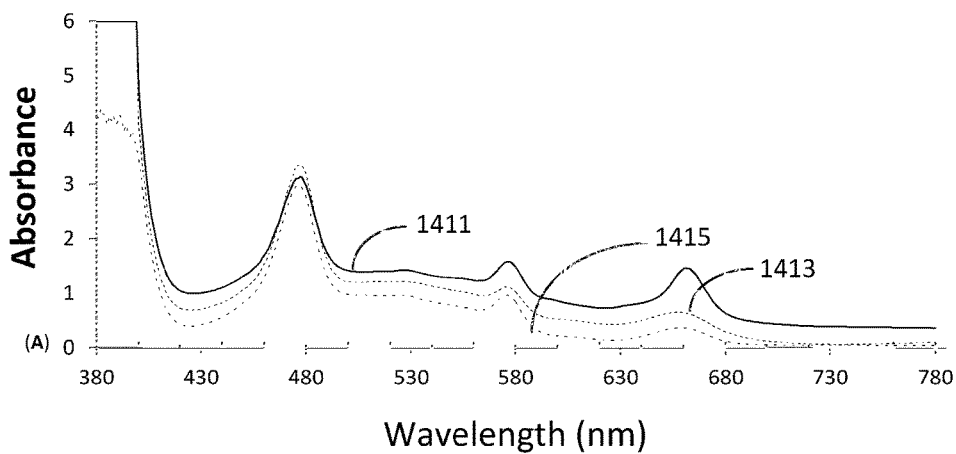
Figure 14C:
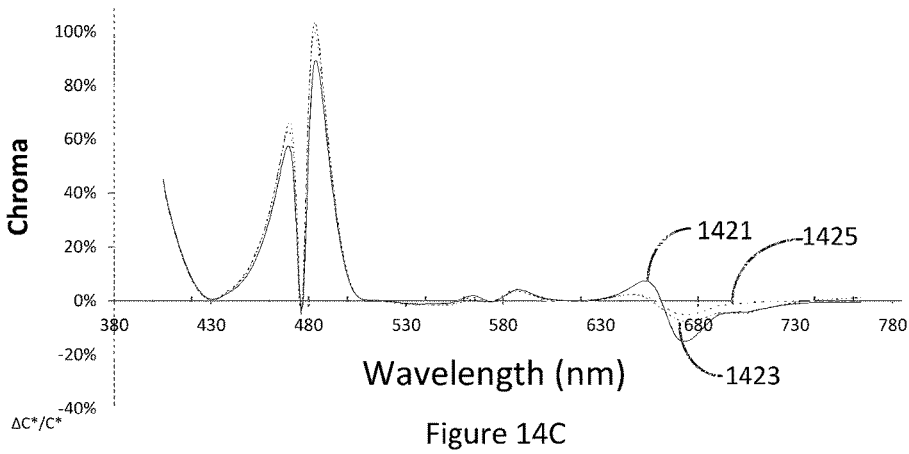

FIG. 14A illustrates the absorptance spectrum of various lenses that can be included in eyewear configured for various activities, such as, for example, sporting activities, driving, day-to-day activities in various ambient lighting conditions (e.g., bright light condition, medium light condition or low light condition). FIG. 14B illustrates the corresponding absorbance spectrum of the various lenses having the absorptance profile depicted in FIG. 14A and FIG. 14C depicts the relative chroma profile of the various lenses having the absorptance profile depicted in FIG. 14A.

Referring to FIG. 14A, curve 1405 depicts a first absorptance profile, curve 1407 depicts a second absorptance, and curve 1409 depicts a third absorptance profile. The first, second and third absorptance profiles have a plurality of absorptance peaks having a maximum absorptance value. The maximum absorptance of a first absorptance peak can be in the range between about 465 nm and about 485 nm. The maximum absorptance of a second absorptance peak can be in the range between about 570 nm and about 580 nm. The maximum absorptance of a third absorptance peak can be in the range between about 650 nm and about 665 nm.

The absorptance peaks have associated absorbance peaks as illustrated in FIG. 14B. The first absorbance profile 1411 is associated with the first absorptance profile 1405, the second absorbance profile 1413 is associated with the second absorptance profile 1407, and the third absorbance profile 1415 is associated with the third absorptance profile 1409. The maximum absorbance of the absorbance peak associated with the first absorptance peak is in the range between about 470 nm and about 480 nm. The maximum absorbance of the absorbance peak associated with the second absorptance peak is in the range between about 570 nm and about 580 nm. The maximum absorbance of the absorbance peak associated with the third absorptance peak is in the range between about 655 nm and about 665 nm.

The various absorptance or absorbance peaks can have a spectral bandwidth equal to the full width at 90% of the maximum, full width at 80% of the maximum, full width at 85% of the maximum, or full width at 70% of the maximum. The various absorptance or absorbance peaks can have a center wavelength given by the midpoint of the spectral bandwidth of a respective absorptance or absorbance peak. It is observed from FIGS. 14A and 14B that the center wavelength of the first absorptance peak and the first absorbance peak for the first, second and third absorptance profiles given by the midpoint of a spectral bandwidth equal to the full width at 80% of the maximum is between about 470 nm and about 480 nm.

The various absorptance peaks can have an attenuation factor obtained by dividing an integrated absorptance peak area within the spectral bandwidth by the spectral bandwidth of the respective absorptance peak. The various absorbance peaks can have an attenuation factor obtained by dividing an integrated absorptance peak area within the spectral bandwidth of the absorbance peak by the spectral bandwidth of the respective absorbance peak. The attenuation factor of the first absorptance and absorbance peak for the first, second and third absorptance profile is between 0.8 and 1.0 for the illustrated embodiment.

Referring to FIG. 14C, curve 1421 is the relative chroma change associated with the first absorptance profile 1405, curve 1423 is the relative chroma change associated with the second absorptance profile 1407, and curve 1425 is the relative chroma change associated with the third absorptance profile 1409. It is observed from FIG. 14C, that the relative chroma change in a chroma enhancement window in the spectral range between about 440 nm and about 480 nm is greater than or equal to about 20% for the first, second and third absorptance profiles. It is further observed from FIG. 14C, that the relative chroma change in a chroma enhancement window in the spectral range between about 440 nm and about 510 nm is greater than or equal to about 20% for the first, second and third absorptance profiles.

The luminous transmittance of a lens having the first, second or third absorptance profile can be greater than or equal to about 7%. The average visible light transmittance of a lens having the first, second or third absorptance profiles can be greater than or equal to about 14%. The CIE chromaticity x-value of a lens having the first, second or third absorptance profile can be in the range between about 0.35 and about 0.5. The CIE chromaticity y-value of a lens having the first, second or third absorptance profile can be in the range between about 0.3 and about 0.35.

In various embodiments, a lens can comprise a static CE filter that can provide the first, second or third absorptance/absorbance profiles. The lens can further include a variable optical filter that can provide variable light attenuation. In various embodiments, a lens can comprise one or more variable optical filters (e.g., variable CE filters that may alter the luminous transmittance, contrast/colorfulness of a scene and/or chromaticity of the lens) that can be configured to be selectively switchable between a neutral state and one of the first, second or third absorptance profiles. In the neutral state, the lens may be configured to uniformly attenuate all wavelengths in the visible spectral range. Alternately, in the neutral state, the lens may be configured to not attenuate any wavelength in the visible spectral range. In the neutral state, the lens may appear to be clear or gray.

For example, a lens comprising a variable CE filter can be configured to switch from a neutral state to a first state in which the lens is configured to have the first absorptance profile 1405 and the associated first absorbance profile 1411. As another example, the lens can be configured to switch from a neutral state to a second state in which the lens is configured to have the second absorptance profile 1407 and the associated second absorbance profile 1413. As yet another example, the lens can be configured to switch from a neutral state to a third state in which the lens is configured to have the third absorptance profile 1409 and the associated second absorbance profile 1415. In some implementations, the lens comprising the variable CE filter can be configured to switch between the first, second and third states. The lens can be configured to switch between any of the neutral, first, second or third states based on an input provided by the user, a sensor input or based on an input from an electronic hardware processor.

In various embodiments, a lens can comprise a static filter that provides one of the three absorptance profiles 1405, 1407 and 1409. In such embodiments, the lens may comprise a variable optical filter that can be switched between two or more states. At least one of the luminous transmittance, attenuation, or chromaticity may be different between the two or more states.

Example Embodiment 10

Figure 15A:
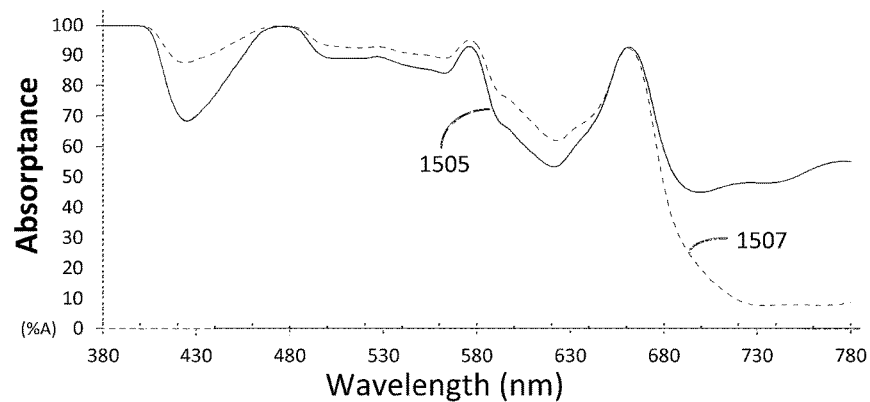
Figure 15B:
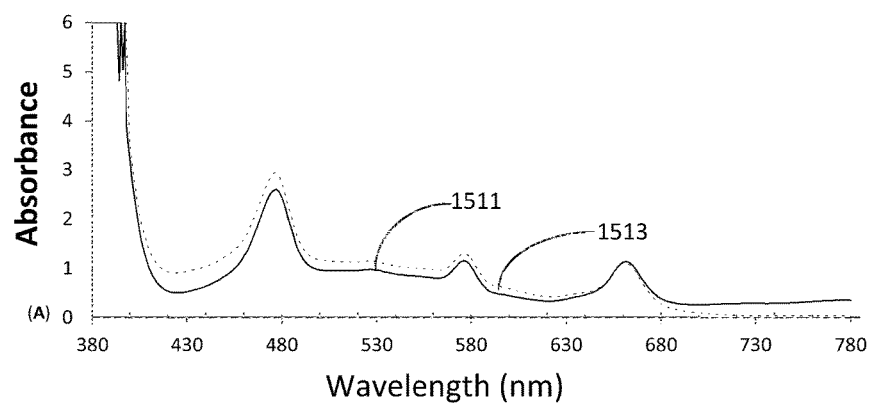
Figure 15C:
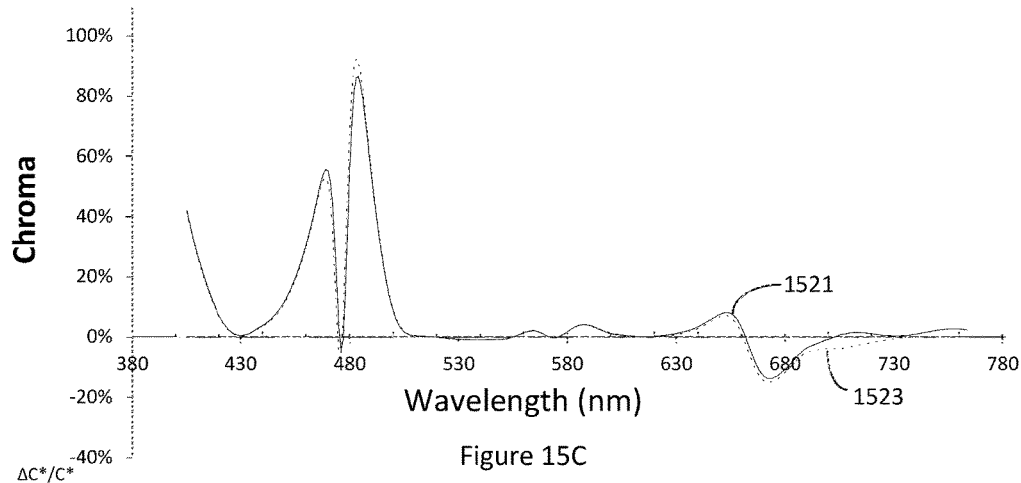

FIG. 15A illustrates the absorptance spectrum of various lenses that can be included in eyewear configured for various activities, such as, for example, sporting activities, driving, day-to-day activities in various ambient lighting conditions (e.g., bright light condition, medium light condition or low light condition). FIG. 15B illustrates the corresponding absorbance spectrum of the various lenses having the absorptance profile depicted in FIG. 15A and FIG. 15C depicts the relative chroma profile of the various lenses having the absorptance profile depicted in FIG. 15A.

Referring to FIG. 15A, curve 1505 depicts a first absorptance profile and curve 1507 depicts a second absorptance. The first and second absorptance profiles have a plurality of absorptance peaks having a maximum absorptance value. The maximum absorptance of a first absorptance peak can be in the range between about 465 nm and about 485 nm. The maximum absorptance of a second absorptance peak can be in the range between about 570 nm and about 580 nm. The maximum absorptance of a third absorptance peak can be in the range between about 650 nm and about 665 nm.

The absorptance peaks have associated absorbance peaks as illustrated in FIG. 15B. The first absorbance profile 1511 is associated with the first absorptance profile 1505, and the second absorbance profile 1513 is associated with the second absorptance profile 1507. The maximum absorbance of the absorbance peak associated with the first absorptance peak is in the range between about 470 nm and about 480 nm. The maximum absorbance of the absorbance peak associated with the second absorptance peak is in the range between about 570 nm and about 580 nm. The maximum absorbance of the absorbance peak associated with the third absorptance peak is in the range between about 655 nm and about 665 nm.

The various absorptance or absorbance peaks can have a spectral bandwidth equal to the full width at 90% of the maximum, full width at 80% of the maximum, full width at 85% of the maximum, or full width at 70% of the maximum. The various absorptance or absorbance peaks can have a center wavelength given by the midpoint of the spectral bandwidth of a respective absorptance or absorbance peak. It is observed from FIGS. 15A and 15B that the center wavelength of the first absorptance peak and the first absorbance peak for the first and second absorptance profiles given by the midpoint of a spectral bandwidth equal to the full width at 80% of the maximum is between about 470 nm and about 490 nm.

The various absorptance peaks can have an attenuation factor obtained by dividing an integrated absorptance peak area within the spectral bandwidth by the spectral bandwidth of the respective absorptance peak. The various absorbance peaks can have an attenuation factor obtained by dividing an integrated absorptance peak area within the spectral bandwidth of the absorbance peak by the spectral bandwidth of the respective absorbance peak. The attenuation factor of the first absorptance and absorbance peak for the first and second absorptance profile is between 0.8 and 1.0 for the illustrated embodiment.

Referring to FIG. 15C, curve 1521 is the relative chroma change associated with the first absorptance profile 1505, and curve 1523 is the relative chroma change associated with the second absorptance profile 1507. It is observed from FIG. 15C, that the relative chroma change in a chroma enhancement window in the spectral range between about 440 nm and about 480 nm is greater than or equal to about 20% for the first and second absorptance profiles. It is further observed from FIG. 15C, that the relative chroma change in a chroma enhancement window in the spectral range between about 440 nm and about 510 nm is greater than or equal to about 20% for the first and second absorptance profiles.

The luminous transmittance of a lens having the first or second absorptance profile can be greater than or equal to about 13%. The average visible light transmittance of a lens having the first or second absorptance profile can be greater than or equal to about 25%. The CIE chromaticity x-value of a lens having the first or second absorptance profile can be in the range between about 0.35 and about 0.5. The CIE chromaticity y-value of a lens having the first or second absorptance profile can be in the range between about 0.3 and about 0.36.

In various embodiments, a lens can comprise a static CE filter that can provide the first or second absorptance/absorbance profiles. The lens can further include a variable optical filter that can provide variable light attenuation. In various embodiments, a lens can comprise one or more variable optical filters (e.g., variable CE filters that may alter the luminous transmittance, contrast/colorfulness of a scene and/or chromaticity of the lens) that can be configured to be selectively switchable between a neutral state and one of the first or the second absorptance profiles. In the neutral state, the lens may be configured to uniformly attenuate all wavelengths in the visible spectral range. Alternately, in the neutral state, the lens may be configured to not attenuate any wavelength in the visible spectral range. In the neutral state, the lens may appear to be clear or gray.

For example, a lens comprising a variable CE filter can be configured to switch from a neutral state to a first state in which the lens is configured to have the first absorptance profile 1505 and the associated first absorbance profile 1511. As another example, the lens can be configured to switch from the neutral state to a second state in which the lens is configured to have the second absorptance profile 1507 and the associated second absorbance profile 1513. In some implementations, the lens comprising the variable CE filter can be configured to switch between the first or the second state. The lens can be configured to switch between any of the neutral, first or second states based on an input provided by the user, a sensor input or based on an input from an electronic hardware processor.

In various embodiments, a lens can comprise a static filter that provides one of the two absorptance profiles 1505, and 1507. In such embodiments, the lens may comprise a variable optical filter that can be switched between two or more states. At least one of the luminous transmittance, attenuation, or chromaticity may be different between the two or more states.

Example Embodiment 11

Figure 16A:
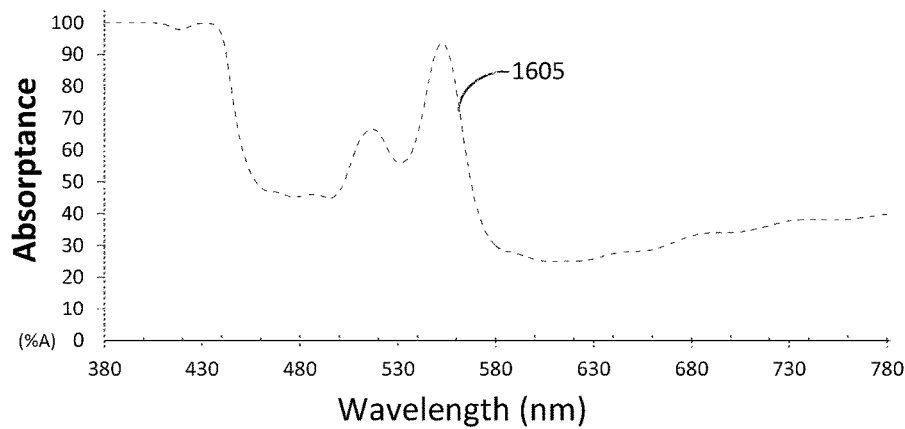
Figure 16B:
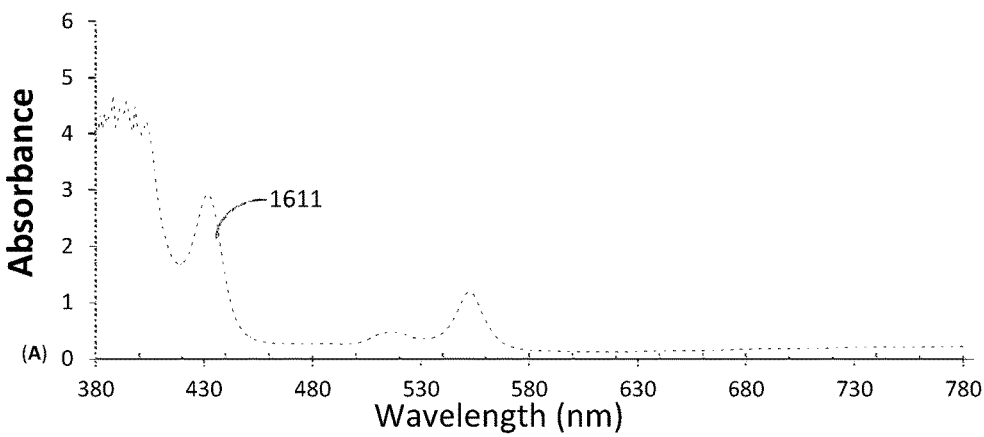

FIG. 16A illustrates the absorptance spectrum 1605 of another embodiment of a lens that can be used for various activities, such as, for example, sporting activities, driving, day-to-day activities in various ambient lighting conditions (e.g., bright light condition, medium light condition or low light condition). FIG. 16B illustrates the corresponding absorbance spectrum 1611 of the embodiment of the lens having the absorptance profile depicted in FIG. 16A and FIG. 16C depicts the relative chroma profile 1621 of the embodiment of the lens having the absorptance profile depicted in FIG. 16A.

Figure 16C:
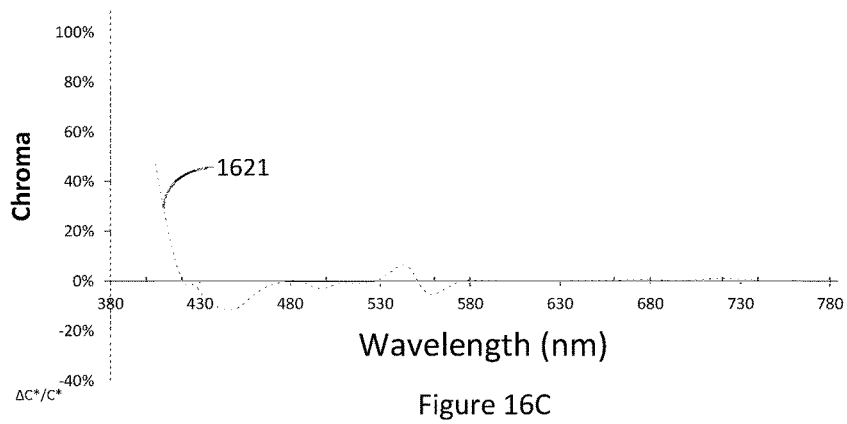

Referring to FIGS. 16A-16C, curve 1605 depicts the absorptance profile, curve 1607 depicts the associated absorbance profile and curve 1609 depicts the associated relative chroma change. The absorptance profile has at least one absorptance peak having a maximum absorptance value. The maximum absorptance of the at least one absorptance peak can be in the range between about 550 nm and about 570 nm. The maximum absorbance of the absorbance peak associated with the at least one absorptance peak can be in the range between about 550 nm and about 570 nm The at least one absorptance peak and the associated absorbance peak can have a spectral bandwidth equal to the full width at 90% of the maximum, full width at 80% of the maximum, full width at 85% of the maximum, or full width at 70% of the maximum. The at least one absorptance peak and the associated absorbance peak can have a center wavelength given by the midpoint of the spectral bandwidth of a respective absorptance or absorbance peak. It is observed from FIGS. 16A and 16B that the center wavelength of the at least one absorptance peak and the associated absorbance peak given by the midpoint of a spectral bandwidth equal to the full width at 80% of the maximum is between about 550 nm and about 570 nm.

The at least one absorptance peak can have an attenuation factor obtained by dividing an integrated absorptance peak area within the spectral bandwidth by the spectral bandwidth of the respective absorptance peak. The at least one absorbance peak can have an attenuation factor obtained by dividing an integrated absorbance peak area within the spectral bandwidth of the absorbance peak by the spectral bandwidth of the respective absorbance peak. The attenuation factor of the at least one absorptance peak and the at least one absorbance peak is between 0.8 and 1.0 for the illustrated embodiment.

It is observed from FIG. 16C, that there is an associate change in relative chroma change in a chroma enhancement window in the spectral range between about 440 nm and about 480 nm and in a chroma enhancement window in the spectral range between about 440 nm and about 510 nm.

The luminous transmittance of a lens having the absorptance profile can be greater than or equal to about 48%. The average visible light transmittance of a lens having the absorptance profile can be greater than or equal to about 48%. The CIE chromaticity x-value of a lens having the absorptance profile can be in the range between about 0.35 and about 0.5. The CIE chromaticity y-value of a lens having the absorptance profile can be in the range between about 0.3 and about 0.36.

In various embodiments, a lens can comprise a static CE filter that can provide the first or second absorptance/absorbance profiles. The lens can further include a variable optical filter that can provide variable light attenuation. In various embodiments, a lens can comprise one or more variable optical filters (e.g., variable CE filters that may alter the luminous transmittance, contrast/colorfulness of a scene and/or chromaticity of the lens) that can be configured to be selectively switchable between a neutral state and the absorptance profiles. In the neutral state, the lens may be configured to uniformly attenuate all wavelengths in the visible spectral range. Alternately, in the neutral state, the lens may be configured to not attenuate any wavelength in the visible spectral range. In the neutral state, the lens may appear to be clear or gray. For example a lens comprising a variable CE filter can be configured to switch from a neutral state to a first state in which the lens is configured to have the absorptance profile 1605 and the associated first absorbance profile 1607.

In various embodiments, a lens can comprise a static filter that provides the absorptance profiles 1605. In such embodiments, the lens may comprise a variable optical filter that can be switched between two or more states. At least one of the luminous transmittance, attenuation, or chromaticity may be different between the two or more states.

Example Embodiment 12

Figure 17A:
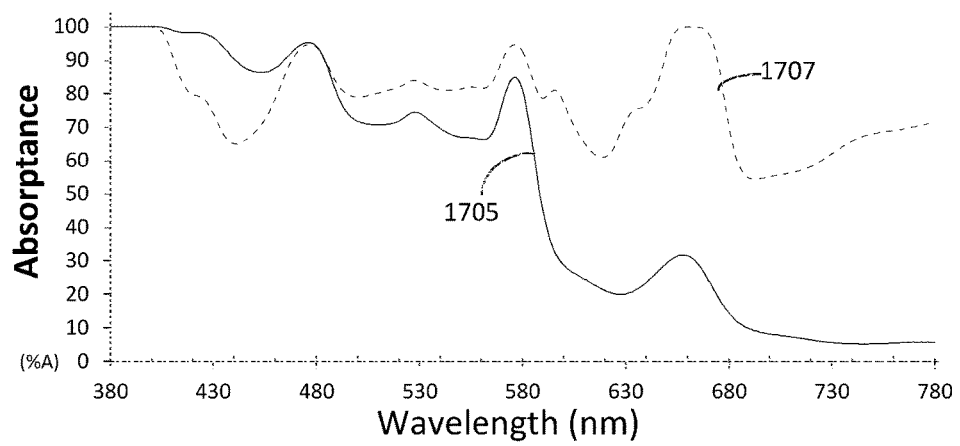
Figure 17B:
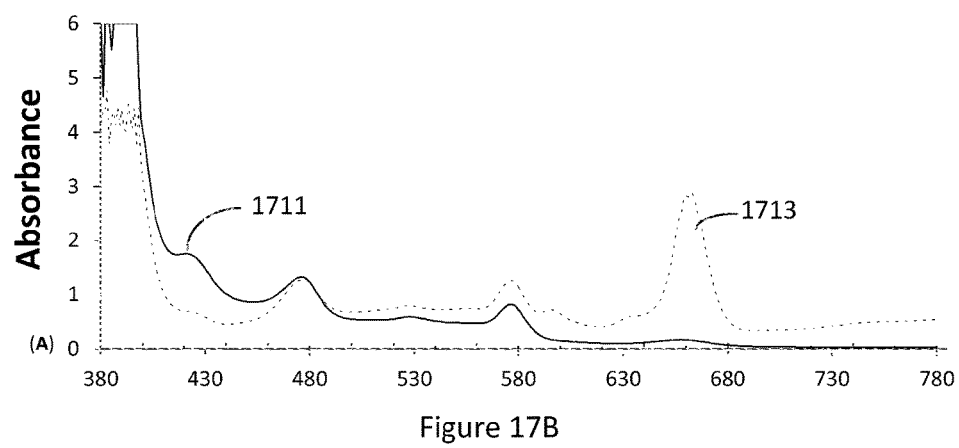
Figure 17C:
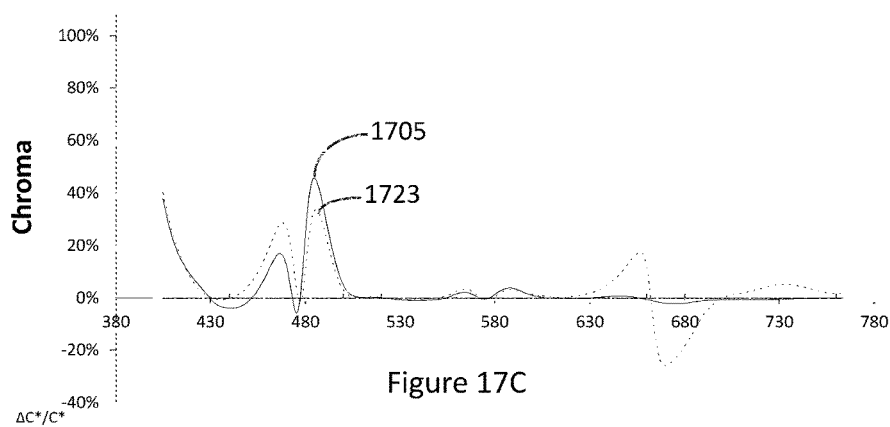

FIG. 17A illustrates the absorptance spectrum of various lenses that can be included in eyewear that can be used for various activities, such as, for example, sporting activities, driving, day-to-day activities in various ambient lighting conditions (e.g., bright light condition, medium light condition or low light condition). FIG. 17B illustrates the corresponding absorbance spectrum of the various lenses having the absorptance profile depicted in FIG. 17A and FIG. 17C depicts the relative chroma profile of the various lenses having the absorptance profile depicted in FIG. 17A.

Referring to FIG. 17A, curve 1705 depicts a first absorptance profile and curve 1707 depicts a second absorptance. The first and second absorptance profiles have a plurality of absorptance peaks having a maximum absorptance value. The maximum absorptance of a first absorptance peak can be in the range between about 465 nm and about 485 nm. The maximum absorptance of a second absorptance peak can be in the range between about 570 nm and about 580 nm. The maximum absorptance of a third absorptance peak can be in the range between about 650 nm and about 675 nm.

The absorptance peaks have associated absorbance peaks as illustrated in FIG. 17B. The first absorbance profile 1711 is associated with the first absorptance profile 1705, and the second absorbance profile 1713 is associated with the second absorptance profile 1707. The maximum absorbance of the absorbance peak associated with the first absorptance peak is in the range between about 470 nm and about 480 nm. The maximum absorbance of the absorbance peak associated with the second absorptance peak is in the range between about 570 nm and about 580 nm. The maximum absorbance of the absorbance peak associated with the third absorptance peak is in the range between about 655 nm and about 665 nm.

The various absorptance or absorbance peaks can have a spectral bandwidth equal to the full width at 90% of the maximum, full width at 80% of the maximum, full width at 85% of the maximum, or full width at 70% of the maximum. The various absorptance or absorbance peaks can have a center wavelength given by the midpoint of the spectral bandwidth of a respective absorptance or absorbance peak. It is observed from FIG. 17B that the center wavelength of the first absorbance peak for the first and second absorbance profiles given by the midpoint of a spectral bandwidth equal to the full width at 80% of the maximum is between about 470 nm and about 490 nm.

The various absorptance peaks can have an attenuation factor obtained by dividing an integrated absorptance peak area within the spectral bandwidth by the spectral bandwidth of the respective absorptance peak. The various absorbance peaks can have an attenuation factor obtained by dividing an integrated absorptance peak area within the spectral bandwidth of the absorbance peak by the spectral bandwidth of the respective absorbance peak. The attenuation factor of the first absorbance peak for the first and second absorbance profile is between 0.8 and 1.0 for the illustrated embodiment.

Referring to FIG. 17C, curve 1721 is the relative chroma change associated with the first absorptance profile 1705, and curve 1723 is the relative chroma change associated with the second absorptance profile 1707. It is observed from FIG. 17C, that the relative chroma change in a chroma enhancement window in the spectral range between about 440 nm and about 480 nm is greater than or equal to about 4% for the first and second absorptance profiles. It is further observed from FIG. 17C, that the relative chroma change in a chroma enhancement window in the spectral range between about 440 nm and about 510 nm is greater than or equal to about 10% for the first and second absorptance profiles.

The luminous transmittance of a lens having the first or second absorptance profile can be greater than or equal to about 18%. The average visible light transmittance of a lens having the first or second absorptance profile can be greater than or equal to about 22%. The CIE chromaticity x-value of a lens having the first or second absorptance profile can be in the range between about 0.30 and about 0.47. The CIE chromaticity y-value of a lens having the first or second absorptance profile can be in the range between about 0.29 and about 0.41.

In various embodiments, a lens can comprise a static CE filter that can provide the first or second absorptance/absorbance profiles. The lens can further include a variable optical filter that can provide variable light attenuation. In various embodiments, a lens can comprise one or more variable optical filters (e.g., variable CE filters that may alter the luminous transmittance, contrast/colorfulness of a scene and/or chromaticity of the lens) that can be configured to be selectively switchable between a neutral state and one of the first or the second absorptance profiles. In the neutral state, the lens may be configured to uniformly attenuate all wavelengths in the visible spectral range. Alternately, in the neutral state, the lens may be configured to not attenuate any wavelength in the visible spectral range. In the neutral state, the lens may appear to be clear or gray.

For example, a lens comprising a variable CE filter can be configured to switch from a neutral state to a first state in which the lens is configured to have the first absorptance profile 1705 and the associated first absorbance profile 1711. As another example, the lens can be configured to switch from a neutral state to a second state in which the lens can be configured to have the second absorptance profile 1707 and the associated second absorbance profile 1713. In some implementations, the lens comprising the variable CE filter can be configured to switch between the first and the second state. The lens can be configured to switch between any of the neutral, first and second states based on an input provided by the user, a sensor input or based on an input from an electronic hardware processor.

In various embodiments, a lens can comprise a static filter that provides one of the two absorptance profiles 1705, and 1707. In such embodiments, the lens may comprise a variable optical filter that can be switched between two or more states. At least one of the luminous transmittance, attenuation, or chromaticity may be different between the two or more states.

Construction/Control of the One or More Variable Optical Filters & User Feedback The one or more variable optical filters discussed herein can comprise one or more layers of electroactive material, such as, for example electrochromic materials, photochromic materials, solid particles, nano particles, liquid crystals, materials comprising transition metal oxide, such as, for example, $WO_3$, $NiO_x$, $V_2O_5$, materials comprising complex ionic compounds, such as, for example, $Fe_4[Fe(CN)_6]_3$, or electrochromic polymers that are provided on an electrode. In various embodiments, the electrode can be a transparent electrode, such as, for example, indium tin oxide (ITO). In various implementations of eyewear, the lens (e.g., lens 102a, lens 102b) can comprise the electrode. The electroactive material can be disposed on one or both sides of the electrode by processes such as, for example, vapor deposition or coating.

The eyewear can be electrically connected to an electrical system (e.g., power source 105) that is configured to provide current or voltage signals that can switch and/or maintain the electroactive material in a desired state. In various implementations, the electrical system can comprise a battery or a power source and an electrical circuit that can generate different current or voltage waveforms to switch and/or maintain the electroactive material in a desired state. In various implementations, the electrical system can be configured to provide a voltage in the range between about 0.7 V and about 2.5 V. In various implementations, the electrical system can be configured to provide a current in the range between about 100 mA and about 1.5 A.

In some implementations, the electrical circuit can be configured to generate a pulse width modulated waveform that provides an electrical voltage or current signal at a first level for a first duration of time, an electrical voltage or current signal at a second level for a second duration of time, and so on depending on the desired switching pattern. In various implementations, the electrical circuit can be programmable to generate different electrical voltage or current waveforms that would provide different optical characteristics (e.g., luminous transmittance, spectral absorptance/absorbance profiles, chromaticity, contrast sensitivity, etc.). An electrical voltage or current waveform that provides a desired optical characteristic can be generated in response to an input from a user, a sensor, or in response to an electronic hardware processor.

The eyewear can comprise a user interface element (e.g., user interface element 107) comprising buttons, switches, sliders, inductive switches, capacitive switches, etc. that can be used by the user to control the one or more variable optical filters to achieve a desired optical effect. In some implementations, the user can use voice control to control the one or more variable optical filters. For example, if a user is in the outfield of a baseball stadium, then the user may toggle a button, press a switch or use a voice command to switch the one or more variable optical filters to produce optical characteristics (e.g., absorptance/absorbance/chromaticity/relative chroma profiles) that can enhance the colorfulness/contrast of the scene in the outfield of the baseball stadium. In response to the input from the user, the electrical system may generate appropriate current/voltage waveforms that would switch/maintain the one or more variable optical filters in a state that produces the desired optical characteristics. If the user moves to the infield of the baseball stadium, then the user may toggle a button, press a switch or use a voice command to switch the one or more variable optical filters to produce optical characteristics (e.g., absorptance/absorbance/chromaticity/relative chroma profiles) that that can enhance the colorfulness/contrast of the scene in the infield of the baseball stadium. In response, the electrical system may generate appropriate current/voltage waveforms that would switch/maintain the one or more variable optical filters in a state that produces the desired optical characteristics.

The eyewear can be configured to provide feedback to the user that the one or more variable optical filters have been switched in response to the input. In some implementations, the eyewear can comprise a haptic that provides a tactile or a vibratory response when the one or more variable optical filters have been switched in response to the input. In some implementations, the eyewear can comprise an LED that provides an indication when the one or more variable optical filters have been switched. In some implementations, electrochromic indicators may be provided on the lens to indicate activation of the electroactive materials. For example, a portion of the lens (e.g., in a top or a bottom corner) may be devoid of the one or more variable optical filter materials. When the one or more variable optical filter is switched from one state to another, the portion of the lens that is devoid of the one or more variable optical filter materials would remain in the initial state and can appear distinct from the rest of the lens. In this manner, feedback may be provided to the user. In some implementations, the eyewear may comprise physical objects (e.g., a lever, a knob, a protrusion, or a projection). The position/orientation in space of the physical objects may be changed when the one or more variable optical filter is switched from one state to another. In some implementations, the physical objects may be visible in the user's field of view to provide visual feedback.

In various implementations, the one or more variable optical filters can be switched from one state to another in response to a signal from a sensor. For example, the eyewear can comprise one or more sensors. The one or more sensors can comprise light sensors or color sensors (e.g., hyper-spectral camera) that are configured to sense a change in the brightness and/or spectral composition of ambient light. As the brightness and/or spectral composition of the ambient light changes, the sensors may provide a signal that alters at least one of a luminous transmittance, a chromaticity, a chroma value of the one or more variable optical filters.

For example, as the user moves from an outdoor environment or an indoor environment, the one or more sensors may detect a reduction in ambient brightness and switch the one or more variable optical filters to a filter state that increase luminous transmittance. In some implementations, the one or more sensors may be configured to detect a change in the ambient light conditions and provide a signal that switches the one or more variable optical filters to a state in which various wavelengths are selectively attenuated to change the colorfulness/contrast of the scene.

In some implementations, the eyewear can comprise eye tracking sensors (e.g., sensors that track the size of a user's pupils) and change the optical characteristics (e.g., absorptance/absorbance/chromaticity/relative chroma profiles) of the one or more variable optical filters based on the changes in the pupil size. For example, consider a user sitting in shade and viewing a scene that is brightly illuminated (e.g., the user is sitting under an umbrella watching the ocean on a bright sunny day). In such situations, the user's pupils may be constricted. The eye tracking sensor may detect the reduction in pupil size and send a signal to the one or more variable optical filters to reduce average visible light transmittance or luminous transmittance.

CONCLUSION

The embodiments of optical filters discussed above are examples and are thus not limiting. Without any loss of generality, the values of the percentage of incident light transmitted (or absorbed) can be different from those depicted in FIGS. 5A-13G and 14A-17C. As such any offset between the faded state and the dark state shown in FIGS. 5A-13G and 14A-17C is within the scope of the disclosure. Embodiments of lenses including optical filters as described above can include one or more components that serve various functions within the lens. In some embodiments, one or more components of the lenses can provide additional functionality such as polarization control, photochromism, electrochromism, photoelectrochromism and/or partial reflection of incoming visible light, chroma enhancement, color enhancement, color alteration, or any combination of these. In some embodiments, one or more components of the lenses can provide mechanical protection, reduce stresses within the lens, and/or improve bonding or adhesion among the lens components. In some embodiments, the lenses can include components that provide additional functionality such as, for example, anti-reflection functionality, anti-static functionality, anti-fog functionality, scratch resistance, mechanical durability, hydrophobic functionality, reflective functionality, darkening functionality, aesthetic functionality including tinting, or any combination of these.

It is contemplated that the particular features, structures, or characteristics of any embodiments discussed herein can be combined in any suitable manner in one or more separate embodiments not expressly illustrated or described. For example, it is understood that an optical filter can include any suitable combination of light attenuation features and that a combination of light-attenuating lens elements can combine to control the chroma of an image viewed through a lens. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the optical filters disclosed herein can be used in at least some lens configurations and/or optical systems besides lenses.

It should be appreciated that in the above description of embodiments, various features are sometimes grouped together in a single embodiment, figure, or description thereof for the purpose of streamlining the disclosure and aiding in the understanding of one or more of the various inventive aspects. The term "between" as used herein is inclusive of the endpoints of any claimed ranges. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined by a fair reading of the claims.

The following is claimed:

1. Eyewear comprising:
a lens comprising an optical filter, the optical filter comprising:
a static attenuation filter comprising:
an absorbance peak having a spectral bandwidth and a maximum absorbance;
a center wavelength located at a midpoint of the spectral bandwidth; and
an attenuation factor obtained by dividing an integrated absorptance peak area within the spectral bandwidth by the spectral bandwidth of the absorbance peak,
wherein the spectral bandwidth is equal to the full width of the absorbance peak at 90% of the maximum absorbance of the absorbance peak,
wherein the attenuation factor of the absorbance peak is between 0.8 and 1.0, and
wherein the center wavelength is in a spectral range from 440 nm to 510 nm; and
a user-controlled and/or sensor-controlled variable attenuation filter, the variable attenuation filter configured to switch among a plurality of states comprising a faded state and a darkened state based on a signal provided by a user and/or based on input from one or more than one sensors, wherein a change in a luminous transmittance of the variable attenuation filter as a result of switching between the faded state and the darkened state is greater than or equal to 10%.

2. The eyewear of claim 1, wherein the static attenuation filter has a luminous transmittance that is less than or equal to about 90%.

3. The eyewear of claim 1, wherein the absorbance peak has a maximum absorbance value between about 460 nm and about 490 nm.

4. The eyewear of claim 1, further comprising a second absorbance peak having a maximum absorbance value between about 560 nm and about 580 nm.

5. The eyewear of claim 1, further comprising a second absorbance peak having a maximum absorbance value between about 640 nm and about 680 nm.

6. The eyewear of claim 1, wherein the static filter comprises an organic dye.

7. The eyewear of claim 1, wherein the static filter comprises an oxide.

8. The eyewear of claim 7, wherein the static filter comprises a rare-earth oxide.

9. The eyewear of claim 1, wherein the variable attenuation filter has a luminous transmittance less than or equal to about 50%, less than or equal to 40%, less than or equal to 30%, less than or equal 20%, or less than or equal to 10% in the darkened state.

10. The eyewear of claim 9, wherein the variable attenuation filter has a luminous transmittance less than or equal to about 8% in the darkened state.

11. Eyewear comprising:
an optical filter that can switch between a first filter state and a second filter state based on a signal received from an electric power supply operatively connected to a user-controlled or a sensor-controlled interface, wherein a shift in luminous transmittance between the first and second filter states is greater than or equal to about 10%
wherein in the first filter state, the optical filter comprises a first absorbance peak with a maximum optical density greater than about 0.5 at a wavelength in at least one of a first spectral region between about 440 nm and about 510 nm or a second spectral region between about 630 nm and about 670 nm the first absorbance peak having a spectral bandwidth equal to the full width at 80% of the maximum optical density, and
wherein in the second filter state, the optical filter comprises a second absorbance peak with a maximum optical density less than about 3.0 at a wavelength in at least one of a first spectral region between about 440 nm and about 510 nm or a second spectral region between about 630 nm and about 670 nm the second absorbance peak having a spectral bandwidth equal to the full width at 80% of the maximum optical density.

12. The eyewear of claim 11, wherein the optical filter does not comprise a liquid crystal controllable variable attenuation filter.

13. The eyewear of claim 11, wherein the optical filter comprises a photoelectrochromic material.

14. The eyewear of claim 11, wherein the optical filter comprises an electrochromic functional layer comprising a dichroic dye guest-host device configured to provide variable light attenuation based on an electrical signal provided by the electric power supply.

15. The eyewear of claim 14, wherein the electrical signal is a voltage pulse having a time duration of between about 10 ms and about 1 s and an amplitude between about 0.1 V and about 3 V.

16. The eyewear of claim 14, wherein the electrical signal is a current pulse having a time duration of between about 10 ms and about 1 s and an amplitude between about 100 μA and about 100 mA.

17. The eyewear of claim 14, further comprising a lens body, wherein the optical filter is at least partially attached to and/or integrated into the lens body.

18. The eyewear of claim 17, the lens body has a thickness between about 0.02 in. and 0.1 in.

19. The eyewear of claim 17, wherein the lens body comprises a substantially rigid material.

20. The eyewear of claim 19, wherein the substantially rigid material comprises polycarbonate.

21. The eyewear of claim 17, further comprising a frame connected to the lens body.

22. The eyewear of claim 21, wherein the electric power supply is connected to the frame.

23. The eyewear of claim 22, wherein the electrochromic functional layer comprises an electrode which is electrically connected to the electric power supply.

24. The eyewear of claim 22, wherein the user-controlled interface is disposed in the frame, and wherein the user-controlled interface controls the electric power supply.

25. The eyewear of claim 22, wherein the electric power supply is a battery.

26. The eyewear of claim 14, wherein the optical filter further comprises a chroma-enhancing functional layer configured to increase or decrease chroma in at least one of the first spectral region between about 440 nm and about 510 nm, the second spectral region between about 630 nm and about 670 nm, or a third spectral region between 540 nm and 590 nm.

27. The eyewear of claim 26, wherein the chroma-enhancing functional layer comprises at least one of an organic dye or a rare-earth oxide.

28. The eyewear of claim 26, further comprising a thermal insulation layer.

29. The eyewear of claim 28, further comprising an anti-fog layer.

30. The eyewear of claim 11, wherein the first absorbance peak has a maximum optical density greater than about 0.5 in a wavelength range between about 440 nm and about 510 nm in the first filter state and the second absorbance peak has a maximum optical density less than about 3.0 in a wavelength range between about 440 nm and about 510 nm in the second filter state.

31. The eyewear of claim 11, wherein the first absorbance peak has a maximum optical density greater than about 0.5 in a wavelength range between about 640 nm and about 670 nm in the first filter state and the second absorbance peak has a maximum optical density less than about 3.0 in a wavelength range between about 640 nm and about 670 nm in the second filter state.

32. The eyewear of claim 11, wherein the luminous transmittance of the optical filter is less than or equal to about 20% in the first filter state.

33. The eyewear of claim 11, wherein the luminous transmittance of the optical filter is greater than or equal to about 25% in the second filter state.

34. The eyewear of claim 11, wherein in the first filter state, the optical filter comprises an absorbance peak in a third spectral region between 540 nm and 590 nm.

35. The eyewear of claim 11, wherein in the second filter state, the optical filter comprises an absorbance peak in a third spectral region between 540 nm and 590 nm.

36. The eyewear of claim 11, wherein the spectral bandwidth of the first absorbance peak in the first filter state is between 5 nm and 20 nm.

37. The eyewear of claim 11, wherein the spectral bandwidth of the second absorbance peak in the second filter state is between 5 nm and 20 nm.

* * * * *